United States Patent
Shkolnik et al.

(10) Patent No.: US 10,253,686 B2
(45) Date of Patent: *Apr. 9, 2019

(54) HYBRID CYCLE COMBUSTION ENGINE AND METHODS

(71) Applicant: LiquidPiston, Inc., Bloomfield, CT (US)

(72) Inventors: Alexander C. Shkolnik, Wilmington, MA (US); Nikolay Shkolnik, West Hartford, CT (US)

(73) Assignee: LiquidPiston, Inc., Bloomfield, CT (US)

( * ) Notice: Subject to any disclaimer, the term of this patent is extended or adjusted under 35 U.S.C. 154(b) by 203 days.

This patent is subject to a terminal disclaimer.

(21) Appl. No.: 15/383,397

(22) Filed: Dec. 19, 2016

(65) Prior Publication Data

US 2017/0096933 A1 Apr. 6, 2017

Related U.S. Application Data

(63) Continuation of application No. 14/326,161, filed on Jul. 8, 2014, now Pat. No. 9,523,310, which is a
(Continued)

(51) Int. Cl.
*F02B 53/02* (2006.01)
*F01C 1/22* (2006.01)
(Continued)

(52) U.S. Cl.
CPC ............... *F02B 53/02* (2013.01); *F01C 1/22* (2013.01); *F01C 9/002* (2013.01); *F01C 21/04* (2013.01);
(Continued)

(58) Field of Classification Search
CPC .......... F02B 53/02; F02B 53/10; F02B 53/12; F02B 2075/027; F02B 51/02; F02B 75/02; F01C 9/002; F02M 31/02; F01L 7/026
(Continued)

(56) References Cited

U.S. PATENT DOCUMENTS 1,864,640 A  6/1932  Dalrymple
1,976,042 A  10/1934  Skouland
(Continued)

FOREIGN PATENT DOCUMENTS

CA  2352047 A1  3/2000
EP  0037206 A2  10/1981
(Continued)

OTHER PUBLICATIONS

European Patent Office, Communication pursuant to Article 94(3) EPC—Application No. 05711371.4-1603 dated Mar. 20, 2017, 5 pages.

*Primary Examiner* — Thai Ba Trieu
(74) *Attorney, Agent, or Firm* — Sunstein Kann Murphy & Timbers LLP

(57) ABSTRACT

A method of operating an internal combustion engine having a housing, a piston mounted in the housing for complex motion about a plurality of axes and coupled to a shaft, and wherein occur phases of compression, combustion, and expansion in the housing, and wherein, in the compression phase, air introduced through an intake port into the housing is compressed by reducing volume of a compression chamber in the housing from an initial volume to a second volume that is less than the initial volume, and in the expansion phase, byproducts of combustion expand from the second volume to a third volume that is greater than the initial volume.

7 Claims, 46 Drawing Sheets

Related U.S. Application Data continuation of application No. 13/758,122, filed on Feb. 4, 2013, now Pat. No. 8,794,211, which is a continuation of application No. 10/585,704, filed as application No. PCT/US2005/000932 on Jan. 12, 2005, now Pat. No. 8,365,698.

(60) Provisional application No. 60/535,891, filed on Jan. 12, 2004.

(51) Int. Cl.

| | | |
|---|---|---|
| *F01C 9/00* | (2006.01) | |
| *F01C 21/04* | (2006.01) | |
| *F01L 7/02* | (2006.01) | |
| *F02B 25/08* | (2006.01) | |
| *F02B 75/00* | (2006.01) | |
| *F02M 25/03* | (2006.01) | |
| *F02B 17/00* | (2006.01) | |
| *F02B 51/02* | (2006.01) | |
| *F02B 55/14* | (2006.01) | |
| *F02B 75/02* | (2006.01) | |
| *F02M 31/02* | (2019.01) | |

(52) U.S. Cl.
CPC ............ *F01L 7/026* (2013.01); *F02B 17/005* (2013.01); *F02B 25/08* (2013.01); *F02B 51/02* (2013.01); *F02B 55/14* (2013.01); *F02B 75/00* (2013.01); *F02B 75/02* (2013.01); *F02M 25/03* (2013.01); *F02M 31/02* (2013.01); *F01L 2101/00* (2013.01); *F02B 2075/025* (2013.01); *F02B 2075/027* (2013.01); *Y02T 10/12* (2013.01); *Y02T 10/121* (2013.01); *Y02T 10/126* (2013.01); *Y02T 10/17* (2013.01)

(58) Field of Classification Search
USPC ....... 123/204–206, 210, 222, 18 R; 418/61.2
See application file for complete search history.

(56) References Cited

U.S. PATENT DOCUMENTS

| | | | |
|---|---|---|---|
| 2,530,281 | A | 11/1950 | Barsby |
| 2,536,851 | A | 1/1951 | Latham, Jr. |
| 2,550,540 | A | 4/1951 | Ebsary |
| 3,245,388 | A | 4/1966 | Froede et al. |
| 3,275,222 | A | 9/1966 | Meyer |
| 3,393,667 | A * | 7/1968 | Jones ............... F02B 53/12 123/205 |
| 3,410,254 | A | 11/1968 | Huf |
| 3,834,845 | A | 9/1974 | Siler |
| 3,855,972 | A * | 12/1974 | Roberts ............ F02B 53/12 123/205 |
| 3,891,359 | A | 6/1975 | Meacham |
| 3,954,088 | A | 5/1976 | Scott |
| 3,978,825 | A | 9/1976 | Rogers |
| 4,059,086 | A | 11/1977 | Tsubouchi |
| 4,085,712 | A * | 4/1978 | Myers ............... F02B 53/10 123/205 |
| 5,961,302 | A | 10/1999 | Blumenau |
| 2007/0065326 | A1 | 3/2007 | Orsello |
| 2008/0141973 | A1 | 6/2008 | Shkolnik et al. |
| 2014/0140880 | A1 | 5/2014 | Wheeler et al. |

FOREIGN PATENT DOCUMENTS

| | | |
|---|---|---|
| FR | 2246730 A1 | 5/1975 |
| JP | 06-323159 | 11/1994 |
| SU | 489869 A | 1/1976 |
| WO | WO 90/02259 A1 | 3/1990 |
| WO | WO 00/14396 A1 | 3/2000 |

\* cited by examiner

HYBRID CYCLE COMBUSTION ENGINE AND METHODS

CROSS-REFERENCE TO RELATED APPLICATIONS

This patent application is a continuation of U.S. patent application Ser. No. 14/326,161, filed Jul. 8, 2014 [practitioner's file 2972/128], which is a continuation of U.S. patent application Ser. No. 13/758,122, filed Feb. 4, 2013 [practitioner's file 2972/122], now U.S. Pat. No. 8,794,211, which is a continuation of U.S. patent application Ser. No. 10/585,704 filed Mar. 28, 2008 [practitioner's file 2972/103], now U.S. Pat. No. 8,365,698, which claims priority to PCT Patent Application No. PCT/US2005/000932 filed Jan. 12, 2005, which claims priority to U.S. Provisional Patent Application No. 60/535,891 filed Jan. 12, 2004, the disclosures of which are incorporated by reference herein in their entirety.

TECHNICAL FIELD

The present invention relates generally to internal combustion engines, and, more particularly, to four-stroke variable-volume internal combustion engines and related methods.

BACKGROUND ART

A variety of conventional internal combustion engines ("ICE") known in the art, in spite of almost 150 years of development, still suffer from low efficiency, high levels of harmful exhausts, and load-dependent performance, among other shortcomings. The efficiency of heat engines is generally low due, at least in part, to theoretical thermodynamic limitations of ideal cycles, as well as additional energy losses due to deviations from ideal cycles and friction between moving parts. Typically, only up to about 30% of the chemical energy of the fuel is converted into useful work. About 40% is removed as heat by cooling water, while the remaining 30% is lost with exhaust gases.

In addition, various gases, harmful for the environment and humans, such as unburned fuel, NOx and others are formed as a byproduct of engine operation, mainly due to a very limited ability to control the combustion process. Further, the efficiency of heat engines is optimized for a narrow range of power loads. In reality, these engines seldom operate in these optimal ranges, thus operating efficiency is reduced.

The LPPE engine, disclosed in international application No. PCT/US03/05749 filed on Feb. 26, 2003 (International Publication Number WO 03/074840), incorporated herein by reference, while having a number of important advantages, may have few disadvantages, such as large amount of water that has to be pushed during each cycle and need for computer control.

SUMMARY OF EMBODIMENTS

Various embodiments of the present invention, which implement a Hybrid Cycle Combustion Engine (HCCE) and related methods, offer solutions to some of the problems inherent in prior art approaches.

In general, in one aspect, the invention is directed to an improved method for operating an internal combustion engine of the four-stroke variable volume type that has a compression stroke for compressing a working medium and a power stroke. An important feature of this aspect of the invention includes refraining from introducing substantial amount of fuel into the working medium during the compression stroke until substantially maximum pressure of the working medium has been reached. Various embodiments of this aspect of the invention include the step of causing the compression stroke to produce a pressure of the working medium that would cause auto-ignition when fuel is added to it. In addition, some embodiments of this aspect of the invention include at least one of the following steps:

(a) causing combustion of fuel under substantially constant volume conditions; and (b) causing the power stroke to provide a larger volume to combustion products than the compression stroke provides to the working medium. In further related embodiments, both processes (a) and (b) are utilized. Optionally, the power stroke is implemented with a non-reciprocating member, such as a "recip-rotating" piston (as that term is defined below). Also optionally the compression stroke is implemented with a non-reciprocating member, such as a recip-rotating piston.

Generally, in another aspect, the invention features an internal combustion engine that includes:

(a) a first housing at least partially defining a compression chamber for reducing volume of a working medium introduced thereto;

(b) a second housing at least partially disposed within the first housing and defining at least one combustion chamber in periodic communication with the compression chamber for receiving the working medium therefrom;

(c) a means for introducing a fuel medium into the combustion chamber; and (d) a third housing at least partially defining an expander chamber in periodic communication with the combustion chamber for increasing volume of by-products generated during combustion of the fuel medium mixed with the working medium in the combustion chamber.

Optionally, the engine has a first movable member at least partially disposed within the compression chamber for directing the working medium into the combustion chamber. The first movable member may define at least two subchambers within the compression chamber, the subchambers characterized by a variable volume. The first movable member may optionally be a rotatable piston, a reciprocal piston, or a recip-rotating piston. Also optionally, at least one of the second housing and the first movable member has a means for controllably sealing the combustion chamber, such as, for example, a fluidic diode.

In related embodiments, the engine includes a means for introducing a fluid medium into at least one of the compression chamber, the combustion chamber, and the expander chamber. Optionally, the engine includes a heat exchanger for recovering the fluid medium from the expander chamber and for increasing heat of combustion of the fuel medium prior to introduction thereof to the combustion chamber.

Alternatively or additionally, the engine includes a second movable member disposed at least partially within the expander chamber, the second movable member reacting against the combustion by-products entering from the combustion chamber. As in the case of the first moveable member, the second movable member may define at least two subchambers within the expander chamber, the subchambers characterized by a variable volume. The second movable member may optionally be a rotatable piston, a reciprocal piston, or a recip-rotating piston.

In further related embodiments, the second housing is rotatable in relation to at least one of the first housing and the third housing. The first housing and the third housing may optionally be a unitary housing structure. Similarly the compression chamber and the expander chamber may be implemented as a single chamber characterized by a variable volume.

Generally, in yet another aspect, there is provided an internal combustion engine that includes:
(a) a first housing at least partially defining a compression chamber for reducing volume of a working medium introduced thereto;
(b) a first movable member at least partially disposed within the compression chamber for directing the working medium into the combustion chamber;
(c) a second housing at least partially disposed within the first housing and defining at least one combustion chamber in periodic communication with the compression chamber for receiving the working medium therefrom;
(d) a means for introducing a fuel medium into the combustion chamber;
(e) a third housing at least partially defining an expander chamber in periodic communication with the combustion chamber for increasing volume of by-products generated during combustion of the fuel medium mixed with the working medium in the combustion chamber; and
(f) a second movable member disposed at least partially within the expander chamber, the second movable member reacting against the by-products entering from the expander chamber, at least one the first housing, the second housing, the first movable member and the second movable member defines at least one fluidic diode for controllably sealing at least one of the compression chamber, combustion chamber, and the expander chamber.

In various embodiments of this aspect of the invention, the engine includes a sealing fluid unidirectionally movable through the at least one fluidic diode In yet another aspect of the invention, there is provided a structure having a controllably sealable chamber. The structure includes a housing member having an interior surface defining the chamber; and an inner member at least partially disposed within the chamber, the inner member having an outer surface and, at least one of the housing member and the inner member being movable such that the housing member and the inner member are movable relative to each other in such as way that at least a first portion of the outer surface of the inner member is disposable proximate to a first portion of the interior surface, at least one of the first portion of the outer surface of the inner member and the first portion of the interior surface of the housing member defining at least one fluidic diode. A sealing fluid unidirectionally movable through the at least one fluidic diode may optionally be provided.

In still another aspect, in general, the invention features a method for energy conversion that includes the steps of:
(a) introducing a working medium into a compression chamber characterized by a first volume value;
(b) controllably reducing the volume of the working medium to a second volume value thereby compressing the working medium;
(c) combining a fuel medium with the compressed working medium thereby obtaining a combustible mixture of the fuel medium and the compressed working medium, the mixture characterized by a third volume value;
(d) combusting the mixture to produce a volume of combustion by-products; and
(e) maintaining the volume of combustion by-products generated during combustion of the mixture at or below the third volume value.

Optionally, the method according to this aspect of the invention includes the step of increasing the volume of the combustion by-products to a fourth volume value, the fourth volume value exceeding the first volume value; the step of increasing the volume of the combustion by-products optionally including transferring the combustion by-products to an expansion chamber characterized by the fourth volume value.

The working medium may be air or a noncombustible mixture of air and fuel medium. Optionally, the temperature of the working medium may be adjusted so that the working medium is compressed substantially isothermally. Also optionally, there may be added a fluid medium, such as water, to the working medium during compression. The method may be implemented to include reducing temperature of the combustion by-products while increasing heat of combustion of the fuel medium prior to combining thereof with the compressed working medium.

In further related embodiments, the second volume value equals the third volume value, and controllably reducing the volume of the working medium may include transferring the working medium to a combustion chamber characterized by the third volume value. Alternatively or in addition, combusting the mixture may include igniting the mixture of the fuel medium and the compressed working medium. Optionally, maintaining the volume of combustion by-products may include adding a fluid medium to the mixture.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Definitions. For purposes of this description and the claims of this application, the following terms shall have the indicated meanings unless the context clearly requires otherwise:

"Working medium" is a gaseous mixture that consists essentially of air or includes a fuel/air mixture that is not capable of auto-ignition.

"Recip-rotating" is a type of motion of a piston that includes rotation of the piston alternately around two axes of rotation, while simultaneously reciprocating as a whole.

"Sealing fluid" is a fluid that includes water, lubricating oil, cooling liquid, refrigerant, or any other liquid suitable for sealing purposes.

"Substantially isothermal compression (or expansion)" is the process of compressing or expanding gas or gas/steam mixture during which the temperature of the mixture remains substantially constant.

"Piston's motion" is a motion of compressor's and the expander's pistons, which, depending upon specific implementation, may include complex motion, such as non-uniform rotation, reciprocation, oscillation or recip-rotation.

"Combustion products (or by-products)" are products of combustion of fuel, containing water vapor formed in a course of combustion and, optionally, water vapor from the additionally introduced water.

"Low pressure insertion mechanism" is a mechanism for introducing water and/or fuel into the combustion chamber by rotating a shaft containing cavities filled with a water and/or fuel into the combustion chamber or, conversely, rotating the combustion chamber into a stationary cavity filled with fuel and/or water.

"Introduced water or fuel"—water or fuel injected or introduced by means of the low-pressure insertion mechanism.

"Scissors" or "cat & mouse" is a piston configuration in which piston rotating in one direction momentarily approaches another piston rotating in the same sense and then retracts from this second piston due to difference in angular speeds.

"PGM"—a Power Generating Module

"PCM"—a Power Conversion Module

"ERS"—an optional Energy Recovery System

"Fluidic Diode Seal" ("FDS") is a seal formed between two bodies in collinear motion with respect to each other, when one or both of these bodies have features that create locally high pressure for flow moving in one direction (leakage flow), such a feature would act as a dynamic seal with potential to substantially decrease or eliminate the leakage.

Figure 1:
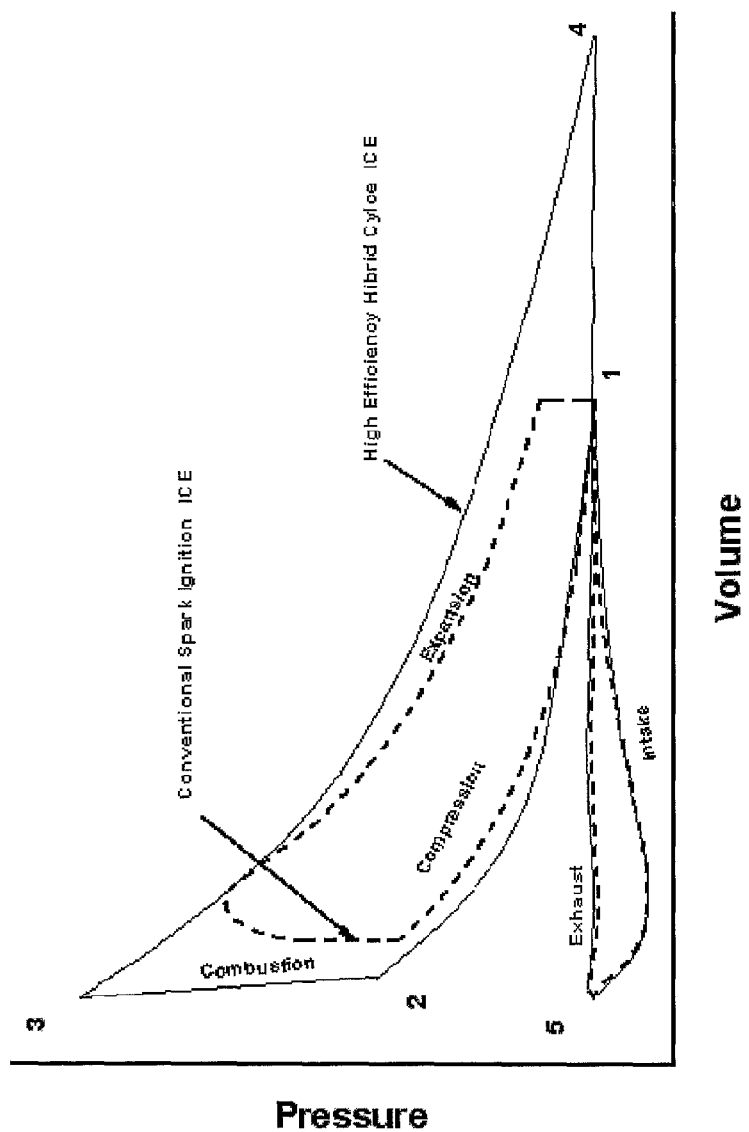
FIG. 1 is pressure/volume diagrams for a typical Otto cycle, shown in dashed lines, as well as for an engine using an HCCE, shown in solid lines.

"Hybrid Cycle Combustion Engine" ("HCCE") is an internal combustion engine implemented in accordance with various embodiments of the invention and operating in accordance with a thermodynamic cycle diagram shown in FIG. 1.

Generalized Structure of an HCCE Engine in Accordance with Embodiments Herein

There are many different types of engines, operating in accordance with various thermodynamic cycles, and an even greater number of modifications within each type. These different types exist because each offers certain advantages over others. For example, while Diesel cycle engines are somewhat inferior in terms of efficiency to Otto cycle engines (which we sometimes call herein "four-stroke" engines, and the strokes as "intake", "compression", "expansion", and "exhaust") when both operate at the same compression ratio, the Diesel engine normally runs at higher compression ratios and it becomes more efficient than the Otto engine. Ericsson cycle engines as well as Stirling cycle engines are superior to Otto cycle engines because they allow part of the exhaust energy to be recovered, but these engines are very cumbersome (and therefore expensive) to build and maintain. At the same time, Rankine cycle steam engines offer some advantages over internal combustions engines, but are very large and slow.

A principal idea underpinning embodiments described in this application is a new, significantly improved thermodynamic cycle, referred to as the 'High Efficiency Hybrid Cycle' (HEHC). This new cycle combines the best features of several known cycles. Several implementations of this new cycle are presented. Engines that implement this new cycle exhibit higher thermodynamic efficiency as well as mechanical efficiency (with overall efficiency of 50%-60%), are economical to produce and maintain, and pollute less than engines utilizing other cycles.

The work performed, and, therefore, efficiency of a given cycle, is equal to the area delineated by a pressure/volume (PV) diagram. FIG. 1 depicts a PV diagram for a typical Otto cycle, shown in dashed lines, as well as for an engine using an HEHC, shown in solid lines. Thus to increase efficiency, embodiments presented herein increase the area in the PV diagram by "stretching" the delineating curves for the Otto cycle, which has some of the highest theoretical efficiencies. See, for example, "Engineering Thermodynamics with Applications" by M. David Burghardt, p. 353, incorporated herein by reference. Referring to FIG. 1, the Otto cycle starts at point 1, which is characterized by the intake volume $V_{Intake}$ of the engine and ambient pressure ~1 atm. We now identify features of the HEHC, which may be implemented to increase the area defined by the PV diagram, and, therefore, the efficiency of the engine. Of course, implementing any one of these features will increase efficiency; and implementing more of these features will further increase efficiency. In other words, not all features need be implemented in order to realize some benefits of the embodiments described herein.

We will describe in more detail below engines that implement HEHC and we will call such engines "Hybrid Cycle Combustion Engine", or HCCE. In various exemplary embodiments, HCCE includes the following components described throughout this description and depicted in the Figures.

COMPONENTS

100—PGM (Power Generation Module)
110—compressor cover
111—protrusion into compression chamber
113—left valve housing (cylindrical openings)
114—right valve housing (cylindrical openings)
115—shaft housing (cylindrical openings)
120—oscillating shaft
121—compressor's piston
122—expander's piston
123—drive cam
124—cam follower roller
125—guide roller
126—central drive shaft
127—upper drive shaft
128—lower drive shaft
130—compressor body
131—compression chamber
132—compression chamber
133—combustion chamber
134—combustion chamber
135—one-way air valve
136—one-way air valve
137—water injector
140—separator
141—air intake port
142—air intake port
143—exhaust port
144—exhaust port
145—air channel
146—exhaust channel
150—fresh air intake valve
151—combustion products transfer valve
152—channel
153—left air/exhaust valve
154—right air/exhaust valve
155—shaft
157—exhaust valve
161—radial bearing
162—radial bearing
163—radial bearing
164—radial bearing
170—expander body
171—expander chamber
172—expander chamber
180—expander cover
181—protrusion into expansion chamber
191—crankshaft
192—magnets
200—ERS (Energy Recovery System)
300—PCM (Power Conversion Module)

HCCE Features

1. High compression ratio. In the Otto cycle (and other typical spark ignition engines), the air/fuel mixture is compressed but only to pressure and temperature conditions that stop short of causing auto-ignition. Since compressing to a higher ratio can attain higher efficiency, the HCCE compresses air to a very high ratio, typically above the pressure-temperature conditions that would cause auto-ignition were fuel present. However, the compression in various embodiments is of air only (or working medium, as defined above), and fuel is added only after the compression phase is substantially complete—as in the conventional Diesel cycle. However, in contrast to the approach of Diesel cycle engines, in various HCCE embodiments, the fuel combusts at substantially constant volume conditions.

2. Near-isothermal compression. Isothermal compression requires less work for compression of a given amount of working medium to a given pressure than adiabatic compression. Near-isothermal compression may be achieved by cooling the working medium during compression, e.g. by adding water during compression.

3. Constant-volume (isochoric) or decreasing-volume combustion. Ignition starts at point "2" in the PV diagram and proceeds to point "3". Preferably, this should happen under isochoric conditions. In practical Otto engines, this condition is not satisfied, because the piston, being attached to a rotating crankshaft, travels a finite distance during the time it takes the fuel to burn. To achieve a truly isochoric process, in various HCCE embodiments, the piston will be momentarily stopped until combustion is substantially complete and/or the engine is configured to isolate the burning air/fuel mixture in a separate combustion chamber.

It is possible to further reduce the volume of the working medium by "moving" point 3 in the PV diagram "left" by adding a fluid medium, such as water, during combustion. The water evaporates, reducing the temperature within combustion chamber and therefore the pressure of combustion products. However, at the same time, water added in this way reduces the volume occupied by combustion products within the combustion chamber, since evaporating water vapor occupies 1400 times the space of liquid water. The volume decrease has an opposite effect on the pressure of combustion products—the volume decrease (in the absence of a temperature change) increases the pressure of combustion products. Therefore, while the net effect of the addition of liquid water into the combustion chamber might be a slight decrease in the pressure at point 3, the superheated steam generated during this process can be harnessed during the next phase—expansion of the working medium, which now will contain the products of combustion as well as this superheated, high pressure steam. Also, evaporating water cools the combustion chamber, which allows for the use of less expensive materials for engine construction. The reduced temperature also reduces formation of undesirable NOx gases.

4. Increased pressure during the expansion stroke. In modern engines cylinder walls are cooled to prevent material degradation and melting. Cooling the cylinder walls lowers the curve between points "3" and "4" in the PV diagram—which has a negative effect on the total area under the curve. In our case, the water evaporated during combustion helps to stretch the cycle curve upward. Additional water may be added to decrease wall temperature, while additional steam generated will be used to perform more work.

5. Expanding to volume larger than intake volume. Point "4" in the PV diagram shown in FIG. 1 can be shifted to the right by extending the expansion stroke, that is, configuring the expansion stroke to provide a volume that is significantly larger than the volume provided during the intake stroke. This result may be accomplished by expanding combustion products (and steam) into an expansion chamber that has a larger volume than the chamber used for the compression stroke. One way to implement such configuration is to utilize separate compression and expansion chambers and/or, if water is used, by adding a variable amount of liquid (water) in a compression and/or expansion chamber, so that more liquid is present during compression than during expansion.

6. Thermo-chemical recovery. Additional efficiency can be obtained by transferring part of the heat from the exhaust gases back into the system, as is done in Stirling or Ericsson cycles. While technically such heat transfer could be accomplished in Otto or Diesel engines by installing a simple heat exchanger, which would transfer the heat from exhaust gases to incoming fresh air, practical considerations preclude such a solution since the volume of such a "gas to gas" heat exchanger would be excessively large, and hotter air temperatures would effectively reduce power density of the engine. In our case we are forced to reduce the temperature of exhaust gases below 100 deg. C. to recover the water that we added during compression, combustion and/or expansion strokes. However, instead of transferring heat to incoming air, we transfer this heat to gaseous fuel, as described in the international application No. PCT/US03/05749, mentioned above. An additional advantage of this approach is that the large amount of heat associated with the change of phase of water between gaseous and liquid states permits using water as a heat transfer medium in a heat exchanger that occupies a volume comparable to the volume of a radiator used in modern ICEs. In this embodiment, the heat recovered from the water may be used to cause thermo-chemical decomposition of incoming gaseous fuel into hydrogen and carbon monoxide, so that the resulting decomposed fuel has a higher heat of combustion than before thermo-chemical decomposition.

In addition to enabling the hybrid cycle described above, it is desirable for various embodiments of an engine in accordance with the present invention to have low friction between piston and cylinders as well as a compact form-factor. In various embodiments, an engine in accordance with the present invention may have features, discussed in further detail below, including the following:

1. A compressor, which compresses air into one or more combustion chambers, preferably during forward and return strokes of operation, in such a way that while air is being compressed on one side of the compressor's piston, fresh air is inducted on the other side of the compressor's piston.
2. A set of one or more combustion chambers, for accepting hot, pressurized air from the compressor. When fuel is introduced into the combustion chambers, by means of a fuel introduction mechanism, combustion begins and (optionally) continues until complete combustion occurs.
3. A fuel introduction mechanism, which inserts the fuel into the combustion chamber(s). This mechanism may inject fuel with an injection pump, or may insert a low pressure gaseous fuel into a high pressure combustion chamber by means of mechanical insertion. When mechanical insertion is used, it may be implemented in a number of configurations. One configuration involves rotating a shaft located within the combustion chamber in such a way that the cavity within the shaft that contains the fuel is gradually rotated into the combustion chamber. Conversely, another configuration involves rotating the combustion chamber into a stationary cavity that is filled with gaseous fuel. In another embodiment, any high-pressure fuel injection mechanism may be used.
4. An optional water introduction mechanism, which can inject liquid water with a water-injection pump, or insert liquid water into the high pressure combustion chamber by means of mechanical insertion. The mechanical insertion may be implemented just as described with respect to the fuel introduction mechanism: either by rotating a shaft located within the combustion chamber in such a way that the cavity within the shaft that contains the water is gradually rotated into the combustion chamber or, conversely, the combustion chamber is rotated into the stationary cavity that is filled with water. Also, in another embodiment, the water may be injected or inserted into the compressor and/or into the expander chambers for cooling purposes.
5. An expander, which receives high-pressure, high-temperature combustion products, and (optionally) high-pressure steam, from the set of combustion chambers, and expands said combustion products and steam, converting heat and potential energy into work, preferably during forward and return strokes of operation, in such a way that while combustion products and steam are being expanded on one side of the expander's piston, the expended combustion products and steam are exhausted on the other side of the expander's piston. It is desirable that the expansion volume of the expander be larger than the intake volume of the compressor. This is easily implemented if the expander is a separate volume from the compressor. In another embodiment, the compressor itself may be used as the expander (i.e., one may use the same volume for both compression and expansion, as is done in a typical piston-based Otto or Diesel engine). Even if the same volume is used, the expander may have larger gas expansion volume than compression volume if more liquid is present in the chamber during compression than during expansion.
6. An optional thermo-chemical recovery system in which water contained in the exhaust is condensed and the energy recovered from such a process is transferred to the fuel, in a process of decomposing the fuel into a mixture of hydrogen and carbon monoxide (and possibly some other gasses), having a heat of combustion higher than that of original fuel.

It should be noted that while only a combination of all the features above yields optimal efficiency, various embodiments of the invention might omit some of them. Numerous ways in which the above features may be implemented are contemplated by the invention. Several exemplary embodiments are discussed below.

Figure 2:
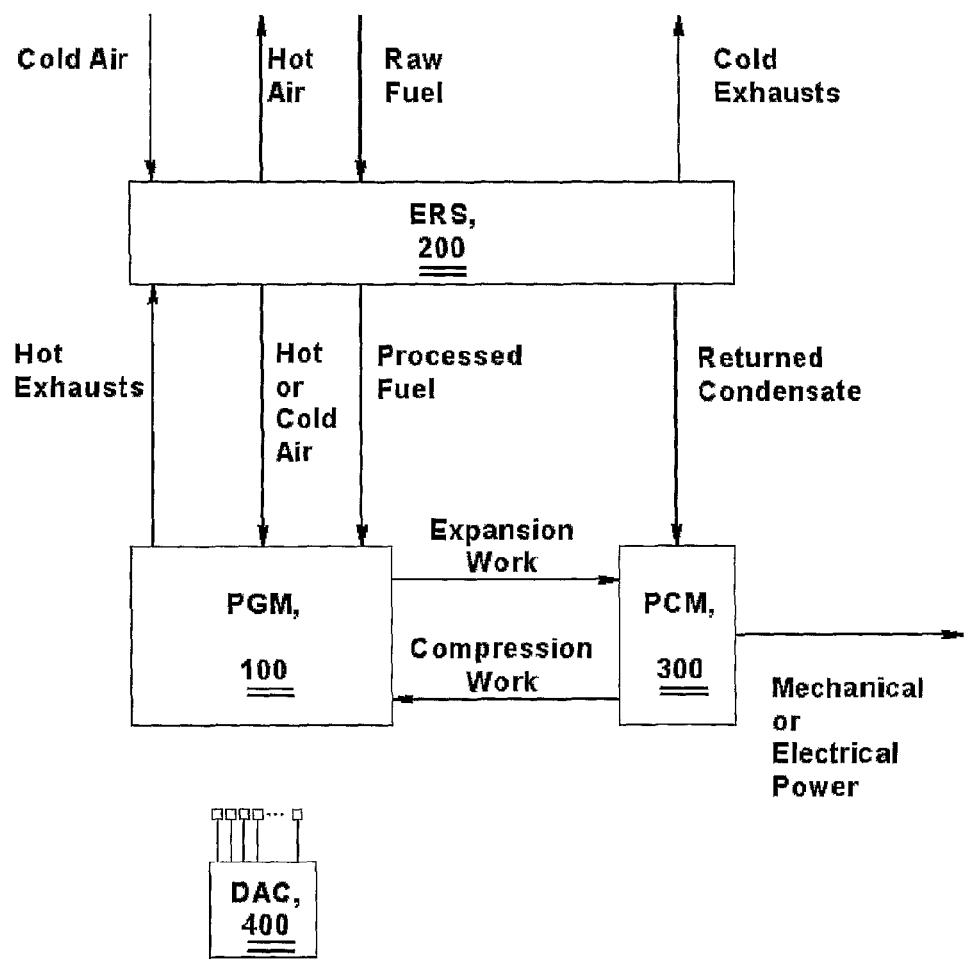
FIG. 2 is a block-diagram of a HCCE, according to various embodiments of the invention.

In FIG. 2, we illustrate major modules an HCCE embodiment: a Power Generating Module (PGM), 100, a Power Conversion Module (PCM), 300, and optional Energy Recovery System (ERS), 200, Data Acquisition and Control Module (DAC), 400. ERS and DAC are disclosed in international application No. PCT/US03/05749 mentioned above and incorporated by reference.

Referring to FIG. 2, the pistons of the compressor and the expander may execute a complex motion, including motion that we have called "recip-rotating". In general terms, in the "Definition" section, we have not limited a "piston's motion" to reciprocation related to a substantially uniform rotary motion of a connected output shaft. With these definitions in mind, the PCM 300 functions are to convert piston's motion into output shaft motion or directly into electrical energy; to limit the range of piston's motion in order to prevent the collisions of pistons with walls of the engine; and, optionally, to smooth out power fluctuations, by utilization of a flywheel.

There are many mechanisms, based on cams and non-circular gears that allow those skilled in the art to implement simple and efficient PCMs. See for example, "Mechanism & Mechanical Devices Sourcebook" by Nicholas P. Chironis, McGraw-Hill Companies, The—April 1991 ISBN 0-07-010918-4, pp. 71, 74 and 105, hereby incorporated herein by reference.

The PGM 100 of an HCCE in accordance with embodiments of the present invention may be implemented in a variety of ways, for example to produce rotational, oscillatory or recip-rotating motion (examples will be given later). If oscillatory motion is produced, it may be converted into rotary motion of an output shaft using the PCM 300. Conversion from piston's motion into rotational motion of output shaft or directly into electrical energy by the PCM 300 will be described in detail below.

PGM—Liquid Piston

We will start with description of the PGM 100. In one embodiment, the PGM may be implemented using a liquid-piston concept shown in FIG. 3 and described in the international application No. PCT/US03/05749 mentioned above. We will to refer an ICE implementing the liquid-piston concept is "Fluid ICE™".

The rigid metal piston of conventional ICEs is replaced with a liquid piston, for example, a volume of water. The upper surface of water may not be flat or even continuous during the motion of the liquid piston. The water surface substitutes for the upper surface of the metal piston. The table below summarizes the key differences in a 4 stroke engine using a metal vs. liquid piston

| Stroke | Description of each stroke of a one cylinder, 2 valve (air and exhaust), 4 stroke engine | Conventional ICE Operation | Liquid Piston based Fluid ICE ™ Operation |
|---|---|---|---|
| 1. Intake | with air valve open an air/fuel mixture is sucked in | piston moves down, driven by the crank shaft | liquid piston moves down, driven by the pump |
| 2. Compression | with both valves closed air/fuel mixture is compressed | piston moves up, driven by the crank shaft | liquid piston moves up, driven by the pump |
| 3. Expansion | with both valves closed an air/fuel mixture combusts creating very high pressure in the cylinder | A spark plug is required to ignite air/fuel mixture. The piston moves down, driven by the high pressure. The moving piston drives the crank shaft | A spark plug is not required for combustion. A high gas temperatures, caused by high compression ratio, enable spontaneous combustion. The liquid piston moves down driven by the high pressure. The water flow drives a hydraulic motor |
| 4. Exhaust | with exhaust valve open a combusted air/fuel mixture is expelled from the cylinder | piston moves up, driven by the crank shaft | liquid piston moves up, driven by the pump |

Figure 6:
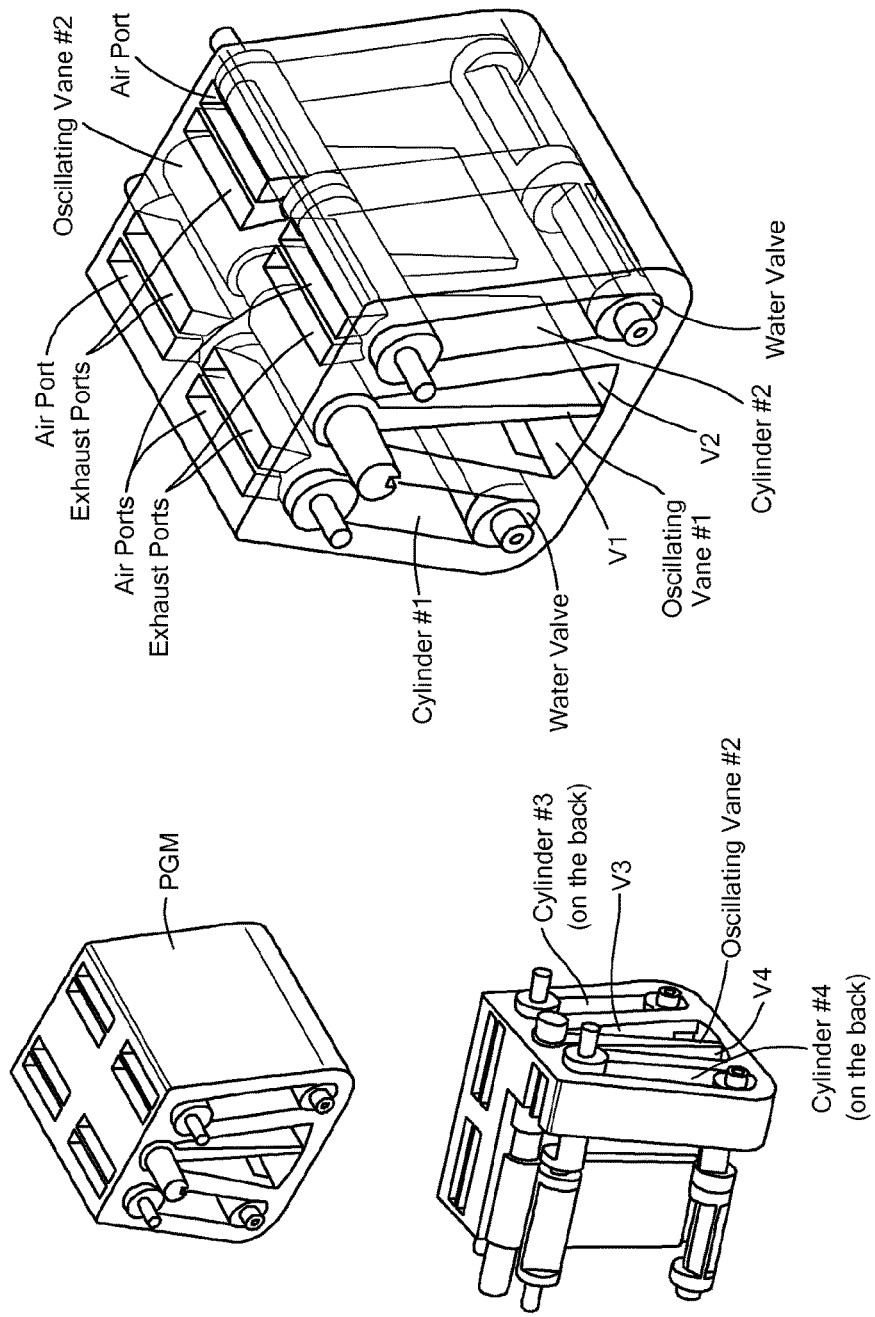
FIG. 6 depicts a liquid-piston based HCCE in which combustion chambers are integrated with cylinders.

We note the following characteristics of the ICE having a liquid piston:

The cylinders of conventional engines are round to facilitate sealing the space between piston and cylinder walls. As FIG. 3 demonstrates, the cylinder cross-section of liquid based engine does not have to be round as there is no sealing issue. The rectangular design facilitates volumetric efficiency (i.e. the same power in a smaller volume) and, more importantly, also enables a new design of intake and exhaust valves. FIG. 6 shows, as an example, that one rotary valve can operate Intake and Exhaust valves—this simplifies the design considerably. It should be also noted that rotary valves operate much quieter and do not generate knocking noise of conventional poppet valves.

Water evaporates during piston expansion. This is beneficial to ICE because:

a. Evaporating water increases the pressure within the cylinder during expansion, as was discussed above. This effectively means that Fluid ICE is a synergetic combination of an internal combustion engine and steam engine, except that there is no boiler and the evaporation process is almost instantaneous.

b. The evaporating water carries a large amount of (latent) heat of evaporation, which can potentially be used to do more work. This is accomplished by sending hot exhausts, containing water vapors, through an Energy Recovery System (ERS), shown in FIGS. 2 and 5 and explained later in this paper.

c. Water cools and lubricates the cylinder alleviating the need for additional cooling and lubrication.

The volume of water in the cylinders is controlled by valves. In various embodiments of the invention, this has a positive effect on the thermodynamic efficiency of the engine:

a. Air intake volume is smaller than exhaust volume at the end of the expansion stroke. As shown in FIG. 1—this alone increases thermodynamic efficiency by as much as 20%.

b. In a conventional engine, as soon as combustion begins, the piston begins to expand, which cools the fuel/air mixture, causing incomplete combustion. In Fluid ICE, combustion can occur at a constant volume—a preferable condition that allows for complete burning of fuel.

To accommodate very high water flows (small amounts but very high velocity), standard, commercially available pump and hydraulic motor have to be very large. Instead, we use vane-type actuators, which simultaneously serve as a pump and a hydraulic motor. These actuators are described in the section "Putting it all together", below.

Energy Recovery System (ERS)

Figure 4:
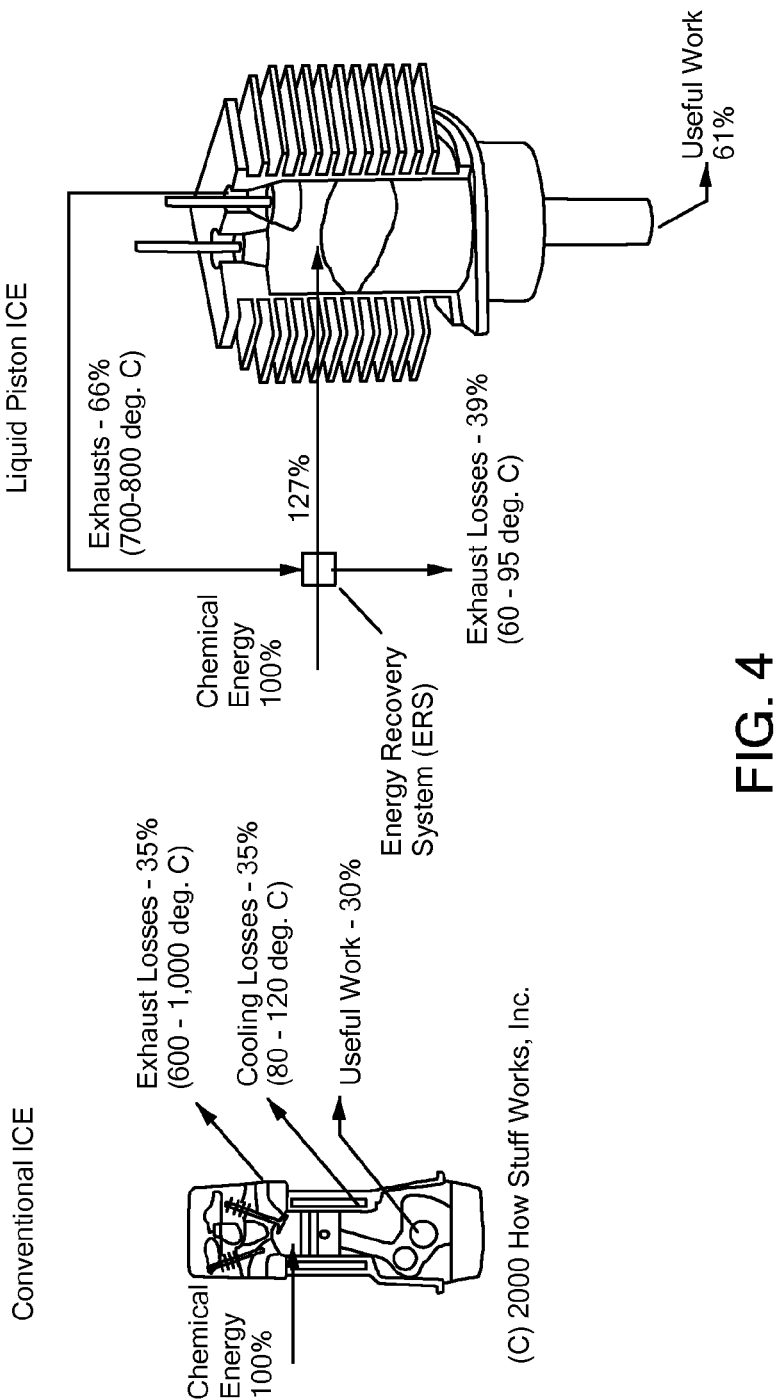
FIG. 4 is a comparison of energy distribution within conventional ICE and HCCE.
Figure 5:
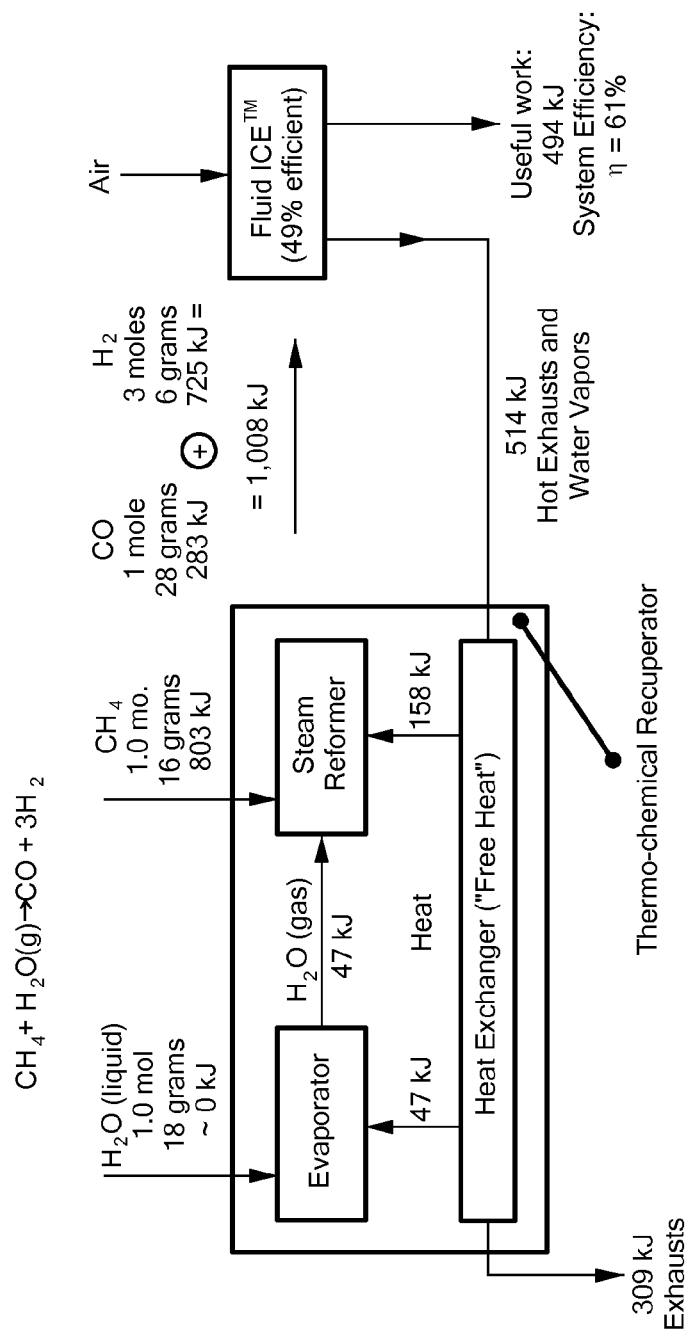
FIG. 5 shows more detailed energy balance sheet for HCCE.

The ERS (FIG. 1) serves a plurality of purposes. It converts raw fuel, such as hydrocarbon gas (Natural Gas or vaporized liquid fuel) and water vapor into reformat gas, containing H2, CO and other gases which have up to 27% higher heat of combustion than raw fuel gas. The conversion occurs in a thermo-chemical recuperator via endothermic, catalyst-assisted reactions occurring at a constant temperature between 450 and 750 deg. C.. The required temperature for this process depends upon the properties of the catalyst and amount of water vapor and/or carbon dioxide. Exhausts supply the additional energy needed for this conversion, thus this process significantly increases the efficiency of the engine's operation. The engine can run on raw fuel as well, so these reforming components are optional. A comparison of energy distribution within conventional and Fluid ICE™ Engines is shown in FIG. 4. A more detailed energy balance sheet for Fluid ICE™ engine is shown in FIG. 5.

A second purpose for ERS is water recovery. Because (evaporating) water must not leave the system at a rate greater than the combustion process generates it, water must be recovered from the exhausts. The exhausts must be cooled to below 100 deg. C., as is effectively done when used with the ERS. The Thermo-chemical Recovery system was offered first for large power plants in "The Thermo-chemical Recovery System—Advanced Heat Recovery", By D. K. Fleming and M. J. Khinkis, 12th Energy Technology Conference and Exposition, Washington D.C. Mar. 25-27, 1985, as well as described in U.S. Pat. Nos. 4,900,333; 5,501,162; and 5,595,059, all incorporated herein by reference, but was never applied to ICE because such an energy recovery system would create additional, large and expensive components handling water and water vapors. For Fluid ICE, these components are integral and synergetic.

Efficiency

The reasons for higher thermodynamic efficiencies of the Fluid ICE engine are shown in FIG. 1. The area delineated by solid lines 1→2→3→4 represents the amount of energy that can be extracted during a single cycle of the Fluid ICE engine. Calculations show that the theoretical thermodynamic efficiency of Fluid ICE engine is 74%, whereas for conventional ICE it is only around 50-57%.

Putting it all Together

Figure 3:
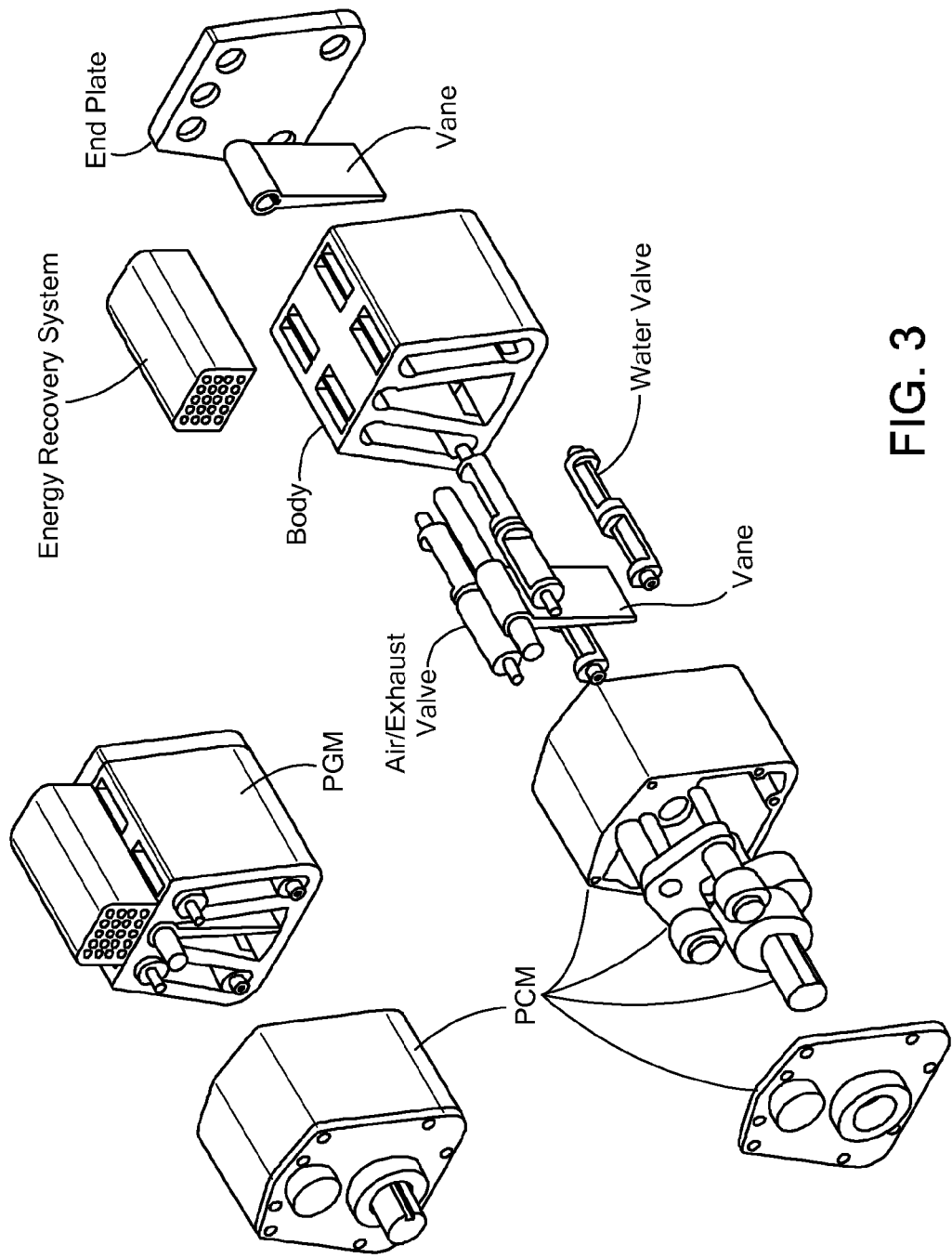
FIG. 3 is a liquid-piston implementation of the High Efficiency Hybrid Cycle (HEHC)

FIG. 3 shows both a perspective view and an exploded view of a 4 cylinder, 4-stroke engine using a liquid piston as described. The liquid piston engine's PGM, which transforms chemical energy of fuel into oscillatory shaft motion, is here implemented by four cylinders and two actuators, located between the cylinders. An actuator is comprised of an oscillating vane and two volumes. The two volumes are always filled with water. Thus, A-1 (actuator #1), is formed by the oscillating vane OV-1 and volumes V1, adjacent to cylinder #1 and volume V2, adjacent to cylinder #2. Similarly, A-2 (actuator #2), is formed by the oscillating vane OV-2 and volumes V3, adjacent to cylinder #3 and volume V4, adjacent to cylinder #4.

The vane can be driven by applying high-pressure water on one side, so the vane acts as a hydraulic motor. Simultaneously, the other side of the vane pushes water out, so the vane is also acting as a pump. Thus, actuators are used to serve as both a hydraulic motor and pump.

Oscillating Vane #1 (OV-1) is shown in FIG. 6 between cylinders #1 and #2. The Oscillating Vane #2 (OV2) on the back of the engine is between cylinders #3 and #4. Both vanes move together because they are rigidly attached to the same shaft, which executes oscillating motion.

Assuming that shaft and both OV-1 and OV-2 are moving counterclockwise (as shown by the arrow in FIG. 6. The operation of Fluid ICE™ engine is as follows:

In cylinder 1:
The air valve opens the air intake port. The water valve opens to allow water to flow between cylinder #1 and V1 (left hand side of A-1). As OV-1 moves counterclockwise, water is pumped out of cylinder #1 and into the V1 compartment of A-1. An air is drawn into the cylinder; thus, cylinder 1 is undergoing the intake phase.

In cylinder 2:
The water valve for cylinder #2 is open, so as OV-1 moves counterclockwise, water from V2 (the right compartment of A-1) is pumped into cylinder #2. The exhaust valve of cylinder #2 is open—allowing exhaust gasses to exit through the exhaust port. This means that cylinder #2 is undergoing the exhaust phase.

In cylinder 3:
Assume that combustion has recently occurred in cylinder 3. Water from cylinder #3, under pressure from expanding gasses, flows into V3. The inflow of water into A-2 drives OV-2 (and correspondingly, OV-1) to move in a counterclockwise direction. Both Exhaust and Air ports of cylinder #3 are closed, as cylinder #3 is undergoing the expansion phase.

In cylinder 4:
Water is pumped by OV-2 from V4 into cylinder #4, both Exhaust and Air ports of which are also closed. Thus, cylinder #4 undergoes the compression phase.

Upon completion of these phases, the water valve for cylinder 4 closes and a fuel is introduced into this cylinder so it auto-ignites. After a short delay, the water valve is reopened, and the pressure drives the OV-2. At this point, cylinder #1 undergoes compression, cylinder #2 undergoes exhaust, cylinder #3 undergoes intake, and cylinder #4 undergoes expansion. The descriptions for each stroke are the same as above, the only difference being which cylinder is in a given stroke. The process continues, and each cylinder undergoes the intake, compression, combustion/expansion, and exhaust strokes in turn. The net result of this system is an oscillating shaft, driven by A-1 or A-2. To be useful for generating rotational motion, an Oscillatory-to-Rotary (O-2-R) converter is used as will be described later in this application.

Implementation of Liquid Piston Engine Using Separated Compression and Expansion Chambers Separated compression and expansion chambers' is a modification of the engine design discussed above. It is also based on a liquid piston design, but employs separated compression and expansion chambers. This design employs two combustion chambers located within two intake/exhaust valves. The construction of this engine is similar to the 4-valve liquid piston based ICE, shown in FIGS. 3 and 6, with the main exceptions being that there are no water valves and the air/exhaust valves are combined with the combustion chamber. The resulting design is shown in FIGS. 7 to 11.

Figure 7:
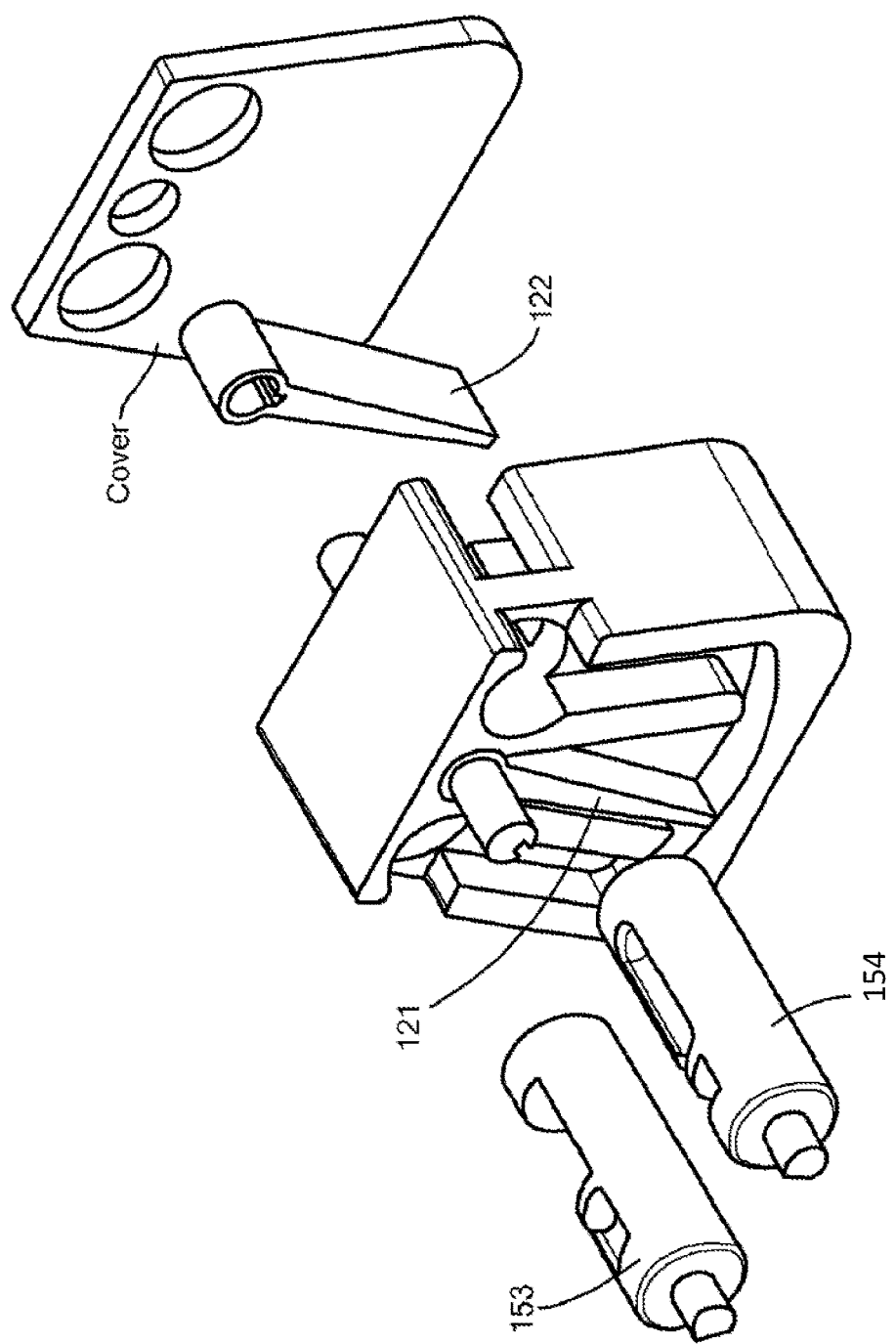
FIGS. 7 and 8 depicts a liquid-piston based HCCE with standalone combustion chambers.
Figure 8:
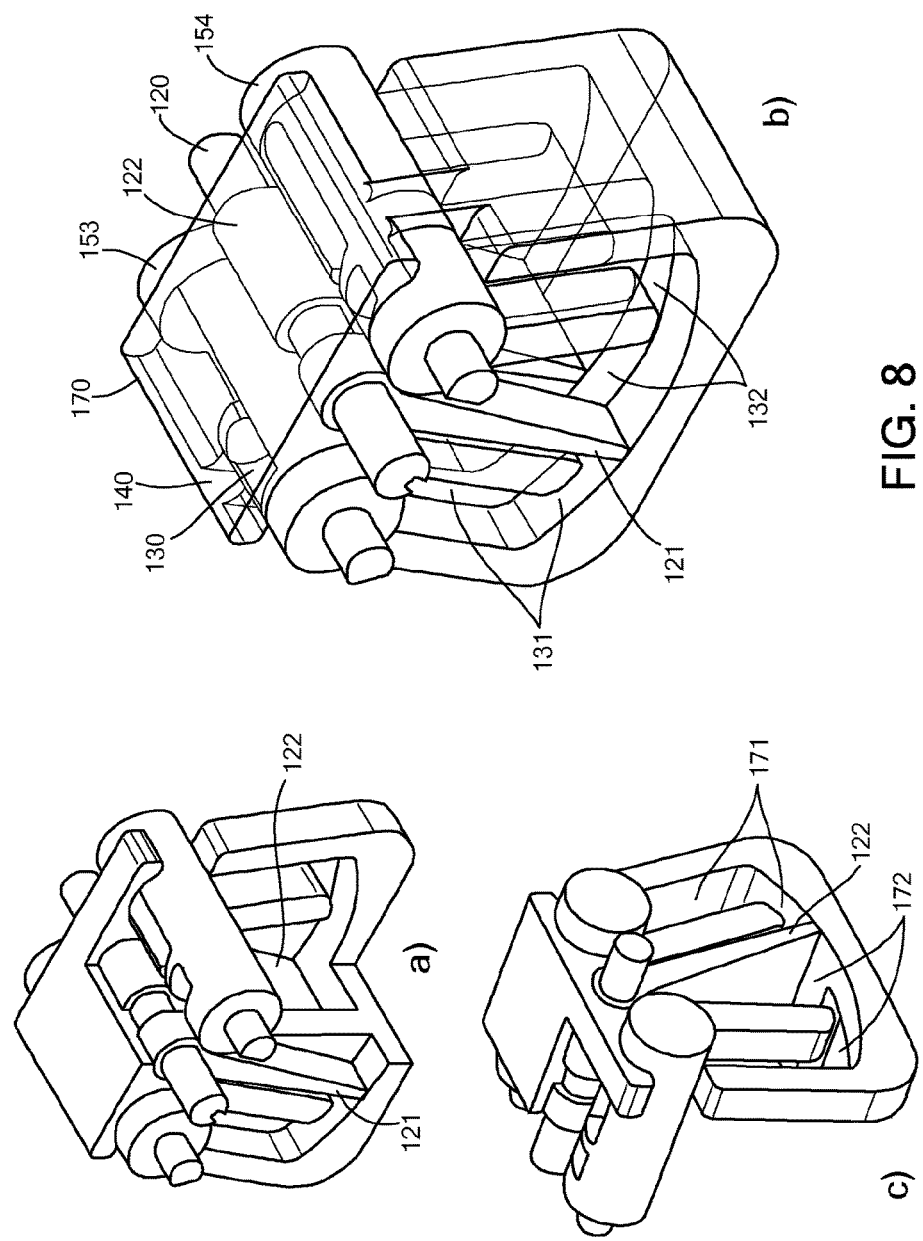
Figure 9:
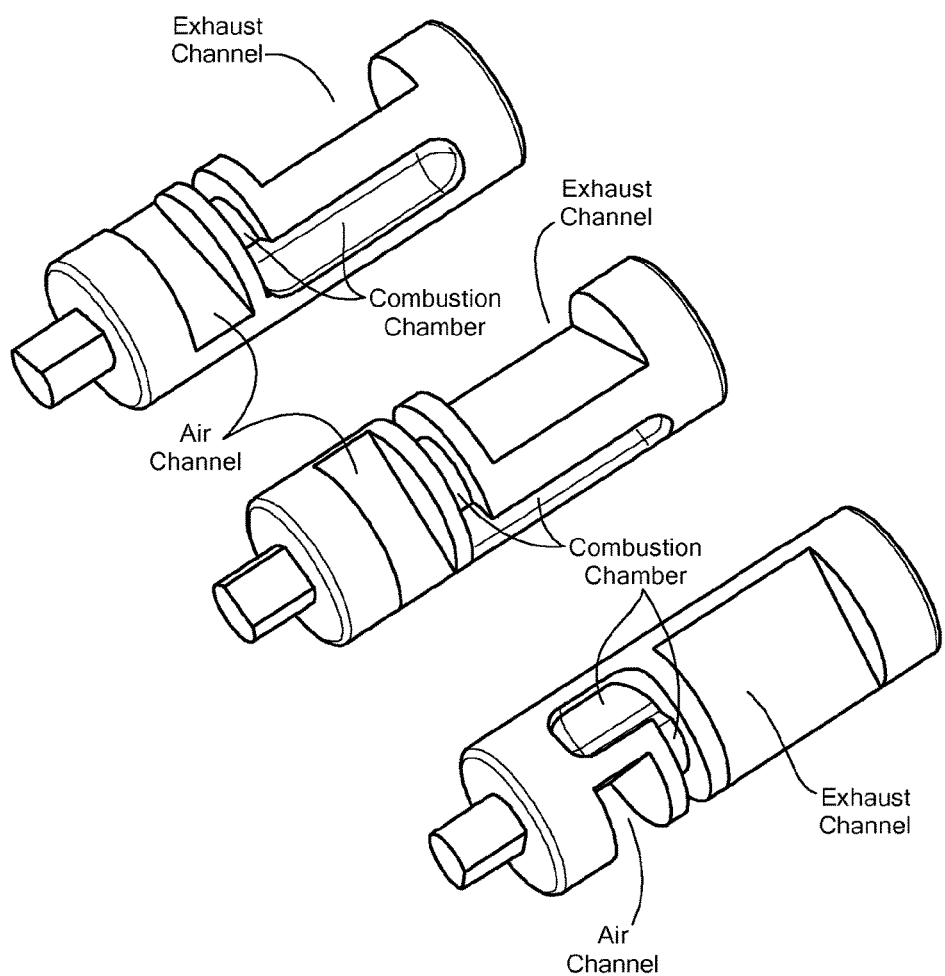
FIG. 9 depict combustion chamber/exhaust/intake valve of the HCCR according to one embodiment of the invention.
Figure 10:
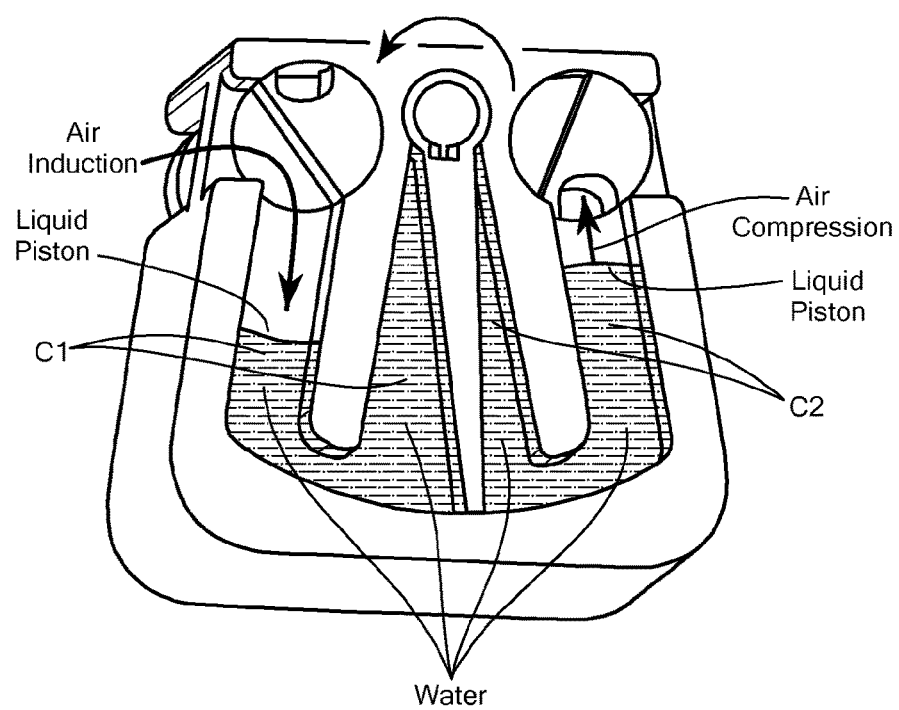
FIG. 10 depicts details of operation of the liquid-piston based HCCE with standalone combustion chambers.
Figure 11:
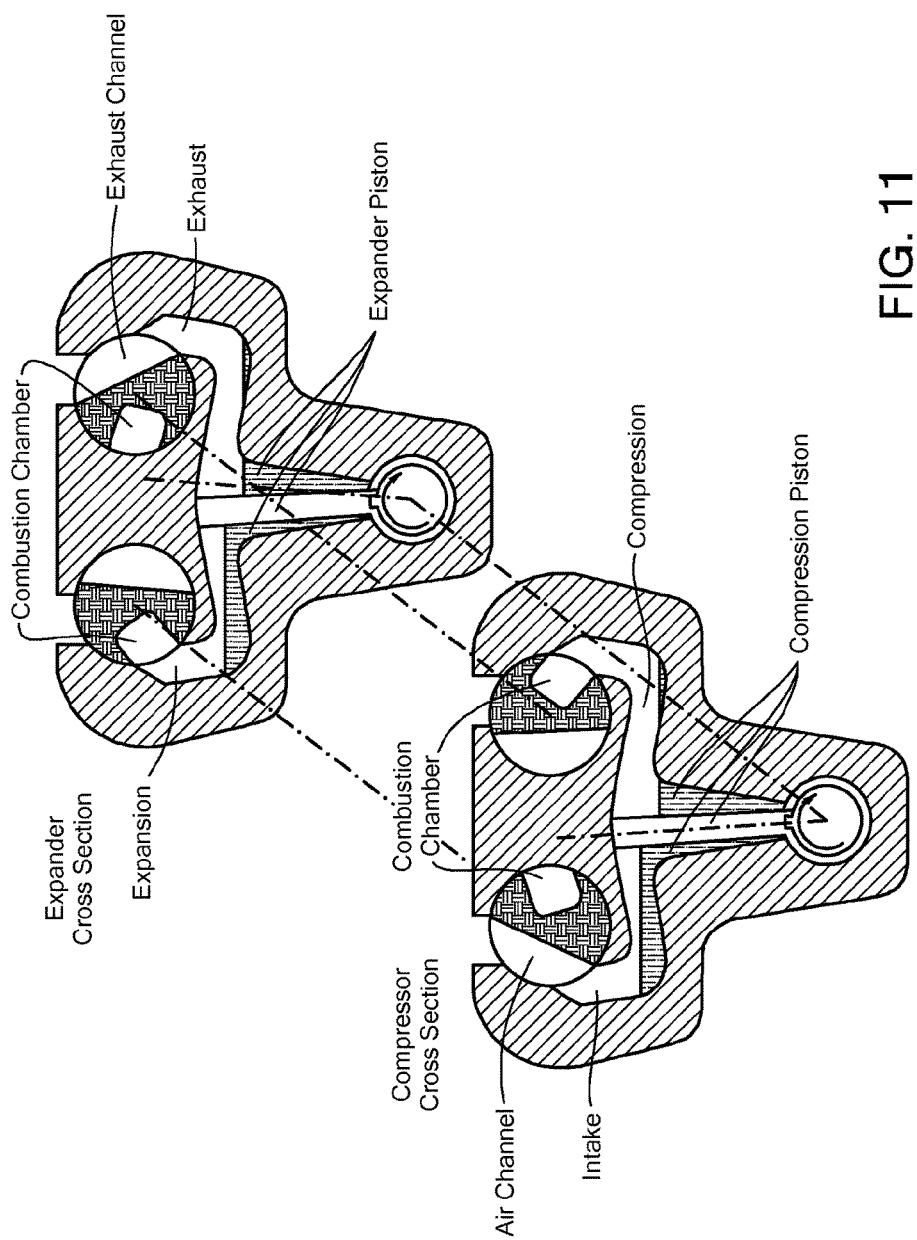
FIG. 11 depicts an exemplary modification of the liquid-piston based HCCE with standalone combustion chambers.
Figure 12:
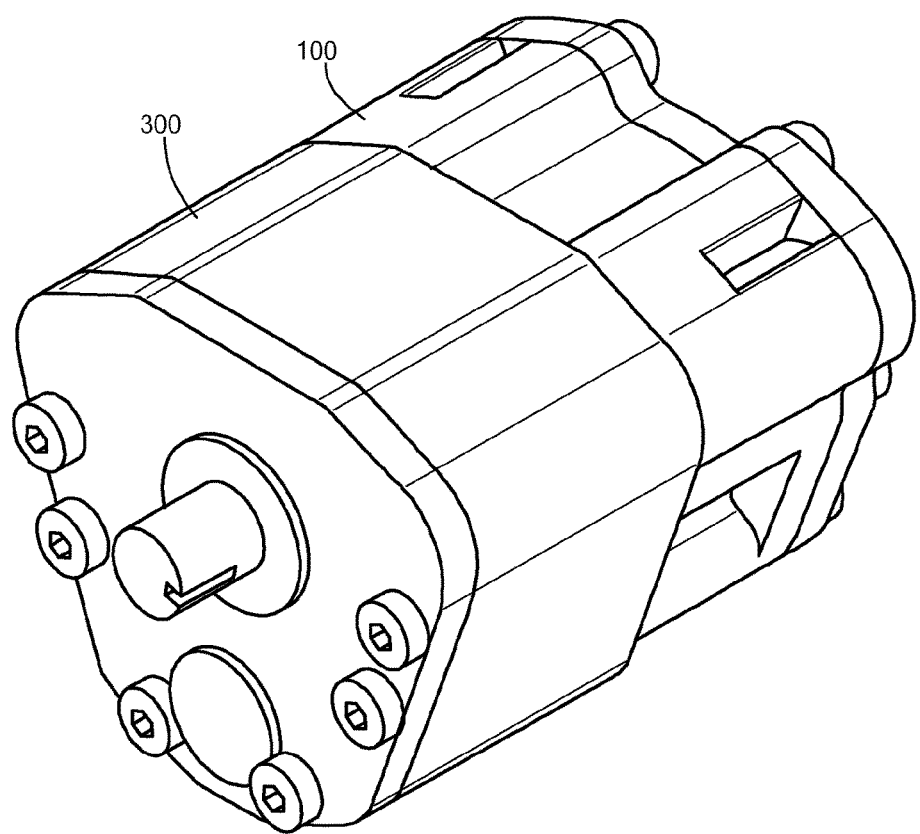
FIGS. 12-20 depict various embodiments of the HCCE in which the amount of liquid can be made arbitrarily small.
Figure 13:
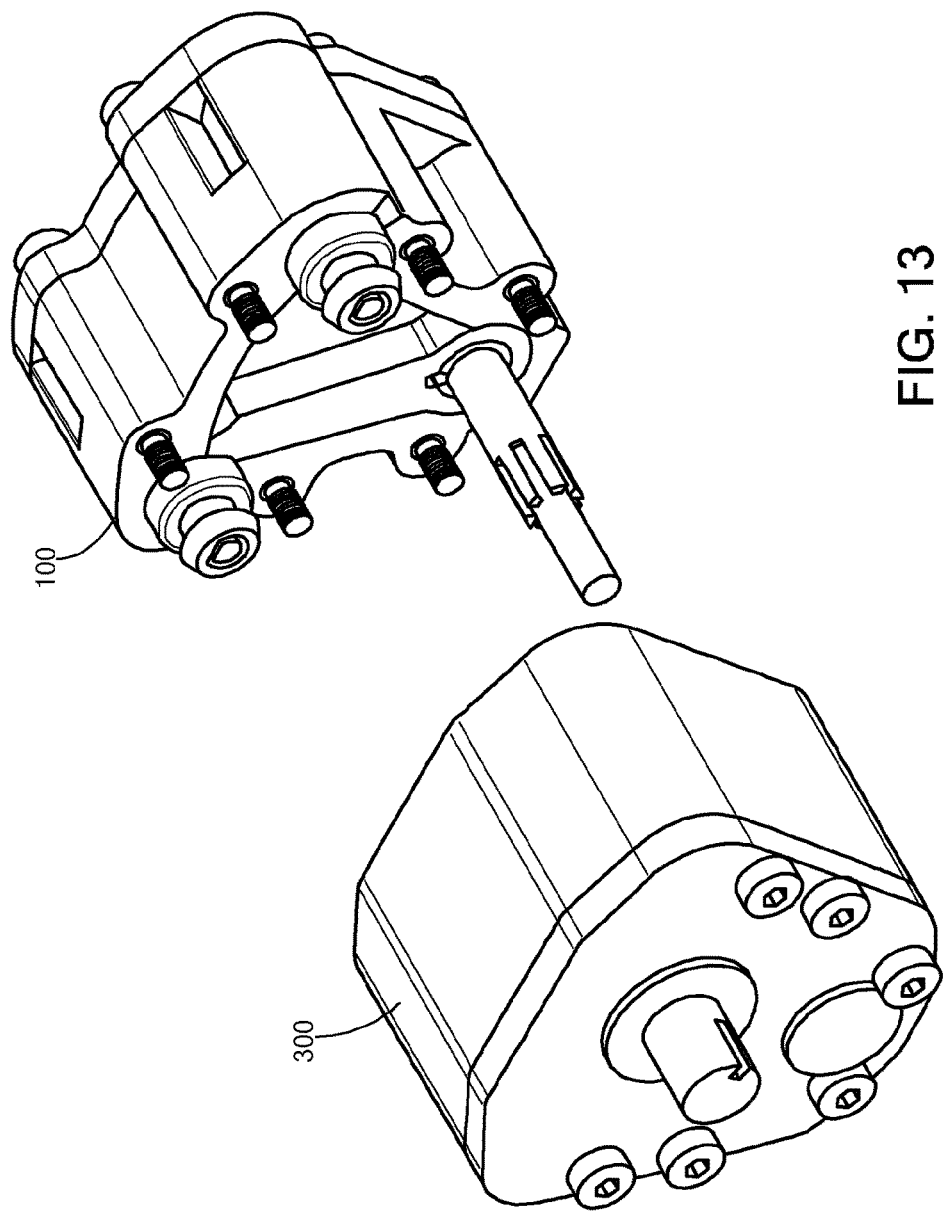

FIG. 7 presents an exploded view of the Power Generation Module (PGM) of a 4-stroke HCCE engine, while FIG. 8 shows specific details of components. Further description will refer, unless otherwise indicated, to FIG. 7 and FIG. 8. In various embodiments, PGM 100 of this engine includes a. an engine body that includes the compressor body 130, a separator 140, and the expander body 170;
b. a compression piston 121—a solid body, surrounded in whole or in part by liquid (water, in simplest case), see FIG. 10. The piston 121, separates air cavity into compression chamber 131, and compression chamber 132, and moves in oscillatory motion between these compression chambers;
c. an expansion piston 122—a solid body, surrounded in whole or in part by liquid. The piston 122 separates exhaust cavity into expander chamber 171 and expander chamber 172, and moves in oscillatory motion within this expansion cavity.
d. oscillating shaft, 120 which mechanically couples compression piston 121 to expansion piston 122;
e. two air/exhaust valves: left valve 153 and right valve 154. Each valve contains an air channel, which allows fresh air to enter the compression chamber and/or exhaust channel, which allows combustion products to exit the expansion chamber. Each valve also contains combustion chambers 133, 134, correspondingly). Left and right valves are mirror images of each other and, during the operation, rotate in opposite directions. The details of the right valve are shown in FIG. 9;
f. two compression chambers 131 and 132, each of which is formed by the space between the compressor body 130, compression piston 121, and either the body of the valve 153,154, or body of combustion chamber 133/134, or both; and
g. two expansion chambers 171 and 172, each of which is formed by the space between the expander body 170, expansion piston 122, and either the body of the valves 153, 154 or body of combustion chamber 133,134, or both.
h. Covers, bearings and bolts are not shown;

Liquid (water) partially fills each compression and/or expansion chamber. The surface of the liquid exposed to air or exhausts represents a Liquid Piston (FIG. 10).

The compressor volume, which is the sum of the volumes of compression chambers 131 and 132, denoted $V_{131}+V_{132}$, is separate from expansion volume, $V_{171}+V_{172}$; expansion volume is larger than compression volume, in our case 2.5 times. Depending upon the position of the compression piston 121, the volumes of compression chambers $V_{131}$ and $V_{132}$ vary from $V_{Intake}$, maximum volume during initial phase of intake stroke, to zero at the end of intake stroke. The volumes of compression chambers 131 and 132 are complementary, i.e., $V_{131}+V_{132}=V_{Intake}$.

Similarly, depending upon position of expansion piston 122, the volumes of expansion chambers $V_{171}$ and $V_{172}$ vary from $V_{Exhaust}$, during initial phase of exhaust stroke to zero. The volumes of expansion chambers 171 and 172 are complementary, i.e., $V_{171}+V_{172}=V_{Exhaust}$.

Operation

The expansion piston 122, driven by combustion products, expanding in expansion chamber 171 (acting as a hydraulic motor), rotates oscillating shaft, 120. Simultaneously, 122 exhausts from expansion chamber 172 already expanded combustion products, (expander's piston 122, pushes water out, acting as a pump). Thus, expander's piston 122 is used to serve as both a hydraulic motor and pump. At the same time, the compression piston 121, driven by the oscillating shaft 120, compresses fresh air in compression chamber 132, while inducting air into compression chamber 131, in both cases compressor's piston 121, is acting as a pump. Oscillating shaft 120, is driven by expansion piston 122, in the beginning of expansion stroke and by a flywheel (not shown) which could be attached either to oscillating shaft 120, or to the output shaft of PCM.

Figure 22:
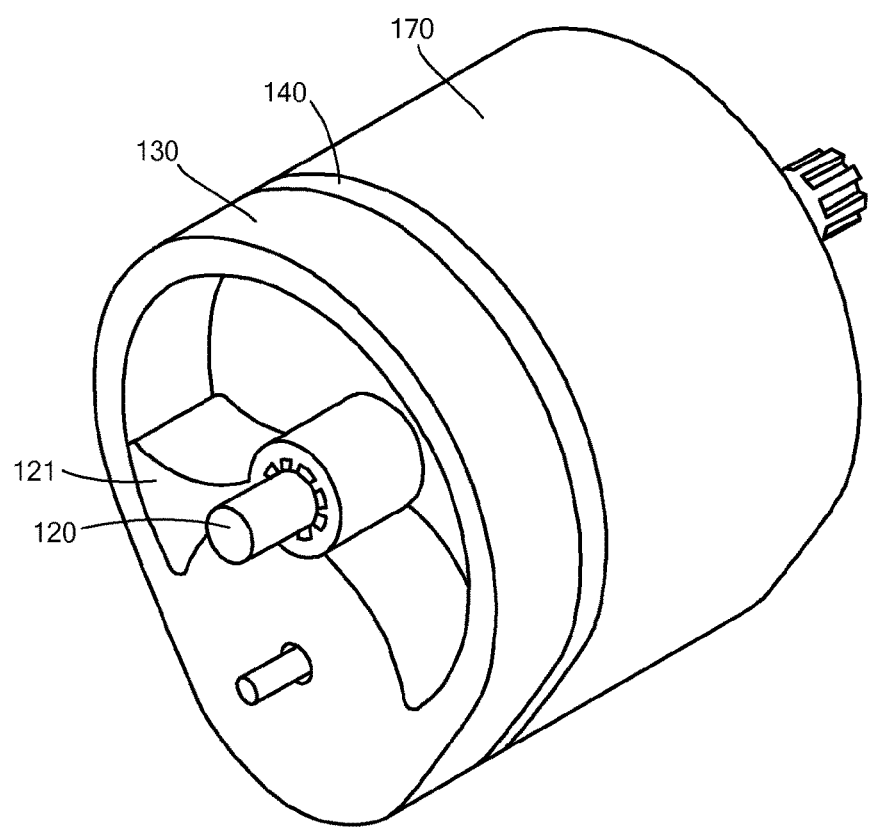
Figure 23:
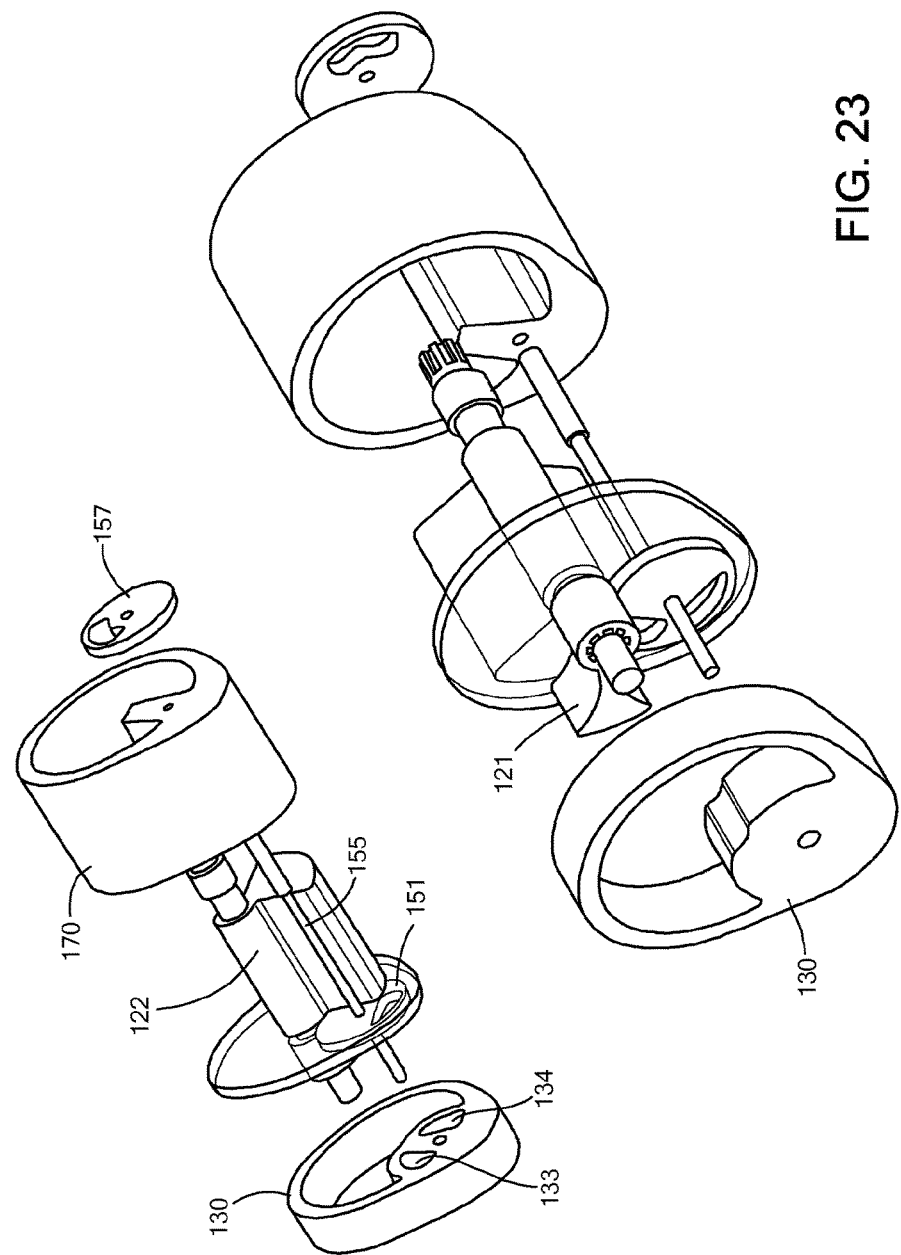

To further explain the operation of the engine, it is necessary to conduct a closer examination of operation of valves. Since valve operation in many instances is similar in various engine designs and with the purpose of conserving space, we will refer to FIG. 22, for positioning of pistons and valves, in spite of the fact that this Figure relates to a different engine design. The operation of the engine is as follows:

Position 1

Both pistons 121 and 122 are in extreme left positions, starting to rotate clockwise. $V_{131}=0$, $V_{132}=V_{Intake}$, $V_{171}=0$, $V_{172}=V_{Exhaust}$;

The left air/exhaust valve 153 is stationary and in such position that the air intake port of compressor chamber 131 is open. Fresh air will be inducted into the compressor chamber 131 when the compression piston, 121 will start moving, thus, the compressor chamber 131 will begin the intake stroke.

The exhaust port of expander chamber 132 is closed. Combustion has just been completed and combustion chamber volume is connected to expansion chamber 171. Combustion products will be expanding into the expansion chamber 171 when the expansion piston 122 starts moving, thus, the volume 171 will begin the expansion stroke.

The left air/exhaust valve 153 is stationary and in such position that the air intake port of compressor chamber 132 is closed. The air, already contained in the compressor chamber 132, will be compressed when the compression piston 121 starts moving, thus, the compressor chamber 132 will start the compression stroke.

The exhaust port of compressor chamber 132 is open. Already expanded combustion products will be exhausted from expansion chamber 172 when the expansion piston 122, starts moving, thus, expansion chamber 172 will start the exhaust stroke.

Position 2

Both pistons 121 and 122, have just arrived to their extreme right positions. $V_{131}=V_{Intake}$, $V_{132}=0$, $V_{171}=0$, $V_{172}=V_{Exhaust}$;

Both valves are stationary and in the same position as above.

compression chamber 131 has completed the intake stroke, and pressure therein is close to ambient.
  expansion chamber 171 has completed the expansion stroke. Pressure in the combustion chamber of left valve, 153, and expansion chamber 171 is close to ambient.
  expansion chamber 172 has completed the exhaust stroke. There are no exhausts in expansion chamber 172, as its volume is zero.
  compression chamber 132 has completed the compression stroke. There is no air in compression chamber 132, as its volume is zero. Hot compressed air is in the compression chamber within the right valve 154.

Position 3

Both pistons 121 and 122 are momentarily stationary, in extreme right position. $V_{131}=V_{Intake}$, $V_{132}=0$, $V_{171}=0$, $V_{172}=V_{Exhaust}$;

The left air/exhaust valve 153 is rotated 180 degrees. In the process of rotation the following occurs: combustion chamber begins exposed to ambient air. At the end of 180 degrees rotation it is disconnected from the ambient air and aligned with compression chamber 131. It is ready for compression stroke. At the end of 180 degrees rotation, the exhaust channel is aligned with expansion chamber 171 and is ready for exhaust stroke.

The right air/exhaust valve 154 is rotated 180 degrees. In the process of rotation the following occurs: combustion chamber 134 passes through a cavity within the compressor body, 130, which contains gaseous fuel under low pressure. Hot, due to compression, air is mixed with the gaseous fuel and because its temperature is above the auto-ignition temperature of the fuel, a spontaneous combustion occurs. Optionally, water could be inserted into combustion chamber (before, during or after ignition). Rotation of air/exhaust valve takes sufficiently long time for combustion to complete. At the end of rotation, the combustion chamber 134 is connected to expansion chamber 172, while air port on 132 opens (i.e. compression chamber 132 is exposed to ambient air). Expansion chamber 172 is ready to start expansion stroke, while compression chamber 132 is ready to start intake stroke.

Position 4

Both pistons 121 and 122 are in extreme left position, starting to rotate counterclockwise. $V_{131}=0$, $V_{132}=V_{Intake}$, $V_{171}=0$, $V_{172}=V_{Exhaust}$;

Both valves are stationary and in the same position as above.

- compression chamber 131 has completed the compression stroke. There is no air in compression chamber 131, as its volume is zero. Hot compressed air is in the compression chamber within the left valve 153.
- expansion chamber 171 has completed the exhaust stroke. There are no exhausts in expansion chamber 171 as its volume is zero.
- compression chamber 132 has completed the intake stroke, and pressure therein is close to ambient.
- expansion chamber 171 has completed the expansion stroke. Pressure in the combustion chamber 133, of left valve 153, and expansion chamber 171 is close to ambient.

Transition from Position 4 to Position 1

Both pistons 121 and 122 are momentarily stationary, in extreme left position. $V_{131}=0$, $V_{132}=V_{Intake}$, $V_{171}=0$, $V_{172}=V_{Exhaust}$;

The left Air/Exhaust valve 153, is rotated 180 degrees. In the process of rotation the following occurs: combustion chamber 133, passes through the cavity within the body, B, which contains gaseous fuel under low pressure. Hot, due to compression, air is mixed with the gaseous fuel and because its temperature is above the auto-ignition temperature of the fuel, a spontaneous combustion occurs. Optionally, water could be inserted into combustion chamber (before, during or after ignition). Rotation of air/exhaust valve takes sufficiently long time for a complete combustion to occur. At the end of rotation, the combustion chamber 133, is connected to expansion chamber 171, while air port on compression chamber 131 opens (i.e. compression chamber 131 is exposed to ambient air). Expansion chamber 171 is ready to start expansion stroke, while 131 is ready to start intake stroke.

The right air/exhaust valve 154 is rotated 180 degrees. In the process of rotation the following occurs: combustion chamber begins exposed to ambient air. At the end of 180 degrees rotation it is disconnected from the ambient air and aligned with compression chamber 132. It is ready for compression stroke. At the end of 180 degrees rotation, the exhaust channel is aligned with expansion chamber 172 and is ready for exhaust stroke. Note that combustion, and therefore expansion, occurs on every swing of the oscillating shaft 120.

Implementations of HCCE described above results in the following benefits:

- compressing air, rather than air/fuel mixture, allows for a very high compression ratio (15 to 30+). Fuel is introduced separately into the combustion chamber;
- optionally injecting water into a compression chamber during the compression stroke lowers the work required to compress the air and brings the process closer to isothermal compression;
- a separate, constant volume combustion chamber allows for isochoric combustion. If water is added to the combustion chamber before combustion is complete, then, combustion will occur under the condition of reduced volume (due to evaporating water), which is even more efficient than isochoric combustion. This water also lowers the temperature of gases in the combustion chamber, which lowers the emission levels of NOx, and allows for lower grade materials that could be used for construction of the engine;
- there is additional pressure during expansion, due to steam formed during the combustion and expansion processes; and
- exhaust pressure is low because the expansion volume is larger, 2 to 5 times than the intake volume, which is easily accomplished because the expander is separate from the compressor.
- Energy Recovery System can be implemented as described herein Modifications To conserve on amount of liquid needed for proper operation of this engine as well as total volume of the engine, it is possible to use modification shown on FIG. 11. Also, various other shapes and forms of combustion chamber, expansion chamber, valves, pistons (for example, pistons 121,122 may have different shapes from each other), etc. are possible, which do not change the spirit of the invention.

Oscillating Piston, V-Configuration

Figure 14:
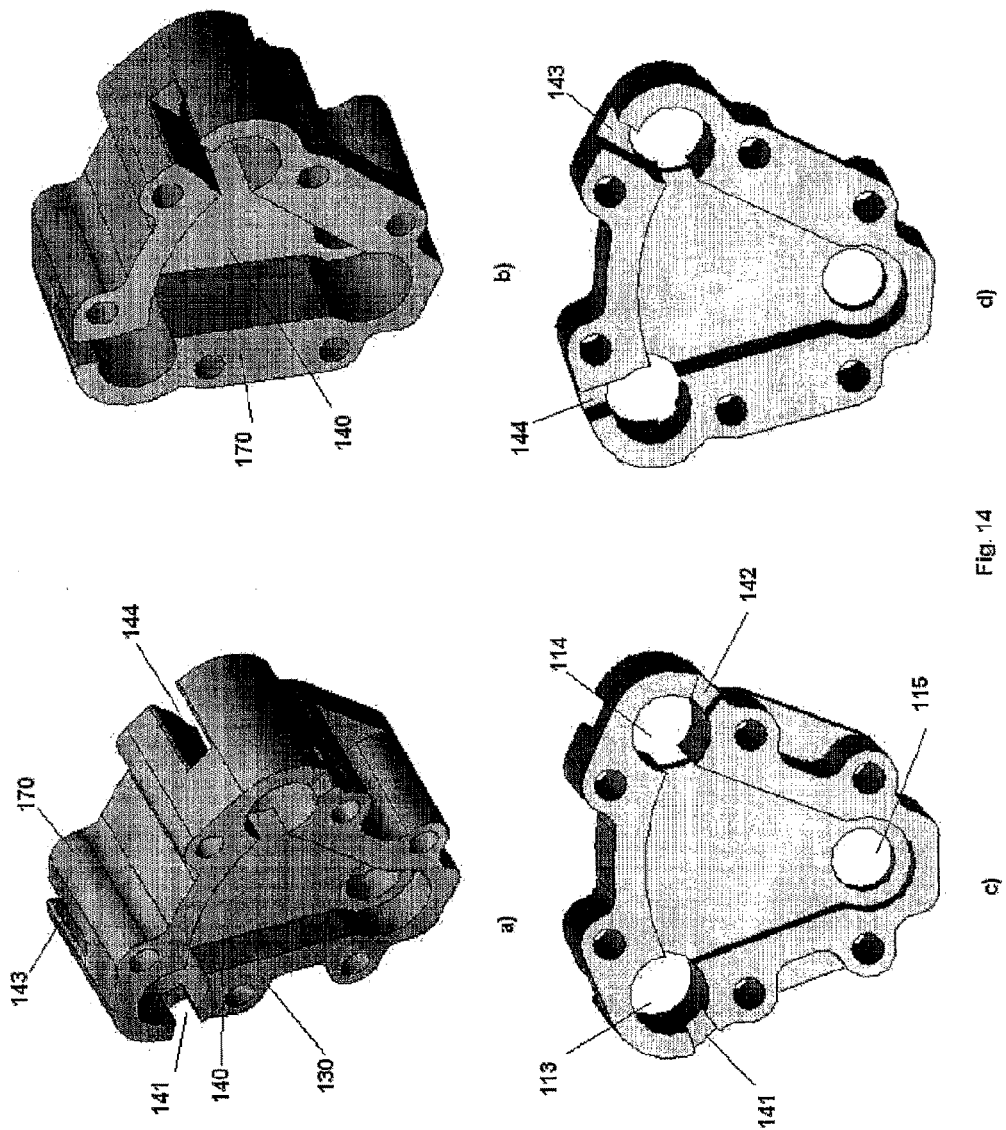
Figure 15:
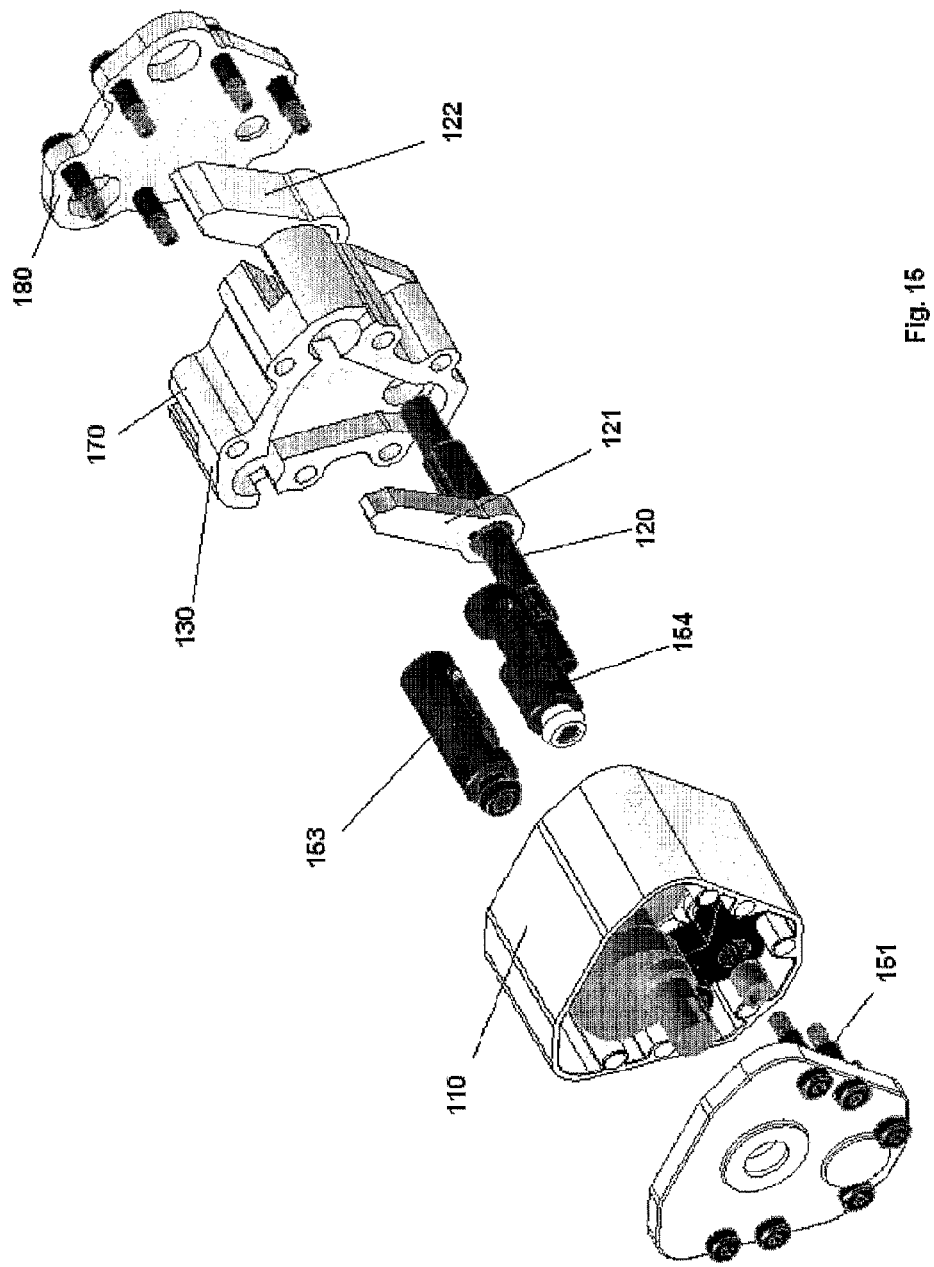
Figure 16:
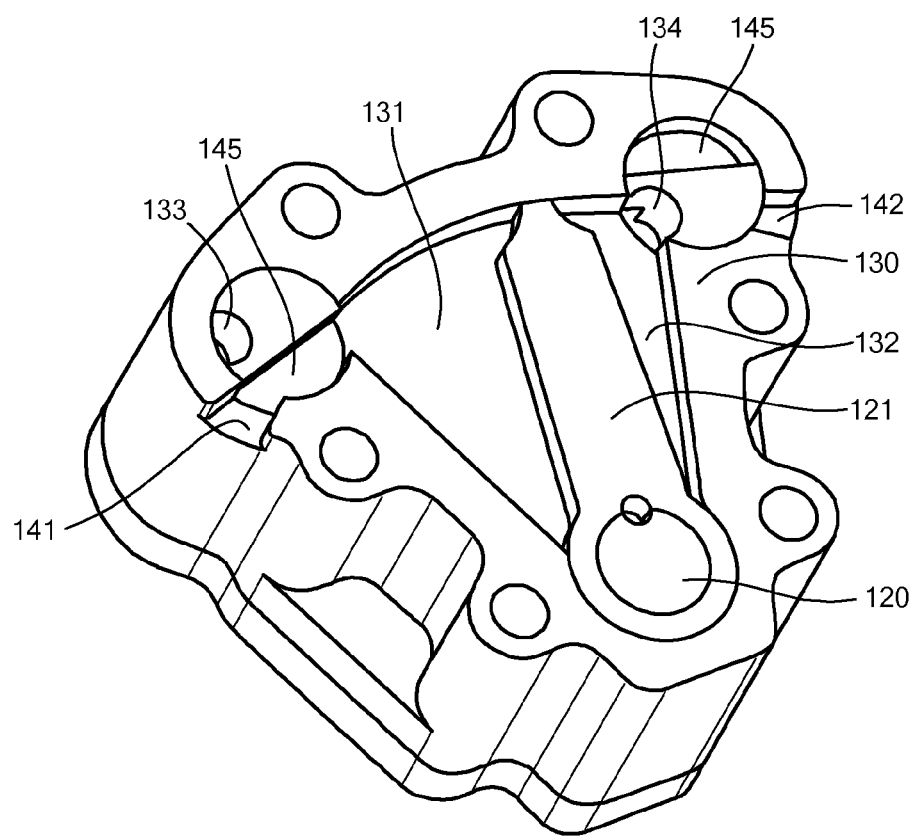
Figure 17:
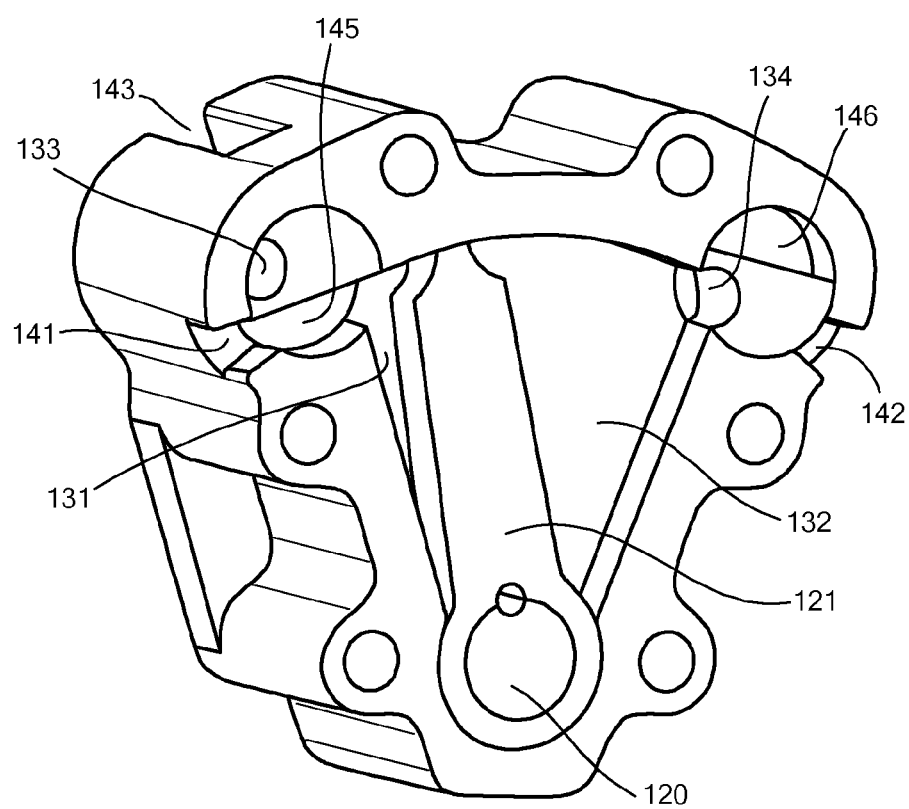

The embodiments shown in FIGS. 12-20 may be implemented with or without water. FIG. 15 presents an exploded view of a 4 cylinder, 4-stroke HCCE engine. Shown in FIGS. 16 and 17 are the details of some components, which are important for understanding the engine's operation. Further description will refer, unless otherwise indicated, to FIG. 17. In this engine the expander volume ($V_{C3}+V_{C4}$) is separate from, and larger than, the compressor volume ($V_{131}+V_{132}$).

Figure 18:
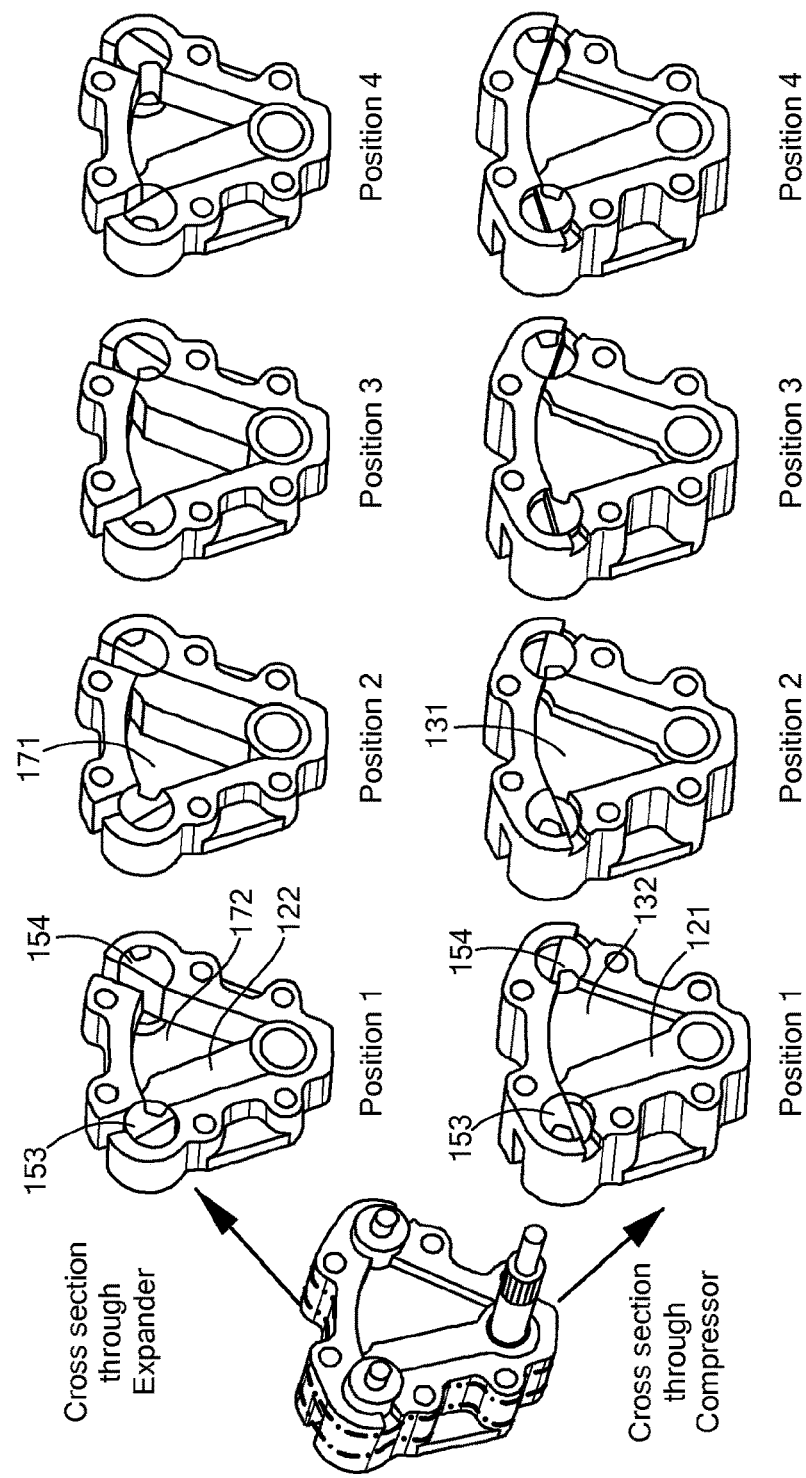
Figure 19:
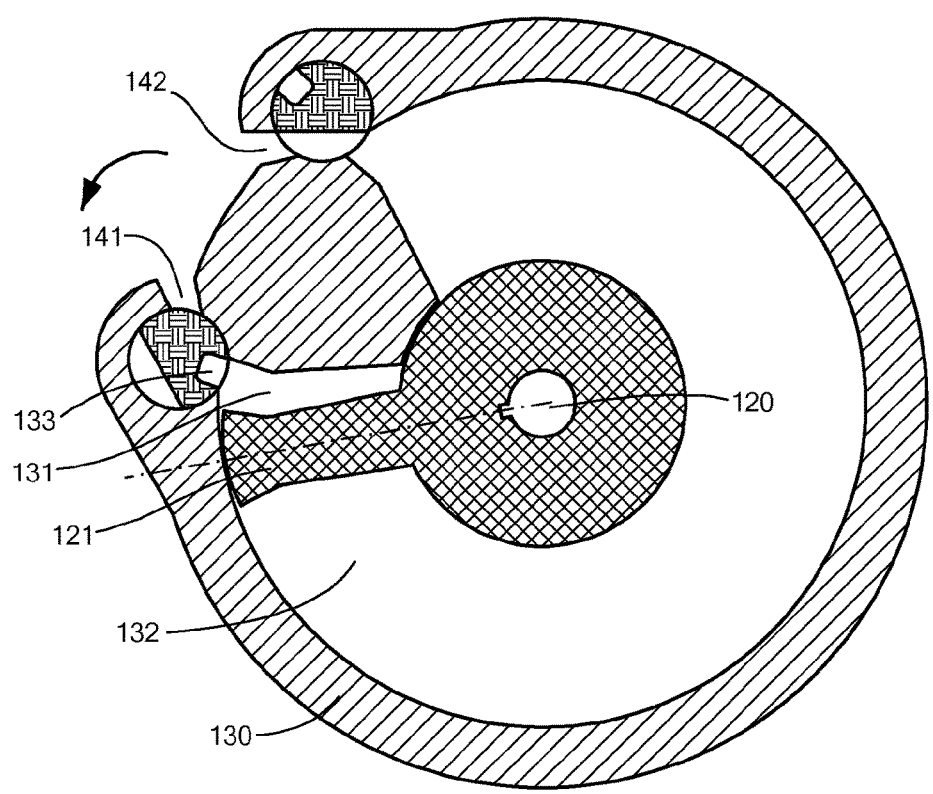

Referring to FIGS. 14 and 15, in one embodiment, PGM 100 includes:

- The engine body including the compressor body 130, a separator 140, and the expander body 170;
- compression piston 121—a solid body, optionally surrounded in whole or in part by liquid (water, in a particular embodiment). The piston 121, separates air cavity into compression chamber 131 and compression chamber 132, and moves in oscillating motion within air cavity;
- expansion piston 122—a solid body, optionally surrounded in whole or in part by liquid. The piston 122, separates exhaust cavity expander chamber 171, and expander chamber 172, and moves in oscillating motion within the exhaust cavity;

oscillating shaft 120, which mechanically couples piston 121 to piston 122;

Two air/exhaust valves: left valve 153 and right valve 154. Each valve contains an air channel 145, which allows fresh air to enter the compression chamber and/or exhaust channel 146, which allows combustion products to exit the expansion chamber. Each valve also contains a combustion chamber (133 and 134, correspondingly). Left and right valves are mirror images of each other and, during the operation, rotate in opposite directions. The details of the left valve are shown in FIG. 9;

Two compression chambers 131 and 132, each of which is formed by the space between the compressor body 130, compression piston 121, and either the body of the valve 153/154 or body of combustion chamber 133/134, or both;

Two expansion chambers 171 and 172, each of which is formed by the space between the expander body 170, expansion piston 122, and either the body of the valve 153/154 or body of combustion chambers 133,134), or both;

Covers 180 and 110, held to body with bolts 151;

The engine body (130,140,170), FIGS. 14 and 16, is a solid part with a number of features: compression chamber 131, compression chamber 132; two cylindrical openings (113 and 114) for left and right air/exhaust valves; cylindrical opening (115) for shaft (120); two air intake ports (141) and (142), two exhaust ports (143) and (144), and optional fuel and water channels (not shown) located inside of 113 and 114 within the body of the engine.

compression piston 121 moves within air compressor cavity, as shown in FIG. 18, while exhaust piston 122 moves within exhaust expansion cavity. Both pistons are coupled via the oscillating shaft 120 and, therefore, move synchronously together.

Oscillating shaft 120, FIG. 15, has spline, which matches groves on the compression piston 121 and exhaust piston 122, as well as another spline which allows coupling to PCM (300).

Valve (154) is a mirror image of valve (153), FIG. 15, is a cylindrical body with air channel (145), exhaust channel (146) and combustion chamber cavity (133 or 134).

Depending upon the position of the compression piston 121, the volumes of compression chambers $V_{131}$ and $V_{132}$ vary from $V_{Intake}$, maximal volume during initial phase of intake stroke, to zero at the end of intake stroke. The volumes of compression chambers 131 and 132 are complementary, i.e., $V_{131}+V_{132}=V_{intake}$. Similarly, depending upon position of expansion piston 122, the volumes of expansion chambers $V_{171}$ and $V_{172}$ vary from $V_{Exhaust}$, during initial phase of Exhaust stroke, to zero. The volumes of expansion chambers 171 and 172 are complementary, i.e., $V_{171}+V_{172}=V_{Exhaust}$.

Operation

The expansion piston 122 driven by combustion products, expanding in expansion chamber 171, rotates oscillating shaft 120. Simultaneously, expansion piston 122 exhausts from expansion chamber 172 already expanded combustion products. At the same time, the compression piston 121, driven by the oscillating shaft 120, compresses fresh air in compression chamber 132, while inducting air into compression chamber 131.

Referring to FIG. 18, the operation of the engine is as follows:

Position 1

Both pistons, compression piston 121, and expansion piston 122, are in extreme left position, starting to rotate clockwise. $V_{131}=0$, $V_{132}=V_{intake}$, $V_{171}=0$, $V_{172}=V_{Exhaust}$;

The left air/exhaust valve 153 is stationary and in such position that air intake port of compression chamber 131 is open. Fresh air will be inducted into compression chamber 131 when the compression piston 121, will start moving, thus, compression chamber 131 will begin the intake stroke.

The exhaust port of compression chamber 132 is closed. Combustion has just been completed and combustion chamber volume is connected to expansion chamber 171. Combustion products will be expanding into expansion chamber 171 when the expansion piston 122 starts moving, thus, expansion chamber 171 will begin the expansion stroke.

The right air/exhaust valve 154 is stationary and in such position that air intake port of compressor chamber 132 is closed. The air, already contained in the compression chamber 132, will be compressed when the compression piston 121 starts moving, thus, the compression chamber 132 will start the compression stroke.

The exhaust port of compression chamber 132 is open. Already expanded combustion products will be exhausted from expansion chamber 172 when the expansion piston 122, starts moving, thus, expansion chamber 172 will start the exhaust stroke.

Position 2

Both pistons 121 and 122, have just arrived to their extreme right positions. $V_{131}=V_{Intake}$, $V_{132}=0$, $V_{171}=0$, $V_{172}=V_{Exhaust}$;

Both valves are stationary and in the same position as above.

compression chamber 131 has completed the intake stroke. Pressure in the 131 is close to ambient.

expansion chambers 171 has completed the expansion stroke. Pressure in the combustion chamber of left valve, 153, and expansion chamber 171 is close to ambient.

expansion chambers 172 has completed the exhaust stroke. There are no exhausts in 172, as its volume is zero.

compression chamber 132 has completed the compression stroke. There is no air in 132, as its volume is zero. Hot compressed air is in the compression chamber within the right valve, 154.

Position 3

Both pistons, compression piston 121, and expansion piston 122, are momentarily stationary, in extreme right position. $V_{131}=V_{Intake}$, $V_{132}=0$, $V_{171}=0$, $V_{172}=V_{Exhaust}$;

The left air/exhaust valve, 153, is rotated 180 degrees. In the process of rotation the following occurs: combustion chamber begins exposed to ambient air. At the end of 180 degrees rotation it is disconnected from the ambient air and aligned with 131. It is ready for compression stroke. At the end of 180 degrees rotation the Exhaust channel is aligned with 171 and is ready for exhaust stroke.

The right air/exhaust valve 154, is rotated 180 degrees. In the process of rotation the following occurs: combustion chamber passes through a cavity (not shown) within the compressor body 130, which contains gaseous fuel under low pressure. Hot, due to compression, air is mixed with the gaseous fuel and because its temperature is above the auto-ignition temperature of the fuel, a spontaneous combustion occurs. Optionally, water could be inserted into combustion chamber (before, during or after ignition). Rotation of air/exhaust valve takes sufficiently long time for a complete combustion to occur. At the end of rotation, the combustion chamber is connected to expander chamber 172 while air port on compression chamber 132, opens (i.e. compression chamber is exposed to ambient air). Expander chamber 172, is ready to start expansion stroke, while compression chamber 132 is ready to start intake stroke.

Position 4

Both pistons, compression piston 121 and expansion piston 122, are in extreme left position, starting to rotate counterclockwise. $V_{131}=0$, $V_{132}=V_{Intake}$, $V_{171}=0$, $V_{172}=V_{Exhaust}$; Both valves are stationary and in the same position as above.

compression chamber 131 has completed the compression stroke. There is no air in 132, as its volume is zero. Hot compressed air is in the compression chamber within the left valve, 153.

expansion chamber 171 has completed the exhaust stroke. There are no exhausts in 171, as its volume is zero.

compression chamber 132 has completed the intake stroke. Pressure in 132 is close to ambient.

expansion chamber 171 has completed the expansion stroke. Pressure in the combustion chamber of left valve, 153, and expansion chamber 171 is close to ambient.

Transition from Position 4 to Position 1

Both pistons, compression piston 121, and expansion piston 122, are momentarily stationary, in extreme left position. $V_{131}=0$, $V_{132}=V_{Intake}$, $V_{171}=0$, $V_{172}=V_{Exhaust}$; The left air/exhaust valve, 153, is rotated 180 degrees. In the process of rotation the following occurs:

Combustion chamber passes through the cavity within the body, 130, which contains gaseous fuel under low pressure. Hot, due to compression, air is mixed with the gaseous fuel and because its temperature is above the auto-ignition temperature of the fuel, a spontaneous combustion occurs. Optionally, water could be inserted into combustion chamber (before, during or after ignition). Rotation of air/exhaust valve takes sufficiently long time for a complete combustion to occur. At the end of rotation, the combustion chamber is connected to expansion chamber 171, while air port on compression chamber 131 opens (i.e. compression chamber 131 is exposed to ambient air). Expansion chamber 171 is ready to start expansion stroke, while compression chamber 131 is ready to start intake stroke.

The right air/exhaust valve, 154, is rotated 180 degrees. In the process of rotation the following occurs: combustion chamber is being exposed to ambient air. At the end of 180 degrees rotation it is disconnected from the ambient air and aligned with 132. It is ready for compression stroke. At the end of 180 degrees rotation, the exhaust channel is aligned with expansion chamber 172 and is ready for exhaust stroke. Note that combustion, and therefore expansion, occurs on every swing of the oscillating shaft 120.

Implementations of HCCE described above results in the following benefits:

Compressing air, rather than air/fuel mixture, allows for a very high compression ratio (15 to 30+). Fuel is introduced separately into the combustion chamber.

Optionally injecting water into a compression chamber (131 or 132) during the compression stroke lowers the work required to compress the air and brings the process closer to isothermal compression.

A separate, constant volume combustion chamber allows for isochoric combustion. If water is added to the combustion chamber before combustion is complete, then, combustion will occur under the condition of reduced volume (due to evaporating water), which is even more efficient than isochoric combustion. This water also lowers the temperature of gases in the combustion chamber, which lowers the emission levels of NOx, and allows for lower grade materials that could be used for construction of the engine.

There is additional pressure during expansion, due to steam formed during the combustion and expansion processes.

Exhaust pressure is low because the expansion volume is larger, 2 to 5 times than the intake volume, which is easily accomplished because the expander is separate from the compressor.

Energy Recovery System can be implemented as described herein

Modifications

The engine described above, may have numerous implementations as well. Some of them obvious, such as various other shapes and forms of combustion chamber (i.e. close to semi-spherical, which decreases the surface to volume ratio, which in turn reduces heat losses from combustion chamber), expansion chamber, valves, pistons (121 shape does not has to be the same as 122 shape), etc., which do not change the spirit of the design. For example, the piston angular travel may change in wide range, as could be seen from FIG. 19. Having both valves in close proximity to each other could simplify the implementation of PCM, as they rotate in opposite sense to each other. Therefore, connecting both valves via a gear pair of equal diameter, would allow one to apply the required motion to one valve only—the second one will automatically rotate in opposite sense. In addition, such geometry would allow having higher power density.

Figure 20:
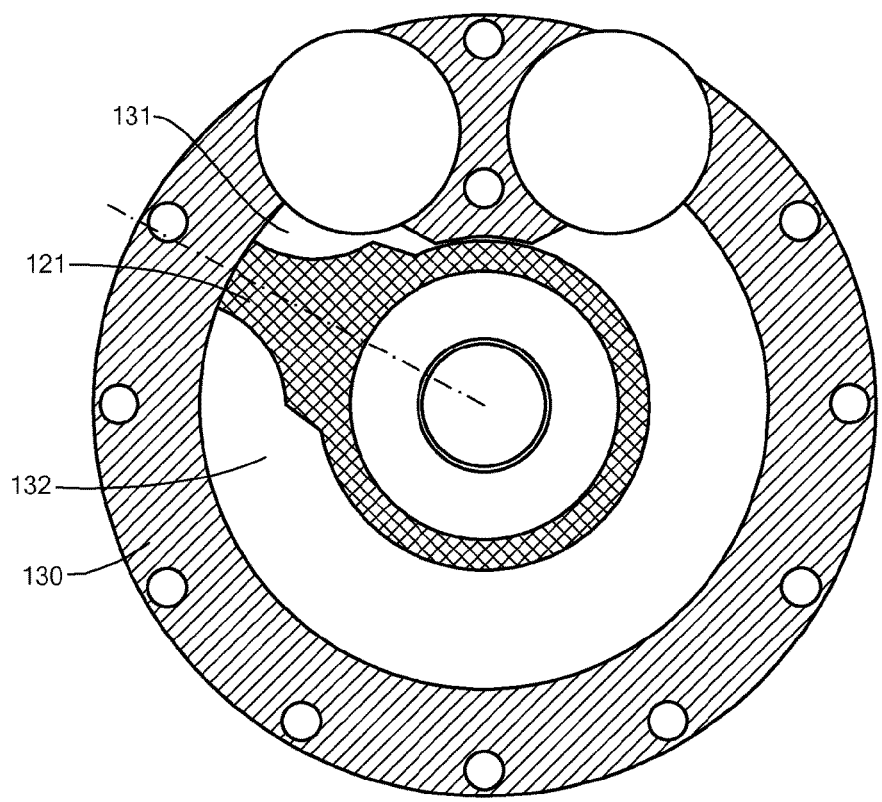
Figure 21:
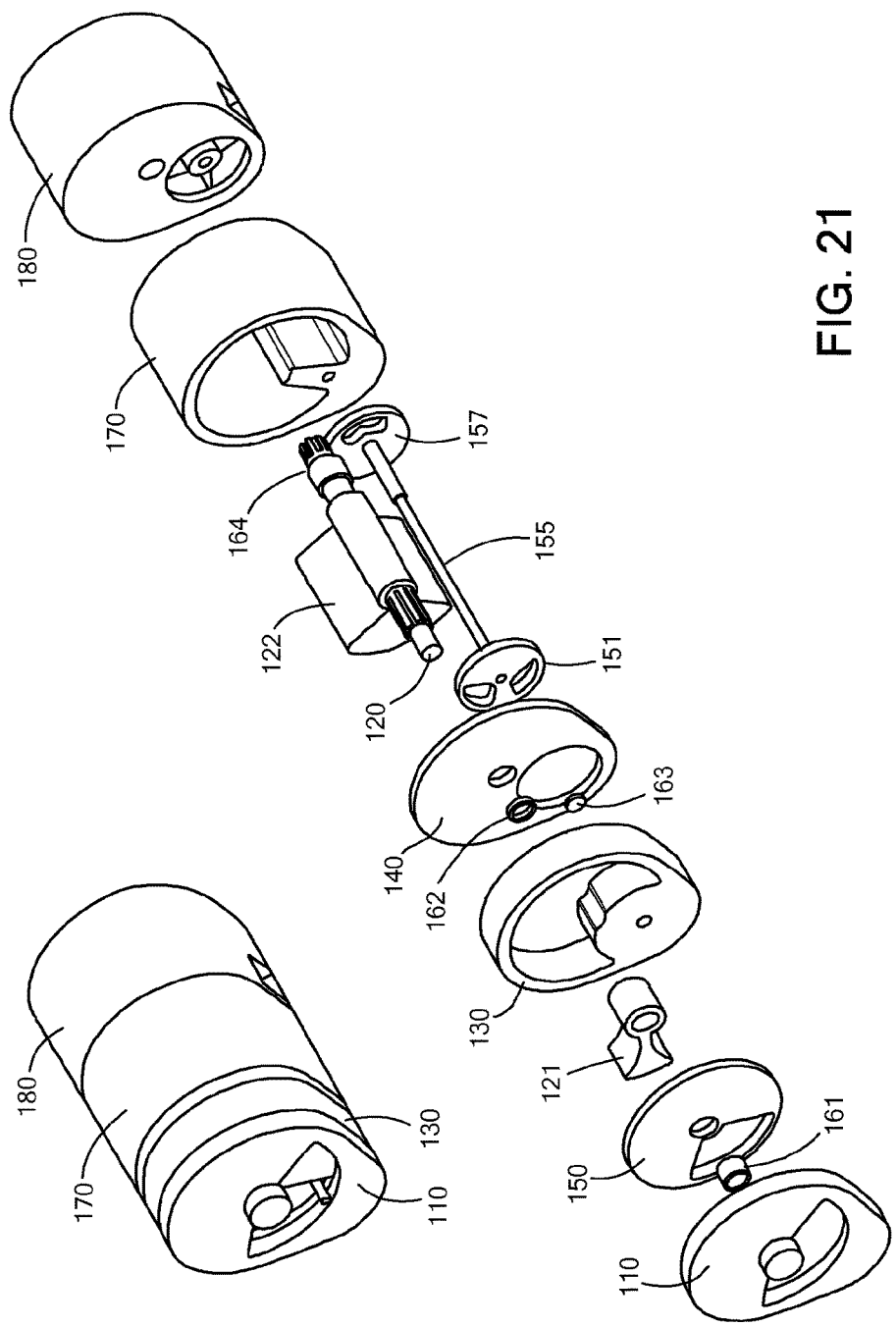
FIGS. 21-26 provide construction details and explain principles of operation of a large-angle oscillating piston design of HCCE according to some embodiments of the invention.

Another important variation is shown on FIG. 20. Both pistons could have large internal diameter space in the middle, which could be used for implementation of PCM. Such a combination would yield an engine of smaller size and, therefore, will increase power density even higher.

Other implementations may have some subtle design features that might be useful in building a commercial engine. One such a specific implementation will be discussed below.

Large Angle Oscillating Piston Design

FIG. 21 through 26 show another implementation of an HCCE engine, which is described below. The engine features a slightly different arrangement of valves and combustion chambers compared to other engines described thus far.

Figure 24:
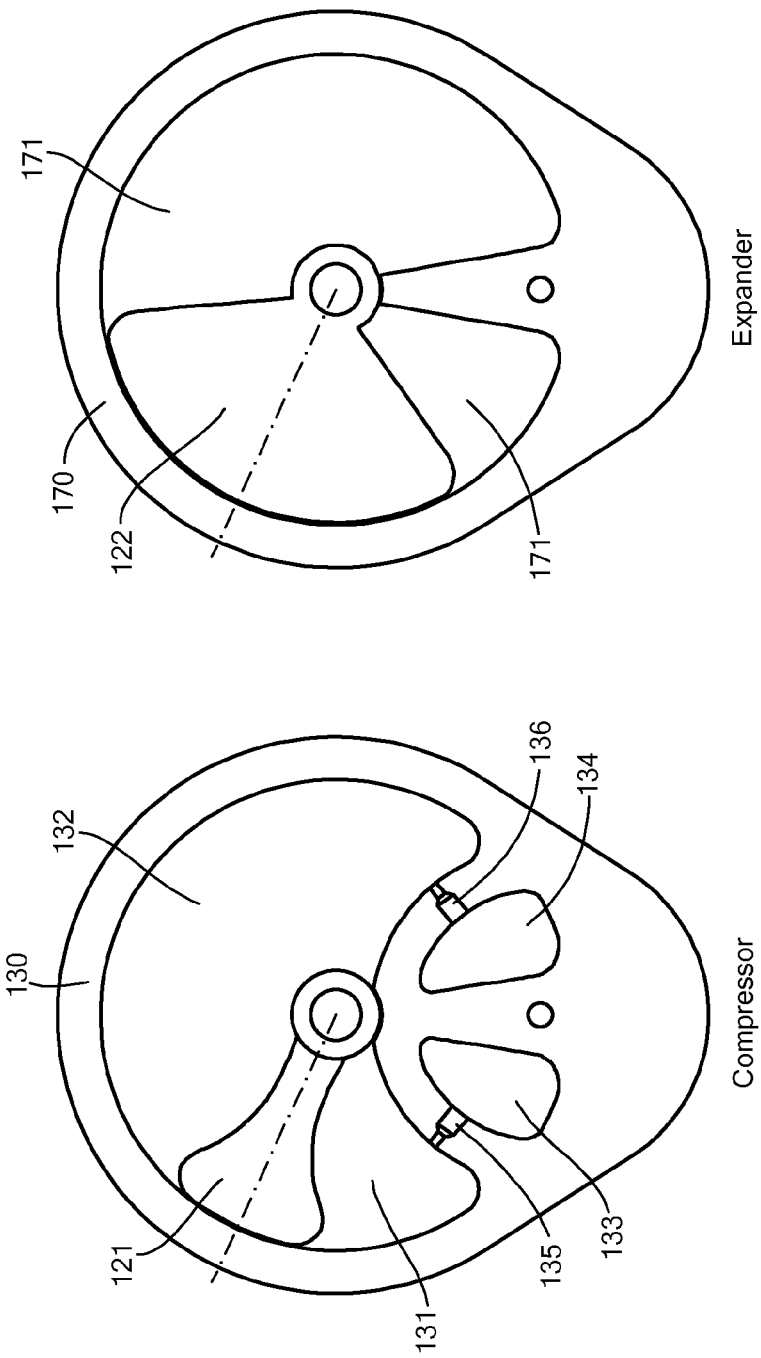
Figure 25:
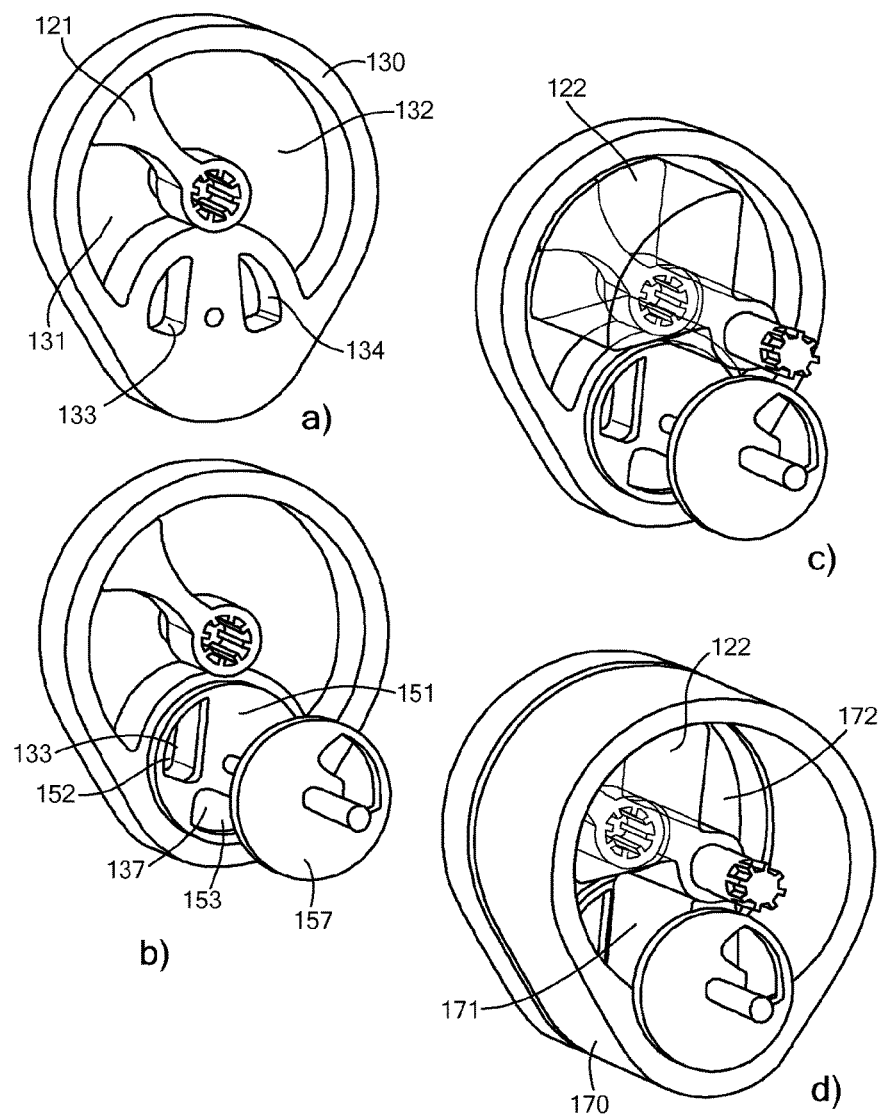
Figure 34:
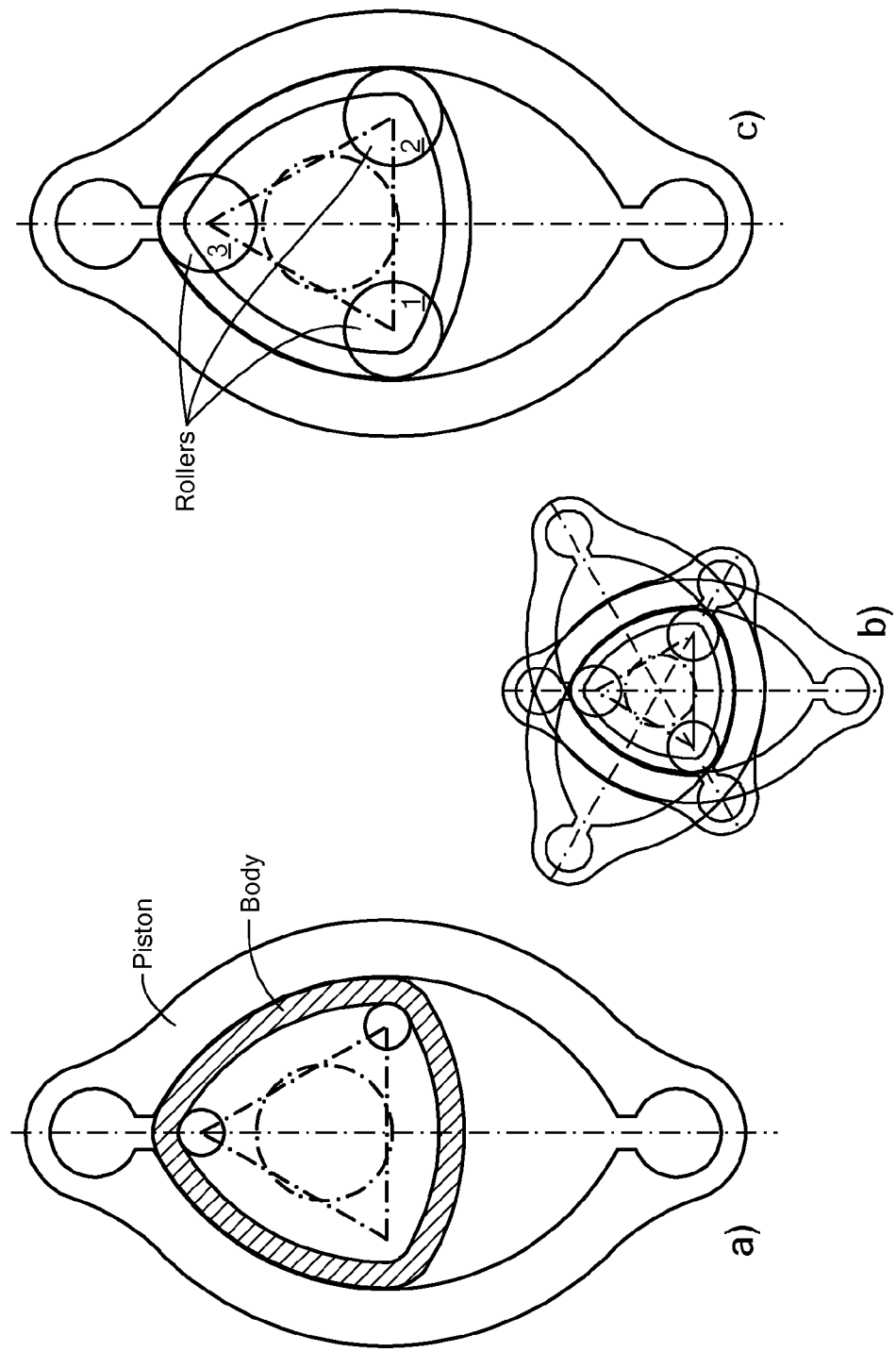
FIG. 34 depicts various embodiments of the design based on constant width piston of FIGS. 28-33.

Referring to FIGS. 1 and 24, in one embodiment, PGM, 100 of this engine includes:

Compressor body, 130, which contains combustion chambers 133 and 134, FIGS. 24 and 34*a*), and one way air valves (ball, poppet, fluidic, etc.) 135 and 136, allowing airflow from the compression chambers, 131 and 132, into combustion chambers, 133 and 134, correspondingly. It may also contain special passages that could deliver gaseous or liquid fuel and/or liquid water directly into combustion chambers, or, preferably, into combustion products transfer valve 151.

Expander body, 170;
Separator, 140;
Compressor cover, 110;
Expander cover, 180, which also houses PCM;
Two compression chambers, 131 and 132, formed by space between compressor body, 130, compressor's Piston 121, separator, 140, and compressor cover, 110;
Two expander chambers, 171 and 172, formed by space between expander body, 170, expander's Piston 122, separator, 140, and expander cover, 180;
A compressor piston 121, a solid body, or, optionally, a solid body surrounded in a part by a liquid; the said compressor piston 121, moves within compressor body and separates two combustion chambers. It oscillates around axis of oscillating shaft;
An expander piston 122, coaxial to compressor piston 121, a solid body, or, optionally, a solid body surrounded in part by a liquid; the said expander piston 122, moves within expander body and separates two expansion chambers. It oscillates around axis of oscillating shaft synchronously with compressor piston and oscillating shaft;
Oscillating shaft (120) which couples mechanically compressor's piston 121, and expander's piston 122. It may have a spline, which matches groves on the compressor piston (121) and exhaust piston (122), as well as another spline which allows coupling to PCM (300). Alternatively, it could be made as one whole with either pistons;
Combustion products transfer valve 151, which has two channels, 152 and 153, allowing combustion chamber space 133 to be connected with expander chamber 171 via channel 152, or combustion chamber space 134 to be connected with expander chamber 172, via channel, 153;
Exhaust valve 157, allowing already expanded gasses to exhaust into the environment or ERS.
Shaft 155, which connects valves 151 and 157. It is driven intermittingly back and forth, while compressor and expander pistons are stationary;
Fresh air intake valve, 150, which allows fresh air to be inducted into compression chambers during intake stroke. This could be substituted with one way valves— ball, poppet, fluidic types, etc.
Liquid (water) partially or completely filling channels 152 and 153;
Radial bearings, 161, 162, 163 and 164, which hold rotationally shafts 120 and 155;
Depending upon position of compression piston 121, the volume of compression chambers $V_{131}$ and $V_{132}$ varies from $V_{Intake}$, during initial phase of intake stroke, to zero at the end of intake stroke. The volumes of compression chambers $V_{131}$ and $V_{132}$ are complementary in a sense that $V_{131}+V_{132}=V_{Intake}$.
Similarly, depending upon position of expansion piston 122, the volume of expansion chambers $V_{171}$ and $V_{172}$ varies from $V_{Exhaust}$, during initial phase of Exhaust stroke, to zero. The volumes of expansion chambers $V_{171}$ and $V_{172}$ are complementary in a sense that $V_{171}+V_{172}=V_{Exhaust}$.
It should be noted that $V_{Exhaust}$ to $V_{Intake}$ ratio, adjustable by shape and/or thickness of the compressor's piston 121, and expander's piston 122, could be selected in a such way that the pressure of expanded combustion products at the end of the expansion stroke is close to atmospheric.

Operation

We start the description of engine operation in the position where the expander's piston 122, moves clockwise (FIG. 25*d*) driven by pressure from the combustion products, expanding into expansion chamber 171 from the combustion chamber 133. The combustion products transfer valve 151 has channel 152 aligned with combustion chamber 133 (FIG. 25*b*)), allowing combustion products into expansion chamber 171 (FIG. 25*d*)).

At the same time, expander's piston 122, pushes the already expanded gasses out of chamber 172, through a channel in exhaust valve 157, which is synchronized with combustion products transfer valve 151.

Compressor's piston 121, (FIGS. 25 *a*) and *b*)), moves in the same direction, clockwise, because it is mechanically coupled with expander's piston 122. In doing so, it is compressing the air located in the compression chamber 132, and inducting ambient air into compression chamber 131. Compressed air within compression chamber 132, enters through the one-way air valve 136, (FIG. 24) into combustion chamber 134.

Thus four chambers of engine are undergoing four different strokes:
Compression chamber 131—intake stroke;
Compression chamber 132—compression stroke;
Expander chamber 171—expansion stroke;
Expander chamber 172—exhaust stroke.

These strokes will be completed when both pistons simultaneously reach their end points at full clockwise position. The degree of angular rotation of the pistons is controlled by the PCM—to prevent pistons from colliding with walls of compressor and expander.

In this position (FIG. 26), combustion products transfer valve 151, is still located over combustion chamber 133. Combustion chamber 134 is closed by the combustion products transfer valve, 151, body, while channel 153, is in position over the water injector, 137, and fuel injector (not shown, for clarity). Since channel 153, is under atmospheric pressure, as will be understood later, the water together with gaseous fuel fills in channel 152. Both water and gaseous fuel could be under small pressure. Optionally, channel 153, just like channel 152, could be made of more complex, 2-chamber shape, so that gaseous fuel and water do not have to mix together.

As stated above, both, compressor's piston 121, and expander's piston 122, will become stationary at the end of their stroke. At this time:
The combustion chamber 134, contains hot pressurized air. Since only fresh air is compressed, rather then air/fuel mixture, we can compress it to high compression ratio of 15 to 30 or above, which will bring the temperature of air significantly above the auto ignition point.
The combustion chamber 133, together with expander chamber 171, now contains completely expanded gases, since they are both connected through channel 152. The expansion is carried to ~ atmospheric pressure.
The compression chamber 131 is now filled in with fresh air.
The compression chamber 132 is at zero volume now, just like expander chamber 172.

Figure 26:
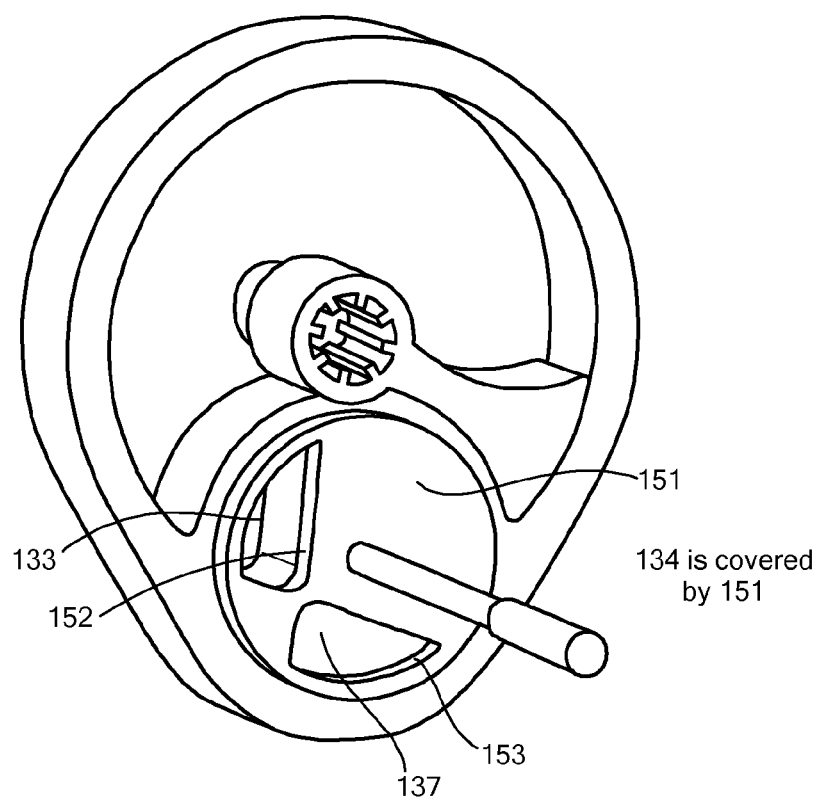

While the compressor's piston 121, and the expander's piston 122, are stationary in this extreme right position (FIG. 26), valves 151 and 157, driven by the shaft, 155, rotate counter-clockwise until channel 153, matches the opening of combustion chamber 134, as shown in FIG. 26*a*).

In the course of rotation, the combustion products transfer valve 151, turns counterclockwise and exposes the fuel contained in channel 153, to the hot pressurized gasses within combustion chamber 134. Spontaneous combustion begins and continues for as long as it takes for fuel to complete combustion process. At this time:

- The combustion chamber 134, contains very hot, very high pressure combustion products. In spite of the fact that channel 153, is lined up with opening from combustion chamber 134, gasses can't escape from combustion chamber 134, since water contained within channel 153, and expander's piston 122, are blocking the exit.
- As above, the combustion chamber 133, together with expander chamber 171, contains completely expanded gases. Now, however, they are not connected to each other, since channel 152 is not lined up with combustion chamber 133. The expander chamber 171, is connected with ambient air through the hole in exhaust valve 157.
- As above, the compression chamber 131, is filled in with fresh air.
- As above, the compression chamber 132, and expander chamber 172 are at zero volume.

After combustion is complete, which could last as long as 10-20 deg or more of PCM shaft rotation, both compressor's piston 121, and expander's piston 122, start counterclockwise rotation until they reach their extreme left positions, at which moment they pause, until valves 151 and 157 are rotated clockwise and the whole sequence repeats. As in other designs discussed so far, combustion, and therefore expansion, occurs on every swing of the oscillating shaft 120.

Implementations of HCCE described above results in the following benefits:

- Compressing air, rather than air/fuel mixture, allows for a very high compression ratio (15 to 30+). Fuel is introduced separately into the combustion chamber.
- Optionally injecting water into a compression chamber (131 or 132) during the compression stroke lowers the work required to compress the air and brings the process closer to isothermal compression.
- A separate, constant volume combustion chamber allows for isochoric combustion. If water is added to the combustion chamber before combustion is complete, then, combustion will occur under the condition of reduced volume (due to evaporating water), which is even more efficient than isochoric combustion. This water also lowers the temperature of gases in the combustion chamber, which lowers the emission levels of NOx, and allows for lower grade materials that could be used for construction of the engine.
- There is additional pressure during expansion, due to steam formed during the combustion and expansion processes.
- Exhaust pressure is low because the expansion volume is larger, 2 to 5 times than the intake volume, which is easily accomplished because the expander is separate from the compressor.
- Energy Recovery System can be implemented as described herein Modifications The engine described above, may have numerous implementations as well. Some of them obvious, such as various other shapes and forms of combustion chamber, expansion chamber, valves, pistons, etc., which do not change the spirit of the design. For example, it is possible to make valves rotate in a continuous rather then oscillatory manner.

Figure 27:
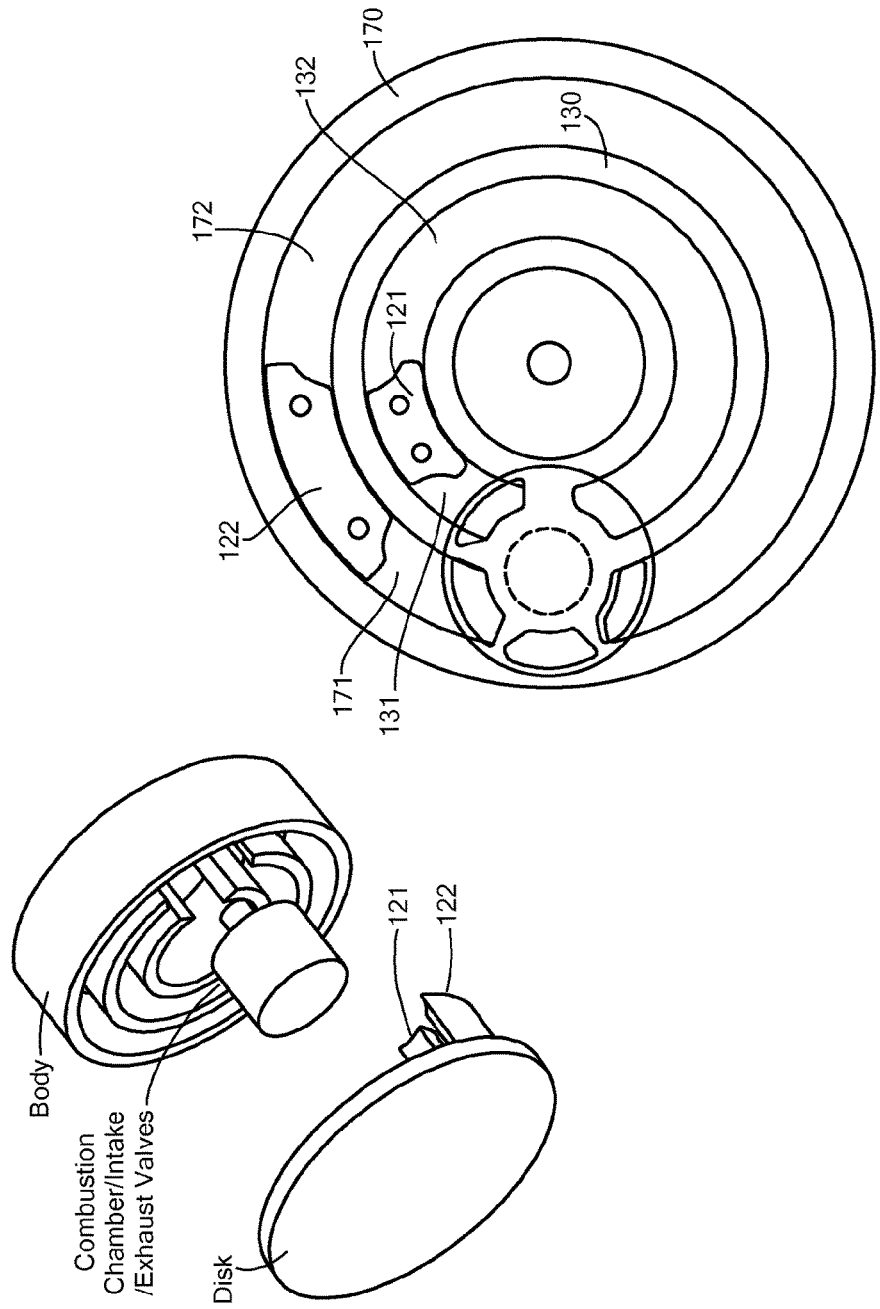
FIG. 27 depicts an embodiment of the large-angle oscillating piston design of HCCE.

Also, of particular interest may be design shown in FIG. 27. In this design compressor's piston 121, and expander's piston 122, are located on an oscillating disc rather than on the oscillating shaft, as in a previous designs. The details of valves and combustion chambers are not shown in significant details in this example, as they could take various forms: stationary or oscillating or continuously rotating combustion chamber(s) and or valve(s); combustion chambers and valves could be one or two or more separate parts, etc. They could also move in the direction perpendicular to piston's plane in a reciprocating motion or even in reciprocating and rotary motions simultaneously. The same is true for all other designs we are discussing in this patent. The large internal diameter allows placement of PCM inside this central volume.

Constant Width Piston Design

A preferred implementation of HCCE engine is shown in FIG. 28 through 33. It is based on a (modified) Reuleaux triangle shaped piston, similar to what is used in a Wankel (rotary) engine, so it bears certain similarity to it, but it is built on the design objectives outlined in section "Generalized Structure of an HCCE Engine" above and, therefore, operates on a different thermodynamic cycle and different mechanical principle.

Figure 28:
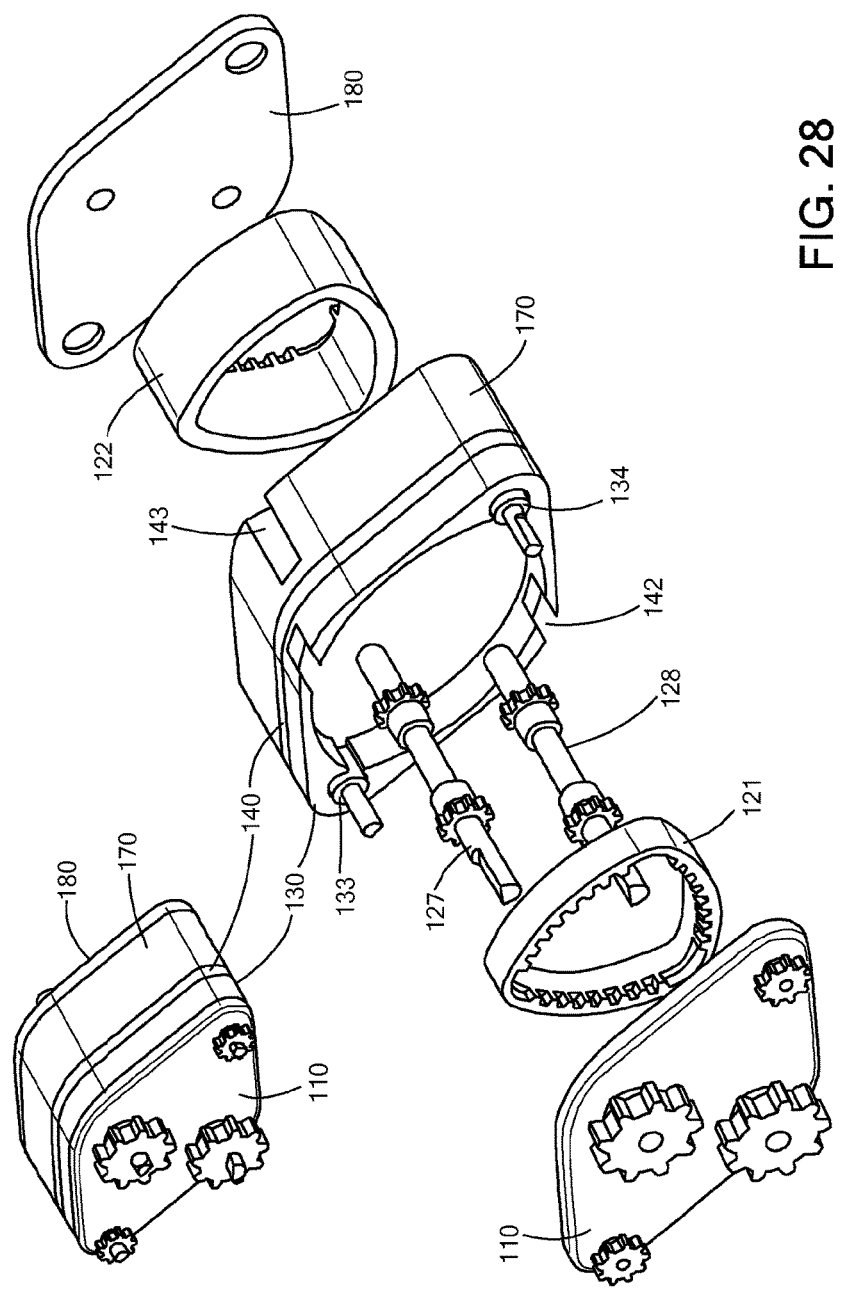
FIGS. 28-33 provide construction details and illustrate principles of operation of a particular embodiment of the HCCE based on constant width piston design.
Figure 29:
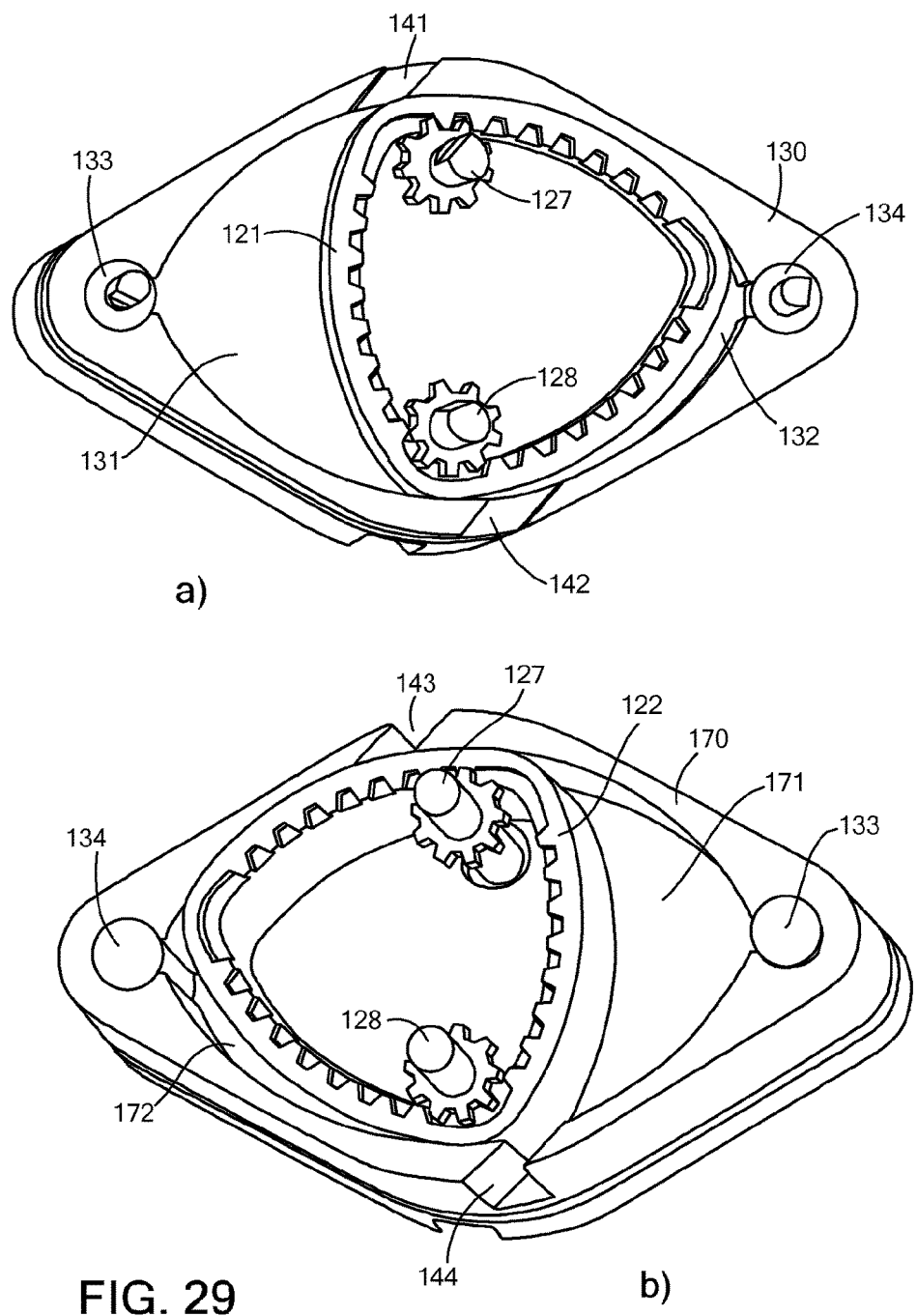
Figure 30:
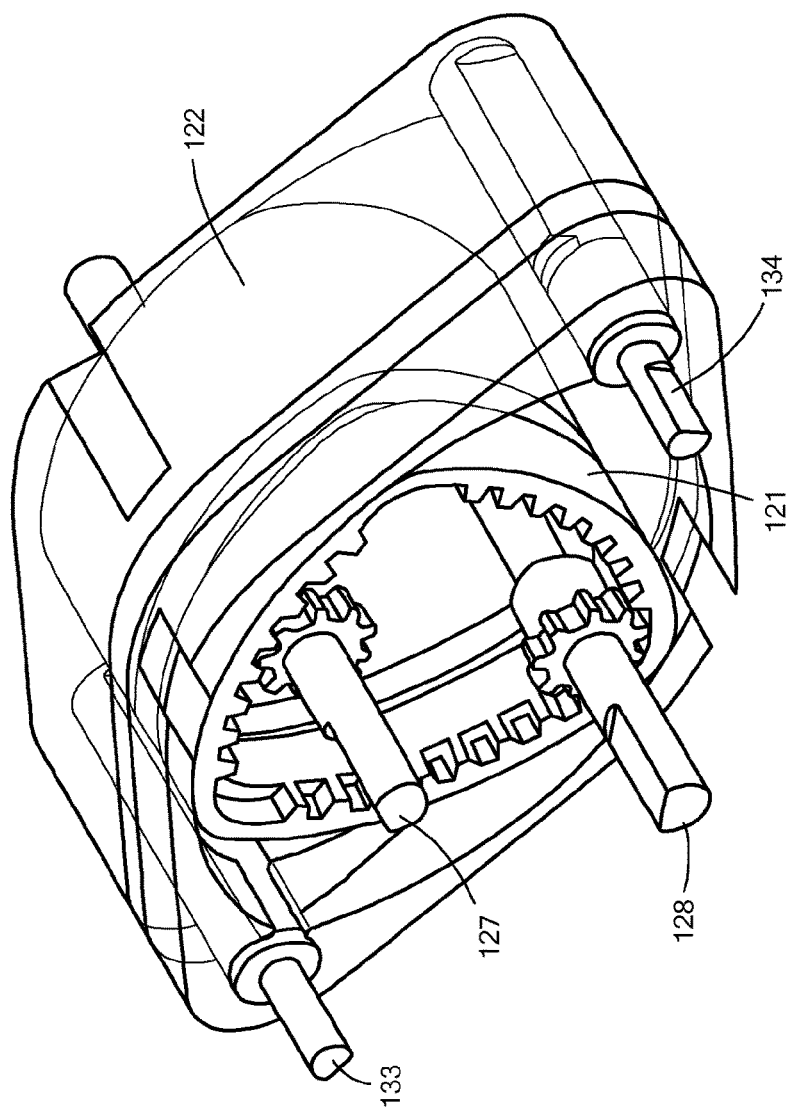
Figure 31:
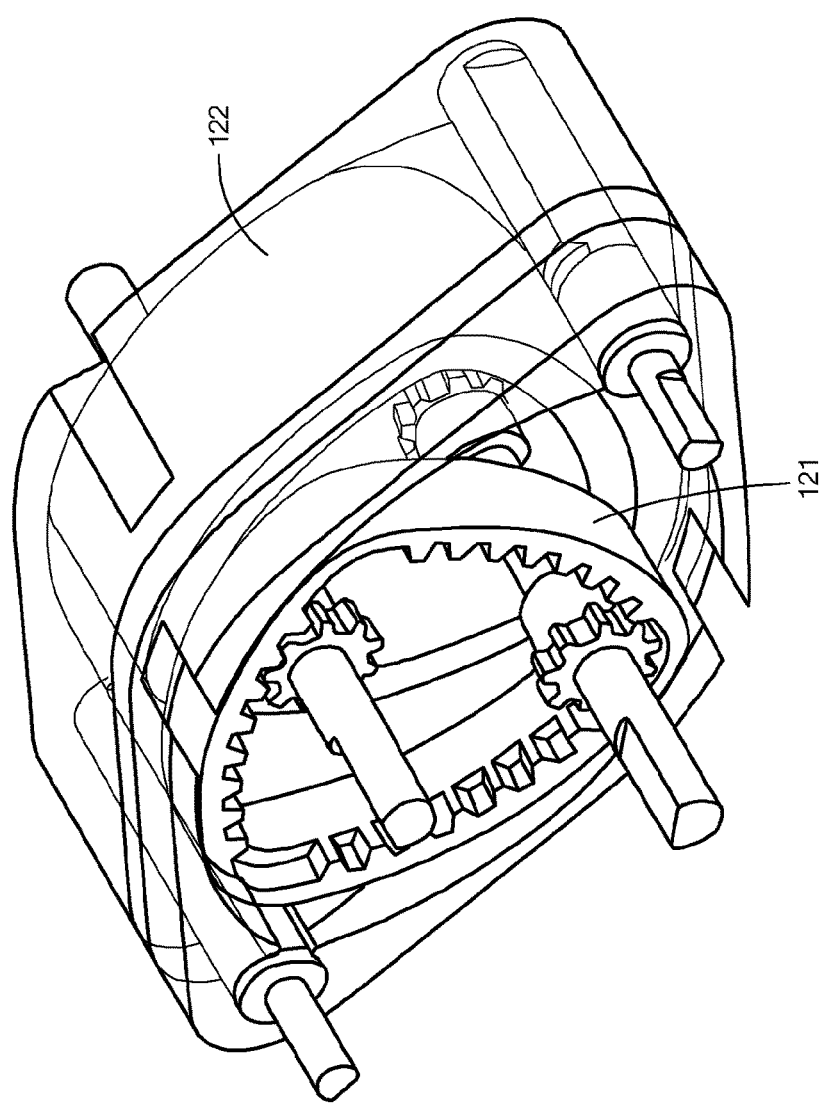

Referring to FIGS. 28 and 29, in one embodiment, PGM 100 of the engine includes:

- Compressor body 130, which houses combustion chambers 133 and 134, compressor's piston 121, and drive shafts 127, and 128. It has, optionally, air intake ports 141 and 142 (or air/exhaust valves), and may also contain special channels that could deliver gaseous or liquid fuel and/or liquid water directly into combustion chambers, when such a chamber is faced with the said channels. The cavity within compressor body 130, which houses compressor's piston 121, is defined by intersection of two arcs with center at upper drive shaft 127, and lower drive shaft, 128. The radius of the arc equals large radius of the compressor's piston 121, (see below) plus, optionally, very small clearance. The arcs are filleted with a radius equal to the small radius of the piston (see below) plus, optionally, very small clearance. Compressor body 130, contains openings that connect the cavity, which houses compressor's piston with cylindrical holes, which house combustion chambers (133 and 134).
- Expander body 170, which houses combustion chambers 133 and 134, expander's piston 122, and drive shafts 127, and 128. It has, optionally, exhausts ports 143 and 144 (or air/exhaust valves), and may also contain special channels that could deliver gaseous or liquid fuel and/or liquid water directly into combustion chambers, when such a chamber is faced with the said channels. The cavity within expander body 170, which houses expander's piston 122, is defined by intersection of two arcs with center at upper drive shaft 127, and lower drive shaft 128. The radius of the arc equals the large radius of the expander's piston 122, (see below) plus, optionally, very small clearance. The arcs are filleted with a radius equal to the small radius of the piston (see below) plus, optionally, very small clearance. Expander body 170, contains openings that connect the cavity, which houses expender's piston, with cylindrical holes, which house combustion chambers (133 and 134).

Separator, 140. It should be noted that compressor body 130, expander body 170, and separator 140, could be manufactured as one single body.

Compressor cover 110, which may house all or part of PCM (not shown);

Expander cover 180, which may house all or part of PCM (not shown);

Two compression chambers 131 and 132, formed by space between compressor body, 130, compressor's piston 121, separator 140, and compressor cover 110;

Two expander chambers 171 and 172, formed by space between expander body 170, expander's Piston 122, separator, 140, and expander cover, 180;

A compressor piston 121—a solid body, or, optionally, a solid body surrounded in a whole or in part by a liquid; the said compressor piston 121, moves within compressor body 130, and separates air cavity into compression chamber 131, and compression chamber 132. The outer and preferably inner surfaces of this piston are derived as follows: starting with an equilateral triangle, draw three circles of same (relatively small) diameter, where each circle is centered at each corner. Draw three larger arcs centered at each corner so that the larger arcs are tangential to any given pair of small circles. The outside curves of the resulting shape consist of 6 arcs, and are the shape of our piston. The resulting shape is similar to a Reuleaux triangle, as is used in the Wankel engine, but with rounded apexes. The piston constructed in this way has constant width, defined as a chord drawn between opposing large and small arcs and passing through the center of these arcs. The internal curved surface of a piston may have three gear segments. They are not connected with each other, and in the course of piston rotation around the drive shafts, only one segment fully engages with a gear of one of the drive shafts. Only at the end of compressor's piston travel are both drive shafts partially engaged with two gear segments. The motion of this piston within the combustion chamber can be described as consecutive rotations around two axis defined by the drive shafts. The alternative ways (without gearing segments) may include grooves and cams or be similar to the driving means of Wankel engine.

The expander piston 122 is constructed in a similar way as the compressor piston described above, except that it is located within the expansion body 170.

Upper and lower drive shafts 127 and 128, engage gear segments of both compressor's piston 121 and expander's piston 122. In simplest case, when both pistons move in phase, the pinion gears of drive shafts are synchronous, with each other, i.e. mechanically coupled. If pistons move out of phase, as will be explained below, gears operating on compressor side of the engine could be driven separately from gears operating on expander side.

Air intake ports 141 are just windows within compressor body 130, and/or within compressor cover 110.

Exhaust ports 143 and 144, are just windows within expander body 170, and/or within expander cover 180. They could be, optionally, connected with ERS.

Liquid (water) may partially or completely fill the inner space of compressor's piston 121, and/or expander's piston 122.

Depending upon the position of the compression piston 121, the volume of compression chambers $V_{131}$ and $V_{132}$ varies from $V_{Intake}$, during initial phase of intake stroke, to zero at the end of intake stroke. The volumes of compression chambers $V_{131}$ and $V_{132}$ are complementary, i.e., $V_{131}+V_{132}=V_{Intake}$.

Similarly, depending upon the position of the expansion piston 122, the volume of expansion chambers $V_{171}$ and $V_{172}$ varies from $V_{Exhaust}$, during initial phase of Exhaust stroke, to zero. The volumes of expansion chambers $V_{171}$ and $V_{172}$ are complementary, i.e., $V_{171}+V_{172}=V_{Exhaust}$.

It should be noted that, since piston does not have to be cylindrical, VExhaust to VIntake ratio, adjustable by size, shape and thickness of the compressor's piston 121, and expander's piston 122, could be selected in such a way that the pressure of expanded combustion products at the end of the expansion stroke is close to atmospheric.

Operation

In spite of a different looking design, this engine operates in a similar manner as the engines described previously. The details of the operations follow.

We start the description of this engine's operation by looking into the expander's side (FIG. 29*b*)) at the position where the expander's piston 122, is moving clockwise. The expansion piston is driven by pressure exerted by combustion products. These products expand into expansion chamber 172 from the combustion chamber 134, through the channel connecting the expansion chamber with combustion chambers.

At the same time, expander's piston 122, pushes the already expanded gasses out of chamber 171, through the exhaust port, 144.

In the simplest case, both pistons move in phase (their curved surfaces are concentric). Therefore the compressor's piston 121, (FIG. 29*a*)), moves in the same direction as the expander's piston (however, since we are looking now into a compressor side, the rotation of the piston is counterclockwise). In doing so, it is compressing the air located in compression chamber 131, and inducting air into compression chamber 132.

In more complex instances, pistons could move out of phase or even in opposite directions, if driven by four coupled shafts. This approach gives more flexibility in designing the shape of the combustion chamber as well as the timing of when compression occurs with respect to when expansion occurs. For instance, it is advantageous to start the expansion closer to the end of compression stroke, when most of the torque is required and is available. This will alleviate the requirements for the flywheel, or even eliminate it all together.

Coming back to the in-phase operation of pistons, the four chambers of engine are undergoing four different strokes:

Compression chamber 131—compression stroke;
Compression chamber 132—intake stroke;
Expander chamber 171—exhaust stroke;
Expander chamber 172—expansion stroke.

These strokes will be completed when both pistons simultaneously reach their end points of the stroke. The degree of angular rotation of the pistons, in this case, is controlled by the drive shaft and gear segments on the pistons instead of by the PCM, as in other designs. In this position both upper drive shaft, 127, and lower drive shaft, 128, should momentarily stop.

Unlike in our other designs, the combustion chambers, 133, and 134 undergo continuous, preferably constant speed, rotation. At the end of the stroke, the combustion chamber in which air was compressing into should be rotated to the "closed" position, i.e. the combustion chamber cavity is disconnected from compression space. In case of in-phase design it is preferable to have at least two cavities within each combustion chamber, so when cavity in which air is being compressed into is rotated into "closed" position, the second cavity is rotated into "open" position for expander's piston 122, exposing later to high pressure combustion products. In his scenario, the piston does not have to be stationary for any length of time—they just have to swap the axis of rotation and keep rotating in the same directional sense.

Only one cavity will be needed if out of phase design is used, as there is ample time for the cavity to reach expansion chamber, while the expander's piston 122, gets into the end of the stroke position for this cavity.

While combustion chambers, 133 and 134, rotate, they pass through the fuel cavity (not shown) within the compressor body, 130, which contains gaseous fuel under low pressure. Additional small channels on the combustion chambers, 133 and 134, act as a gas conduit to fill in the fuel cavity. Combustion chamber body serves as a shut off valve for the "gas main".

Hot, due to compression, air is mixed with the gaseous fuel and because its temperature is above the auto-ignition temperature of the fuel, spontaneous combustion occurs. Optionally, water could be inserted into the combustion chamber (before during or after combustion) by filling in the connecter channel space between the combustion chamber and expansion chamber with water (not shown) which would help to reduce momentary losses related to initial small opening size between combustion chamber and expander body, 170. The losses—in a form of a heat—would be converted into additional steam, and this energy will be recovered during the expansion cycle.

Rotation of combustion chambers, 133 and 134, takes sufficiently long for complete combustion to occur. After the momentary pause, each piston continues its rotation around corresponding drive shaft: i.e. if motion before the stop was around upper drive shaft, 127, it will be continued, but this time around lower drive shaft, 128. Note that combustion, and therefore expansion, occurs on every "swing" of the pistons.

Implementations of HCCE described above results in the following benefits:

Compressing air, rather than air/fuel mixture, allows for a very high compression ratio (15 to 30+). Fuel is introduced separately into the combustion chamber.

Optionally injecting water into a compression chamber (131 or 132) during the compression stroke lowers the work required to compress the air and brings the process closer to isothermal compression.

A separate, constant volume combustion chamber allows for isochoric combustion. If water is added to the combustion chamber before combustion is complete, then, combustion will occur under the condition of reduced volume (due to evaporating water), which is even more efficient than isochoric combustion. This water also lowers the temperature of gases in the combustion chamber, which lowers the emission levels of NOx, and allows for lower grade materials that could be used for construction of the engine.

There is additional pressure during expansion, due to steam formed during the combustion and expansion processes.

Exhaust pressure is low because the expansion volume is larger, 2 to 5 times than the intake volume, which is easily accomplished because the expander is separate from the compressor.

Energy Recovery System can be implemented as described above.

Modifications

In addition to trivial changes in forms or shape of various elements, there are other modifications that may have practical interest. There are numerous ways to drive pistons.

Figure 32:
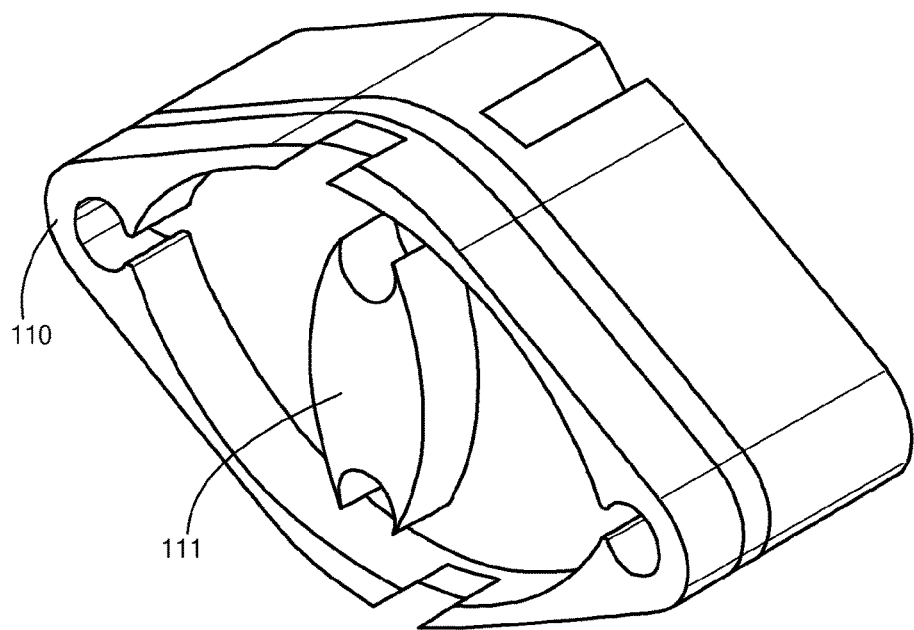

Also, of particular interest may be the design shown in FIG. 32. Here compressor body, 130, may have protrusion(s), 111, into compression chamber, shown in FIG. 32. Alternatively, this protrusion may be located on compressor cover, 110. This protrusion does not interfere with compressor's piston 121, during its course of motion. It could be used to house various additional element(s), such as, but not limited to:

Additional shaft(s) that may go through protrusion to provide independent motion to compressor's piston 121, and expander's piston 122;

Heat exchanger to remove the heat from the compressor. The water that may be contained in the space between the compressor's piston 121, and protrusion, 111, would flow through such a heat exchanger driven by the motion of the piston;

Water pump—similarly to above, but without heat exchanger;

A Freon compressor, for air-conditioning system. Freon would fill the space between the compressor's piston 121, and protrusion, 111, and would be driven by the motion of the piston. Protrusion may be made with fluidic valves that would guarantee one way flow of Freon; and An air compressor—similarly to Freon compressor above, but for compression of air. It could be used as a stand-alone air compressor or as a turbocharger for pre-compressing the air if variable compression ratio is desired.

Similarly, expander body, 170, or expander cover, 180, may have a protrusion for the same or different purposes as protrusion for compressor body.

Another modification relates to a number of ways the drive mechanism(s) enable rotors/pistons to perpetrate the required motion. Non-circular gearing mechanisms or gear/cam combinations known in industry [3] may be employed to slow down the rotor at the end of the stroke and to accelerate it in the beginning of the next stroke.

Figure 33:
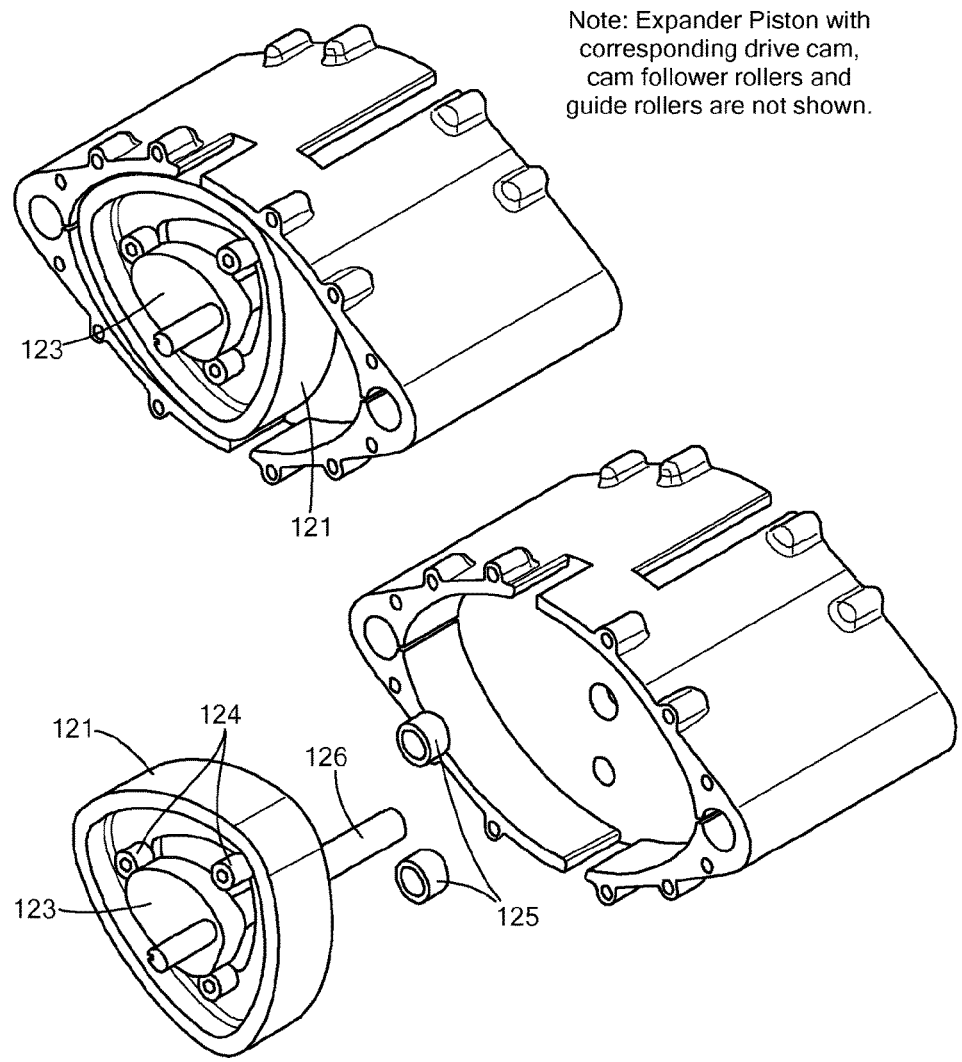

A different embodiment, employing cams only is shown in a FIG. 33. In this design, the rotor has three cam followers, which ride on the surface of a cam. It is possible to implement the positive drive (i.e. position of cam fully defines position of the rotor) with a single, dual or triple cams. For a single cam, the cam followers should be located within the equilateral triangle.

The rotor, as in previous design may run on a guide bearing or, alternatively, it may run without them, in which case the housing of the engine will serve as a guide. There may be many other configurations, which utilize cam and roller arrangements. For instance, the internal surface of the rotor could be used as cam, while rollers are mounted on rotating plate or arm.

Constant Width Chamber Design

Figure 38:
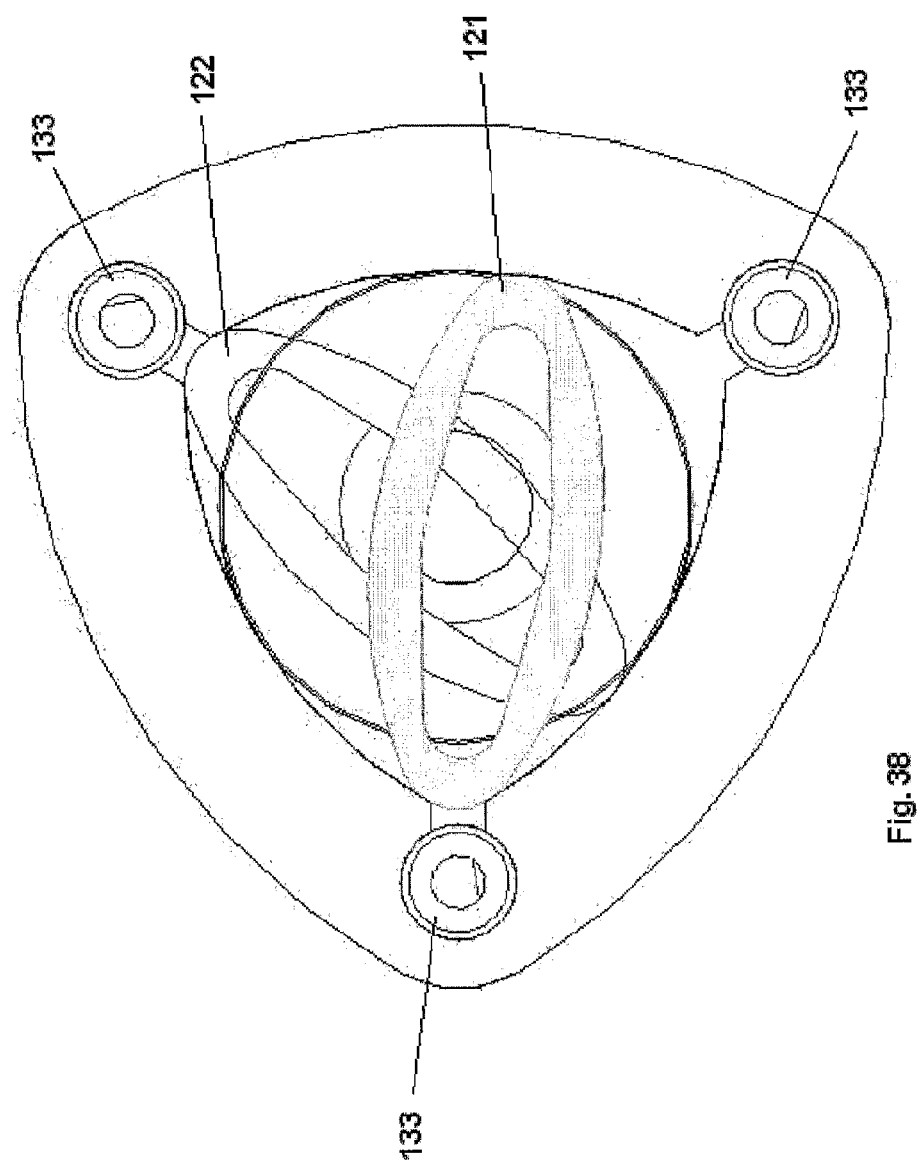

Another embodiment of HCCE, is shown in FIG. 36-40. This time, the modified Reuleaux triangle is used as engine's body configuration, compression side and expansion side. FIG. 38 demonstrates the geometry of the engine and the piston. The piston is of two-lobe design, were two arcs equal to small arcs forming the modified Reuleaux triangle, while large arcs are equal to large arcs forming the modified Reuleaux triangle. The distance between small arc centers equal to the side of equilateral triangle on which the modified Reuleaux triangle is build. The piston is driven by the rollers located on the crankshafts, 191. Both crankshafts that drive compressor's piston 121, and expander's piston 122, could be mechanically coupled, so that pistons may keep constant relationship to each other. The piston rotates consecutively around three points forming the basis of modified Reuleaux triangle.

It should be noted that the expander's piston 122, may have a larger size (larger modified Reuleaux triangle) than the compressor's piston 121. This means that if we locate the fixed combustion chamber within the corner of separator, 140, and equip it with one-way air valves, and if expander's piston 122, is 60 degrees out of phase, the said expander's piston would close the exit from the said combustion chamber and serve as the valve itself. If one then uses one-way air valves in the compressor cover, 110, then only one valve for exhaust should be built.

Figure 39:
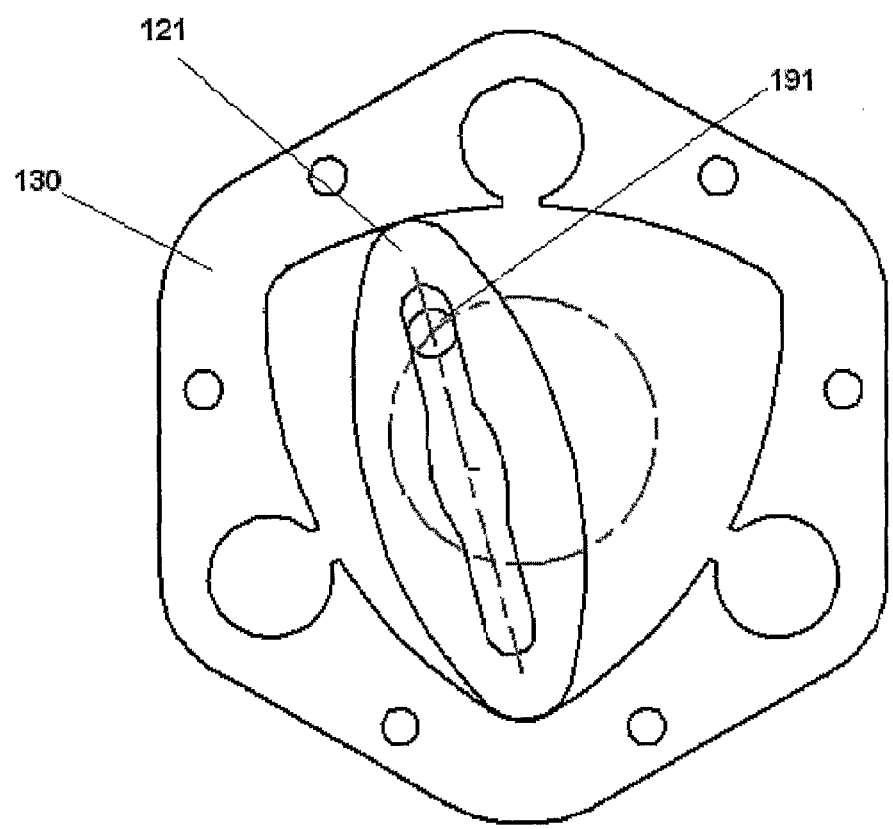

FIG. 39 shows a modification of this design, in which there are three air/exhausts valve. Note that neither air intake or exhaust ports are shown on this Figure It should be also noted that because the intake volume to total engine volume is the highest among the discussed configurations so far and because the engine in this configuration will "fire" three times per equivalent revolution of output shaft, the power density is expected to be very high.

Finally, with respect to this modification, it should be stated that many different combinations of Constant Width Piston Configuration with Constant Width Chamber Configuration are possible and could yield useful properties.

Scissor Pistons Design

Finally, we describe and embodiment that enables HCCE to execute the required cycle with configuration known in industry as "scissors" or "cat & mouse".

Figure 41:
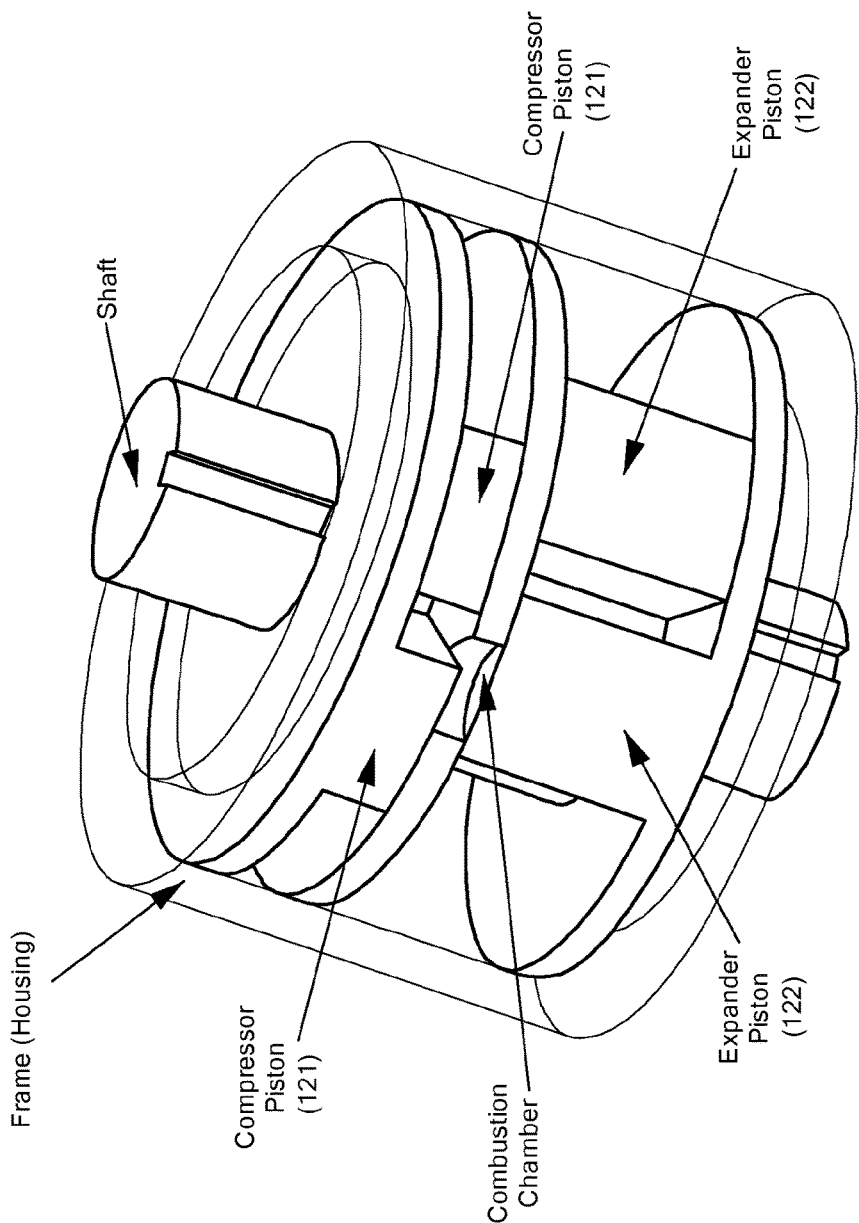
FIG. 41 depicts still another embodiment of the HCCE based on scissor pistons design.
Figure 42A:
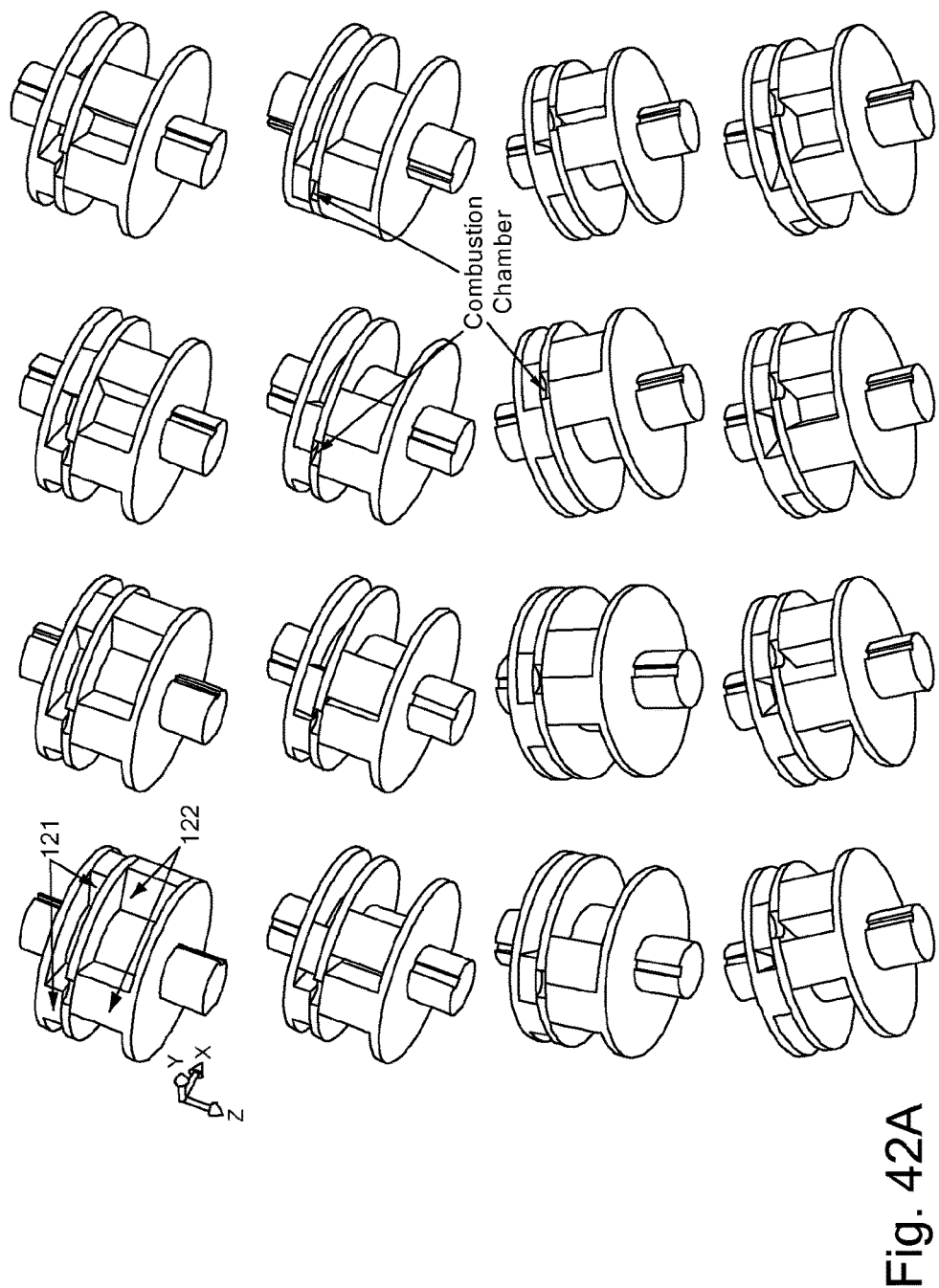
FIGS. 42A and 42B show the sequence of positions of pistons undergoing four HEHC strokes.
Figure 42B:
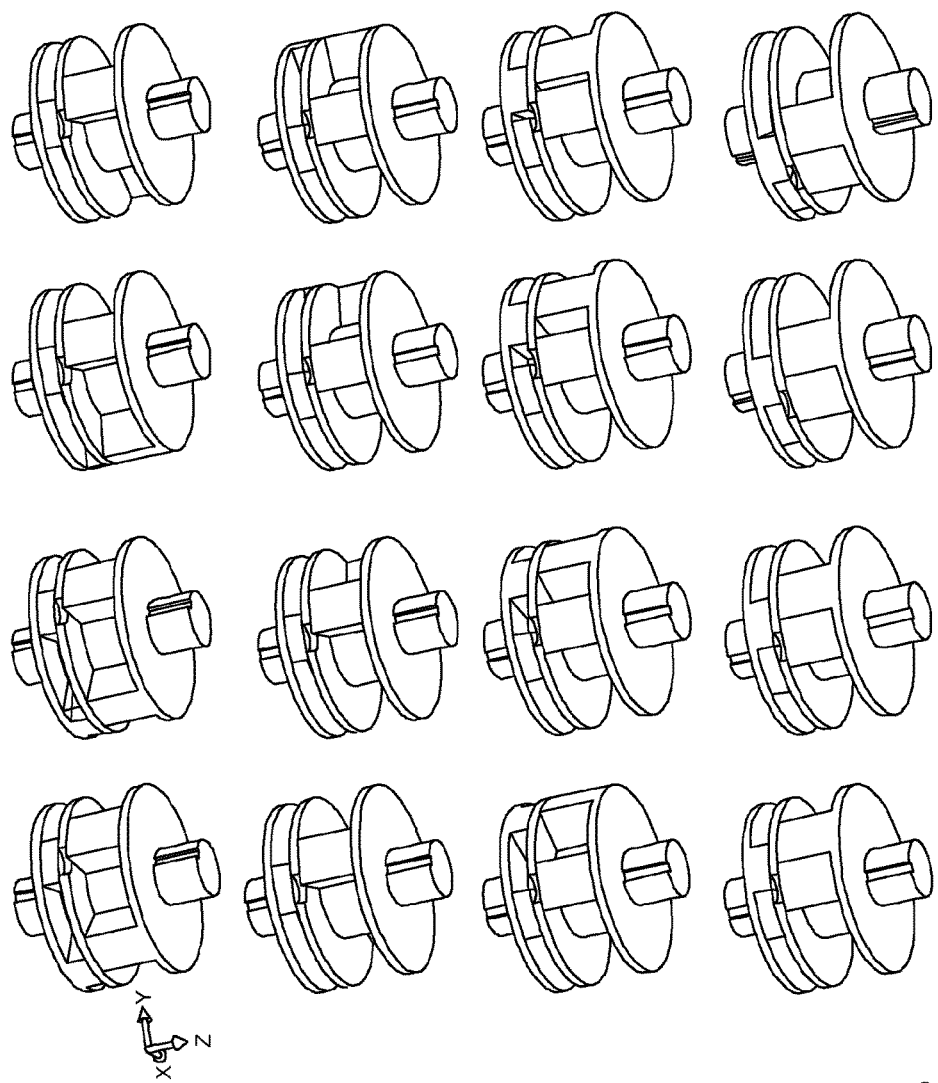

The basic idea behind this approach is shown schematically in the FIG. 41. In this configuration there are two pairs of pistons; each pair consisting of one compressor piston and one expander piston, which are mechanically coupled so that pair rotates like one object. There is also a separating plate between compressor side and expander side; this plate contains Combustion Chamber cavity. Three independent drive mechanisms drive two pistons pairs and separating plate (not shown for clarity). The housing contains fixed intake and exhaust ports and fuel port (none of them are shown for clarity). The compressor compresses the air in front of the moving piston while simultaneously inducing the air through intake port in the back of the piston. Air is compressed into a compression chamber, which is formed by the cavity of separating plate and one of the expander pistons and two compressor pistons. (See FIGS. 42A and 42B, which describe the sequence of piston positions). The fuel is then injected or introduced into it and combustion begins and proceeds to completion. Meanwhile the separating plate shifts forward and is now located between one compressor piston and two expanders pistons. When combustion is completed under constant volume, the expansion cycle begins.

It is possible to construct the HCCE to execute the required cycle without the need for a standalone rotating combustion chamber with a "single-decker" design (not shown) in which a pair of piston moves in "scissor" configuration. The minimum separation between the pistons or cavity within one or both pistons forms constant volume combustion chamber. The expansion volume could be the same or, preferably larger than intake volume, thus all elements of the cycle are implemented. As skilled artisans would appreciate, the drive mechanism for both of these variations could be build using planetary non-circular gears or planetary circular gears and cams known in the art.

Some other modifications applicable to many design configurations, or other applications of design geometries discussed above are:

The system could be built which stacks up several engines together ("multi-cylinder" configuration) by adding additional compressors/expanders with corresponding pistons. The "cylinders" of such a system could be connected via electromagnetic or mechanical clutch and could be turned on/off if more/less power is required;

Compressors or pumps could be built on the basis of mechanisms discussed above. They could be used in stand alone applications or could be driven by the engine in question. One particularly useful configuration of refrigerant compressor could be built using the same approach as used in constant width piston design utilizing both compressor and expander: compressor would compress a gaseous refrigerant and after refrigerant is cooled by external heat exchanger, it would be expanded and cooled in the expander—returning significant portion of energy spent on compressing back into the system. Such a system may be particularly applicable for carbon dioxide as lot of energy can be extracted during the expansion of this refrigerant.

The compressor body 130, and expander body 170, could be made out of one solid piece, or alternatively out of, say, low friction ceramic inserts, housed by aluminum frame. compressor's and expander's pistons, theoretically, never even touch compressor body 130, or expander body 170, so there is no concerns for cracking the ceramics upon the impact.

The design of the engines described above (i.e. compressor→combustion chamber→expander) may be suitable for conventional rotary type engines, as it helps to solve the problem with sealing of apex on a triangular piston employed in such engines and may increase power density of such engines.

Other constant width or quasi constant width configurations could be used for engine design, such as n-star piston with (n+1)-star internal gears as the shape for compressor and expander bodies (Gerotor).

Because compressor's piston 121, and expander's piston 122, could run out of phase, it is possible to run compressor's piston 121, at twice or triple the speed of expander's piston 122. If combustion chamber is equipped with one way air valves 135 and 136, and volume of combustion chamber space is controllable, by adding more or less water into it or by some other means, or if intermediate small air buffer is used, it is effectively possible to control the power output (by giving up some of the efficiency as condition #5, section "HCCE Improvements", will not be satisfied), by doubling or tripling the intake volume.

The design can be reversed: Body becomes a modified Reuleaux triangle (what we now call a piston) and piston becomes what we now call a body. This is schematically shown on FIG. 34. It is worthwhile to note that net effect of the movement of piston around of stationary body is as if piston would roll around three rollers (#1, #2, and #3). In this case Body executes three consecutive rotations around three different center point, located at the center of Reuleaux triangle, as indicated on FIG. 34b).

Figure 40:
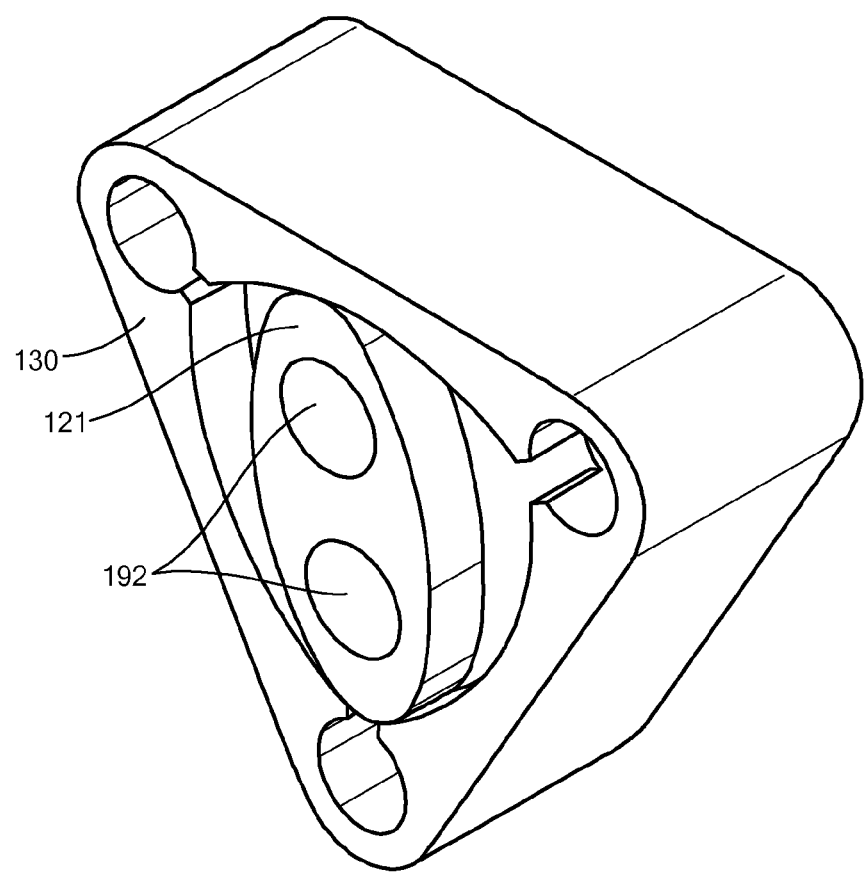

When high temperature super-magnets, which are under development in many companies, will become available, the body of piston(s) could carry the imbedded super-magnets, see FIG. 40. These super-magnets could be coupled directly to electrical generating machine, which will need to have winding to correspond to geometry of pistons and/or engine's body. If this is implemented, there will be no need in PCM for applications that generate electricity rather then mechanical motion. This could prove to be especially useful for micro-engines, which could be used as a power source for laptops, mobile phones, etc. This magnetic coupling could be also applied to all modifications of HCCE, described herein.

Briton cycle engines could use the geometry of either Constant Width Piston Configuration or Constant Width Chamber Configuration, or both. In this case the combustion chamber is completely separate from compressor and expander and heat exchanger that preheats compressed air before it enters into combustion chamber, together with ERS could improve efficiency even further.

Standard Wankel engines could use Constant Width Piston Configuration to resolve sealing and efficiency problem due to incomplete combustion.

Figure 35:
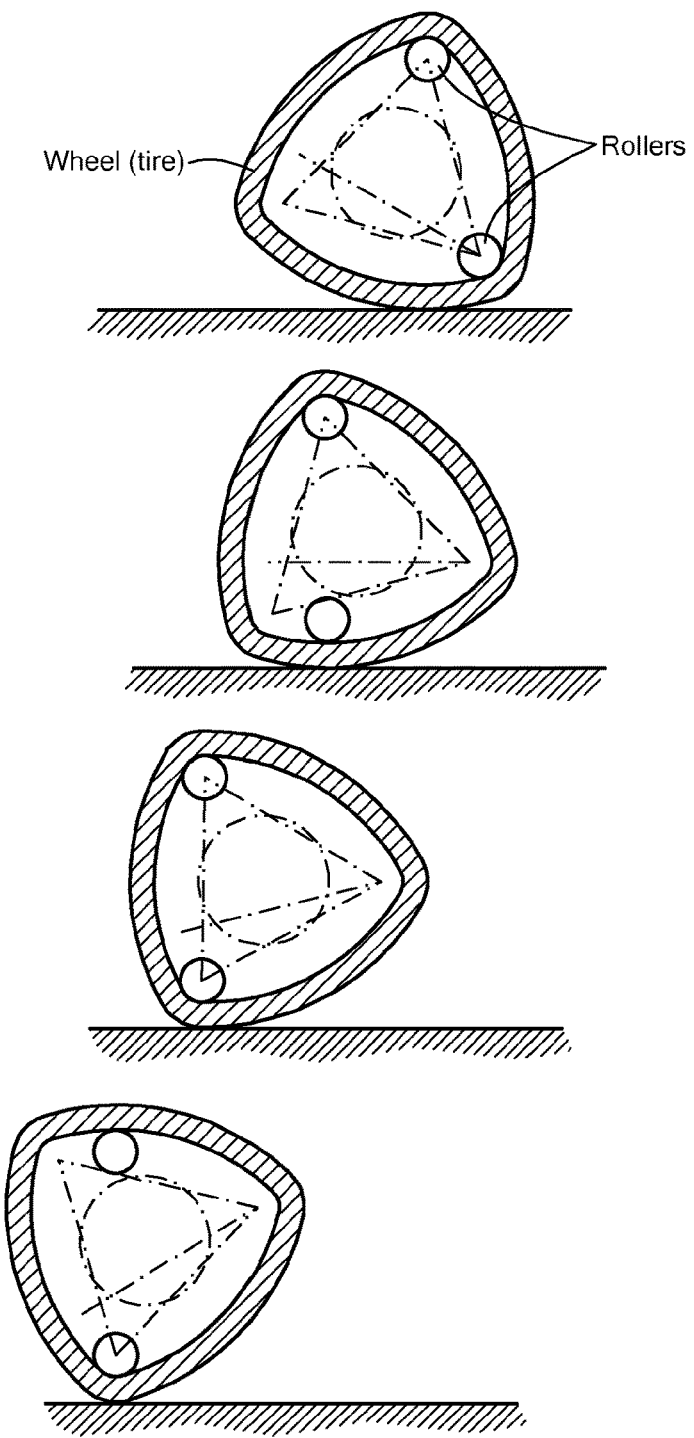
FIG. 35 is a different potential application for the modified Reuleaux triangle shaped piston.
Figure 36:
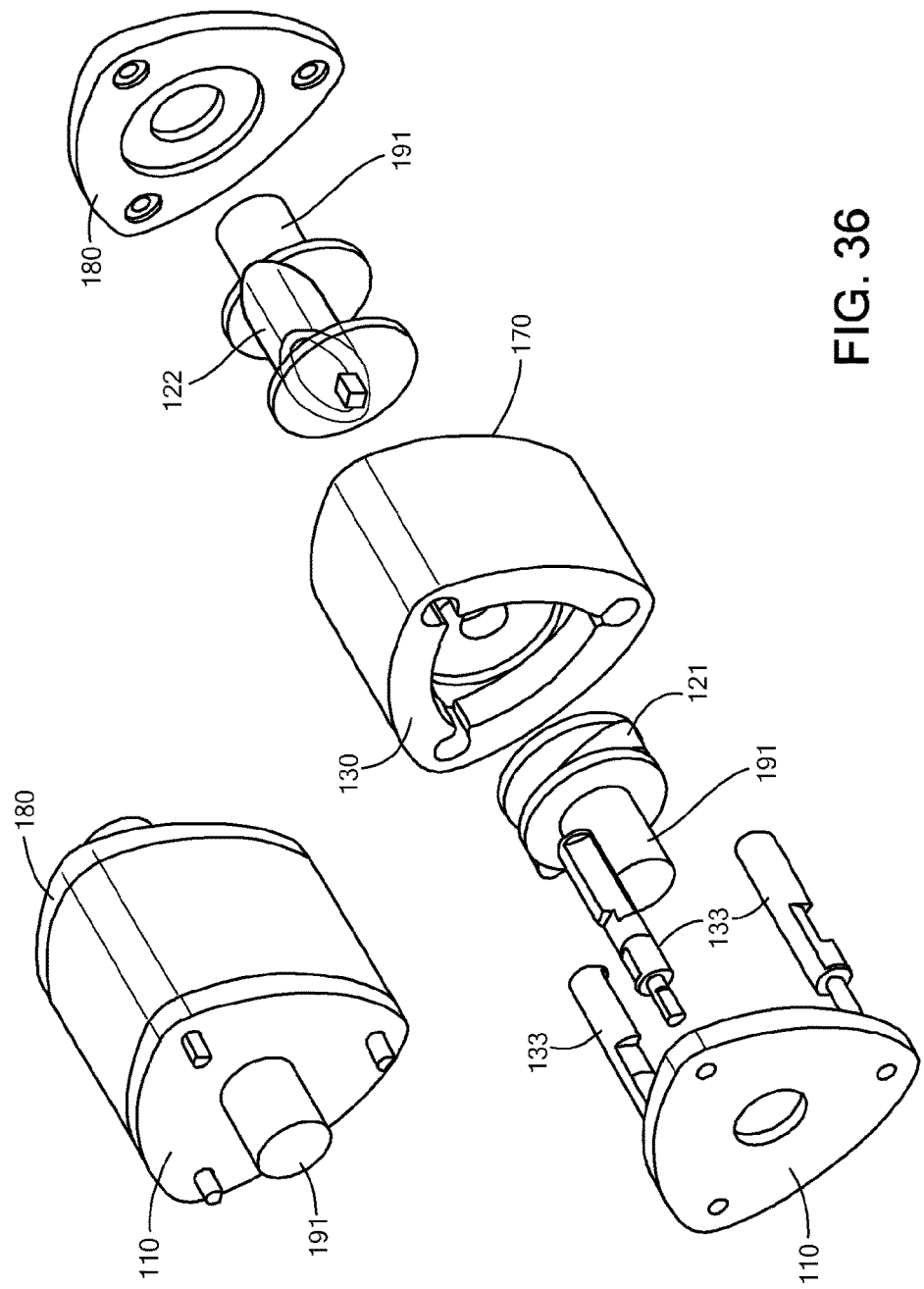
FIGS. 36-40 provide construction details and illustrate principles of operation of an embodiment of the HCCE based on constant width chamber design.
Figure 37:
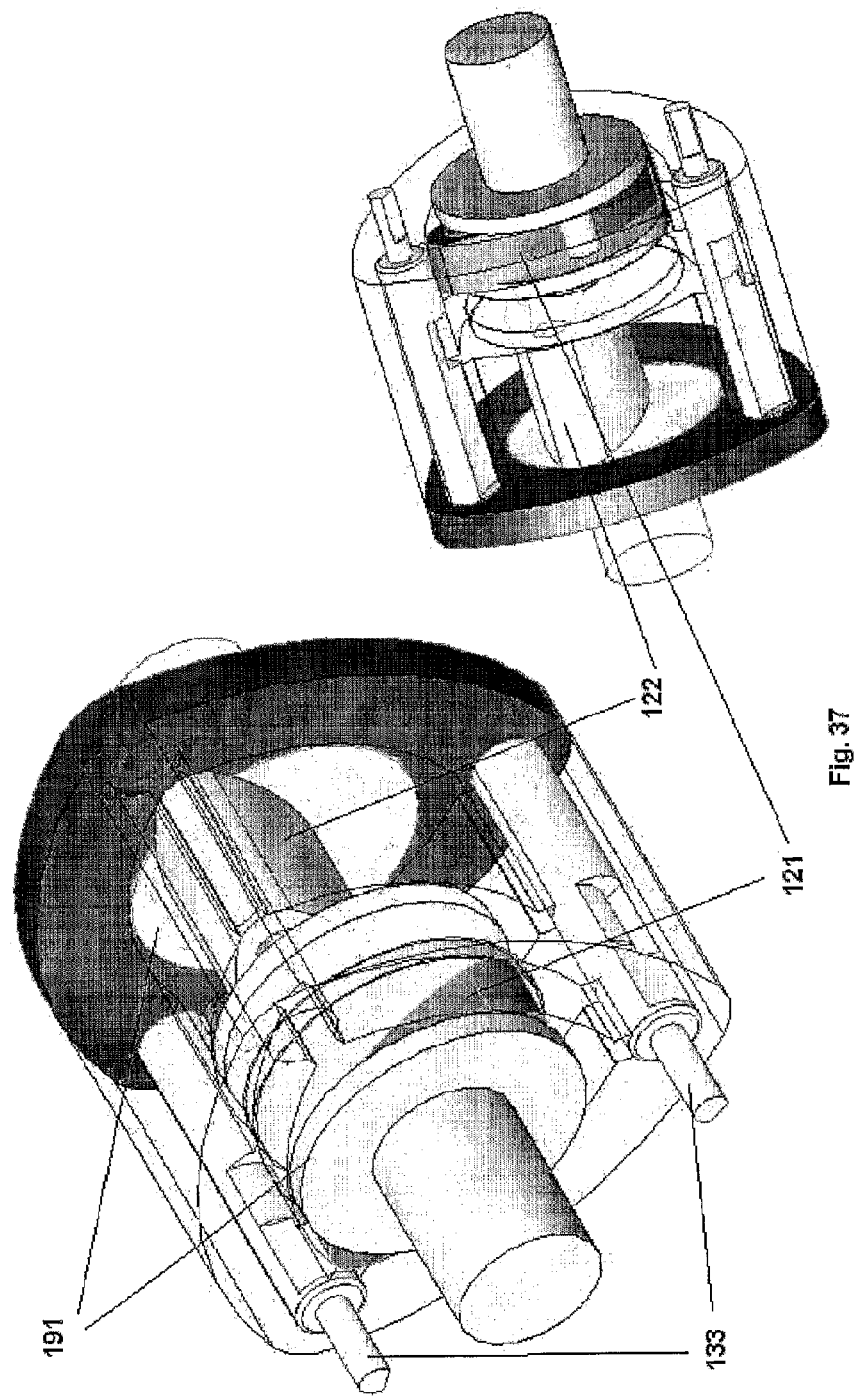

Finally, modified Reuleaux triangle geometry may be used in devices other than engines, pumps and compressors. For example, a "triangular wheel" that rotates around two centers is shown in FIG. 35. It is clear, that if vertical gears, attached to the frame of the vehicle, are allowed to move with two different speeds, the wheel will be moving on horizontal surface with constant speed. The advantage of this wheel is that it is equivalent in performance to wheel almost twice its size. At the same time on uneven terrains such a wheel will have advanced "all terrain" capabilities.

Additional Issues

In order to enable successful implementation of HCCE—it is useful to address a number of technical issues relating to combustion dynamics and sealing of the pistons and combustion chambers. These issues may arise and be addressed for different embodiments of the engines discussed above.

Combustion Dynamics

Fuel introduction, when hot compressed air "meets" stationary fuel can present a challenge from combustion dynamics standpoint: mixing of air and fuel, located in the wall of the housing could require additional time. Since combustion chamber may rotate at high speed at high loads, there might not be enough time for the air and fuel to mix properly. Similar problem may occur for fuel injection as well. To remedy this situation it is possible to premix air and fuel before the compression in the proportion, which will be below the lower limit of flammability of fuel in air. The flammability limits are different for different fuels, but for Natural Gas (methane) the flammability limits in the air are typically 5-14% by volume. This means that we could pre-mix and compress the air fuel mixture containing less than 5% (it is also function of pressure) by volume without possibility for it to auto-ignite. Additional fuel, above the lower limit of flammability can be injected or introduced via means described elsewhere in this patent application as well as international application publication number WO 03/074840.

Pistons/Rotors Sealing—Fluidic Diode Seal (FDS)

Another issue that will need to be addressed is a sealing of oscillating, rotating or recip-rotating parts, including the pistons and combustion chambers. A ceramic type sealing used in Wankel engines could potentially be used for application in HCCE. In distinction with Wankel, due to geometry of HCCE engine, the seals do not necessarily have to be located within the apexes of rotors, but could be located in stationary position near intake/exhaust ports.

In addition to this, since rotor of HCCE, based on modified Reuleaux geometry, actually never has to touch the housing, a very small gap—on the order of 0.001"—can be allowed between the rotor and housing. The leakage associated with this gap will be small, especially at high engine RPM. In this approach we may not need a seal at all.

Finally, even this small leakage can be significantly reduced by applying a fluidic diode concept for sealing purposes. Testa diode or any other suitable configuration fluidic diode can be used for this purpose. Fluidic diodes as they are currently used in practice are stationary channels of special shape which create a significant pressure drop for fluid flowing in one direction, while having very small pressure drop when fluid is flowing in opposite direction. The ratio of pressure drop when fluid flows in one direction to a pressure drop when fluid flows in opposite direction, called fluidic diode's "diodicity", can reach the level of 5 to 10.

Figure 43:
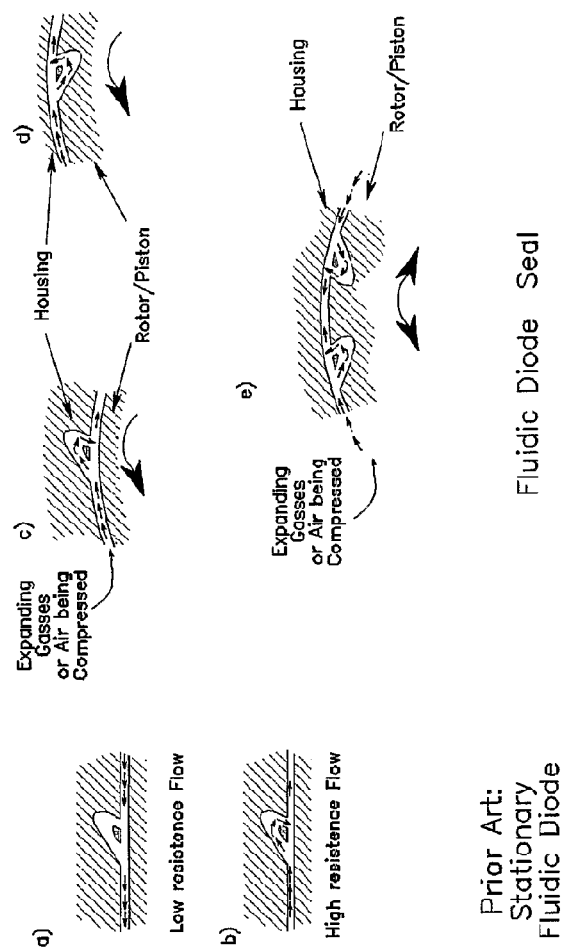
FIG. 43 is demonstration of application of fluidic diode concept in dynamic sealing applications.

As shown in FIGS. 43 a) and b), prior art fluidic diodes are formed by making a channel made of one smooth wall surface, while other wall has a shape or a feature that creates high pressure local area, but only when fluid flows in one direction. FIG. 43a) demonstrate conditions when the resistance to follow is minimal while in FIG. 43b) the resistance is large due to the local dynamics of the flow.

We will now apply the concept of fluidic diode to reduce the leakage between two bodies having a channel formed by the small gap between them. If two bodies are in collinear motion with respect to each other, as shown in FIG. 43c-e) and one or both of these bodies have features that create locally high pressure for flow moving in one direction (leakage flow), such a feature would act as a dynamic seal with potential to decrease the leakage 5 to 10 times.

Figure 44:
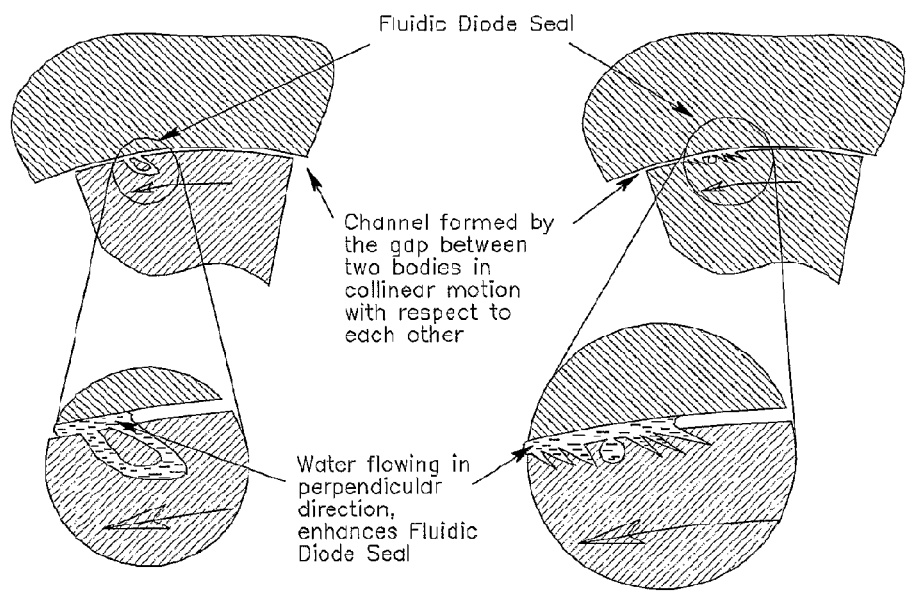
FIG. 44 shows details of various types of Fluidic Diode Seals (FDS), channels of which could be filled with liquid.

Furthermore the Fluidic Diode Seal (FDS) concept can be improved even further if channels of fluidic diodes are filled with liquid flowing through the fluidic diode in the direction approximately perpendicular to the relative motion of two bodies being sealed. Shown in FIG. 44 are two examples of fluidic diode seals, which could be, optionally, filled with liquid. The choice of liquid should be dictated by the system in which seal being used. For example in engines described in this application, the natural choice would be to use water as a sealing liquid. Another example would be to use refrigerant fluid in the application where Reuleaux triangle shaped piston is used as a refrigerant compressor; the FDS can be applied to both curved and flat surfaces of such a rotor. Still another example would be to use engine's oil to implement a FDS as a replacement for ring seals currently used on all pistons in the ICE's—such a seal would not only function as a gas seal but also will lubricate cylinders, reducing the friction between cylinder and piston, and enhance cooling of the piston and cylinder.

Figure 45:
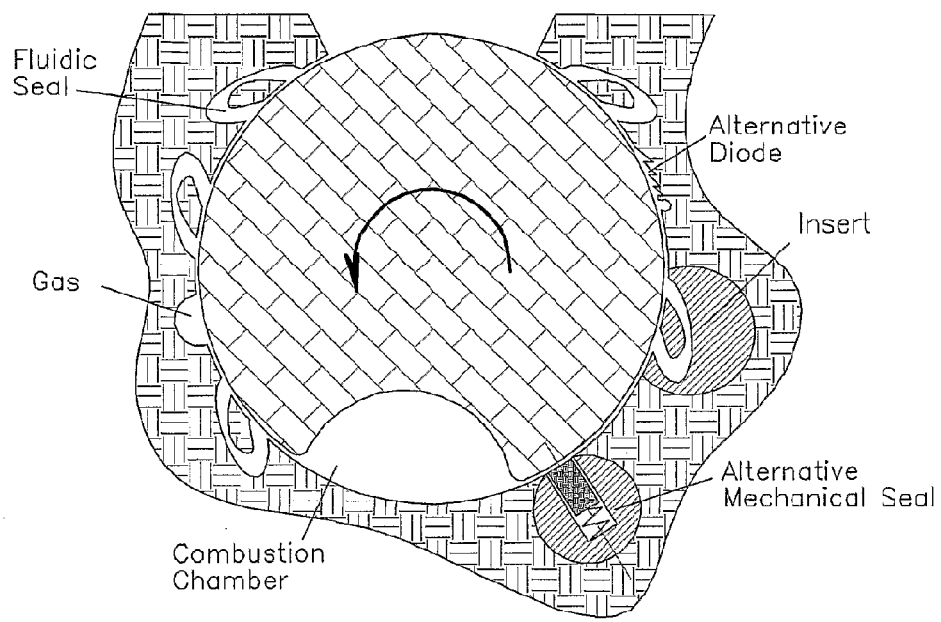
FIG. 45 shows how FDS can be applied toward sealing of standalone combustion chambers in various embodiments of HCCE.

FIG. 45 demonstrates various examples of FDS that could be used to seal gases in the rotating combustion chamber for the engines described in this application.

The invention may be embodied in other specific forms without departing from the spirit of essential characteristics thereof. The foregoing embodiments are therefore to be considered in all respects illustrative rather than limiting on the invention described herein. The scope of the invention is thus indicated by the appended claims rather than by the foregoing description, and all changes that come within the meaning and range of equivalency of the claims are intended to be embraced therein.

What is claimed is:

1. A method of operating an internal combustion engine having a housing, a piston mounted in the housing for complex motion about a plurality of axes and coupled to a shaft, and wherein occur phases of compression, combustion, and expansion in the housing, and wherein, in the compression phase, air introduced through an intake port into the housing is compressed by reducing volume of a compression chamber in the housing from an initial volume to a second volume that is less than the initial volume, and wherein the housing includes an exhaust port through which are passed gases resulting from combustion of fuel during the combustion phase, the method comprising:

providing a recess in the housing and configuring the piston so that during the complex motion of the piston, the piston at least in part covers the recess during the combustion phase, at least a portion of the recess forming a constant volume combustion chamber;

introducing the fuel into the recess, the fuel mixing with compressed air to form a mixture of compressed air and fuel;

igniting the mixture of compressed air and fuel in the combustion phase; and during the expansion phase, defining an expansion chamber volume that undergoes expansion of gases from combustion while the expansion chamber volume increases to a third volume that is larger than the initial volume; and wherein, over a rotation of the shaft, the initial, second and third volumes are defined in differing amounts for the phases of compression, combustion and expansion, in a manner that is smooth and continuous.

2. A method of operating an internal combustion engine according to claim 1, wherein the piston is a rotor.

3. A method of operating an internal combustion engine according to claim 2, wherein the rotor has a plurality of lobes.

4. A method of operating an internal combustion engine according to claim 1, further comprising using an energy recovery system to increase temperature of the fuel before it is introduced to the recess.

5. A method of operating an internal combustion engine according to claim 4, further comprising using the energy recovery system to further reduce temperature of the gases from the combustion in the combustion phase.

6. A method of operating an internal combustion engine according to claim 4, wherein using the energy recovery system further includes causing thermo-chemical decomposition of gaseous fuel.

7. A method of operating an internal combustion engine according to claim 4, wherein using the energy recovery system further includes causing a catalyst-assisted reaction to occur at a temperature between about 450 degrees C. and about 750 degrees C.

* * * * *